(12) United States Patent
Sirkar et al.

(10) Patent No.: US 8,167,143 B2
(45) Date of Patent: May 1, 2012

(54) DESALINATION DEVICES AND SYSTEMS USING POROUS HYDROPHOBIC HOLLOW FIBERS AND HYDROPHOBIC POROUS COATINGS

(75) Inventors: Kamalesh K. Sirkar, Bridgewater, NJ (US); Baoan Li, Mississauga (CA)

(73) Assignee: New Jersey Institute of Technology, Newark, NJ (US)

( * ) Notice: Subject to any disclaimer, the term of this patent is extended or adjusted under 35 U.S.C. 154(b) by 1308 days.

(21) Appl. No.: 11/189,213

(22) Filed: Jul. 26, 2005

(65) Prior Publication Data
US 2006/0076294 A1   Apr. 13, 2006

Related U.S. Application Data

(60) Provisional application No. 60/591,956, filed on Jul. 28, 2004.

(51) Int. Cl.
*B01D 63/02* (2006.01)
*B01D 61/36* (2006.01)
*B01D 61/00* (2006.01)

(52) U.S. Cl. .................. 210/500.23; 210/640; 210/652; 210/321.79; 210/321.88

(58) Field of Classification Search ........................ None
See application file for complete search history.

(56) References Cited

U.S. PATENT DOCUMENTS 6,716,355 B1 *   4/2004   Hanemaaijer et al. ........ 210/640

OTHER PUBLICATIONS

Schofield, R.W., A.G. Fane, and C.J.D. Fell, Heat and Mass Transfer in Membrane Distillation, J. Membr. Scik., 33, 299, 1987.
Schofield, R.W., A.G. Fane, and C.J.D. Fell, Gas and Vapor Transport Through Microporous Membrane, I. Knudsen-Poiseuille transition, J. Membr. Sci., 53, 159-171, 1990a.
Schofield, R.W., A.G. Fane, and C.J.D. Fell, Gas and Vapor Transport Through Microporous Membrane, H.J. Membr. Sci., 53, 173-185, 1990b.
Lawson, K.W., and D.R. Lloyd, Membrane Distillation, II. Direct Contact MD, J. Membr. Sci, 120, 123-133, 1996.
Martinez-Diez, L., and Mi. I. Vazquez-Gonzalez, Temperature and Concentration Polarization in Membrane Distillation of Aqueous Salt Solutions, J. Membr. Sci., 156, 265-273, 1999.
Kamalesh K. Sirkar, et al., Novel Membrane and Device for Direct Contact Membrane Distillation Based Desalination Process, 65 pages, Mar. 2001.
Kamalesh K. Sirkar, et al., Novel Membrane and Device for Direct Contact Membrance Distillation Based Desalination Process: Phase III, 84 pages, Jul. 2004.

* cited by examiner

*Primary Examiner* — Krishnan S Menon
(74) *Attorney, Agent, or Firm* — McCarter & English, LLP

(57) ABSTRACT

DCMD and VMD systems and methods for use in desalination applications are provided. The DCMD and VMD systems employ coated porous hydrophobic hollow fiber membranes. The coatings advantageously function to essentially eliminate pore wetting of the membrane, while permitting substantially unimpeded water vapor permeance through the fiber walls. The DCMD and VMD membranes are characterized by larger fiber bore diameters and wall thicknesses. The membranes substantially reduce the loss of brine sensible heat, e.g., heat loss via conductive heat flux through the membrane wall and the vapor space and, in exemplary embodiments, the brine-side heat transfer coefficient is dramatically enhanced by horizontal/vertical cross flow of brine over the outside surface of the coated fibers. Superior water vapor fluxes are achieved with the systems and methods.

23 Claims, 56 Drawing Sheets

Conventional direct contact membrane distillation

Conventional Vacuum Membrane distillation

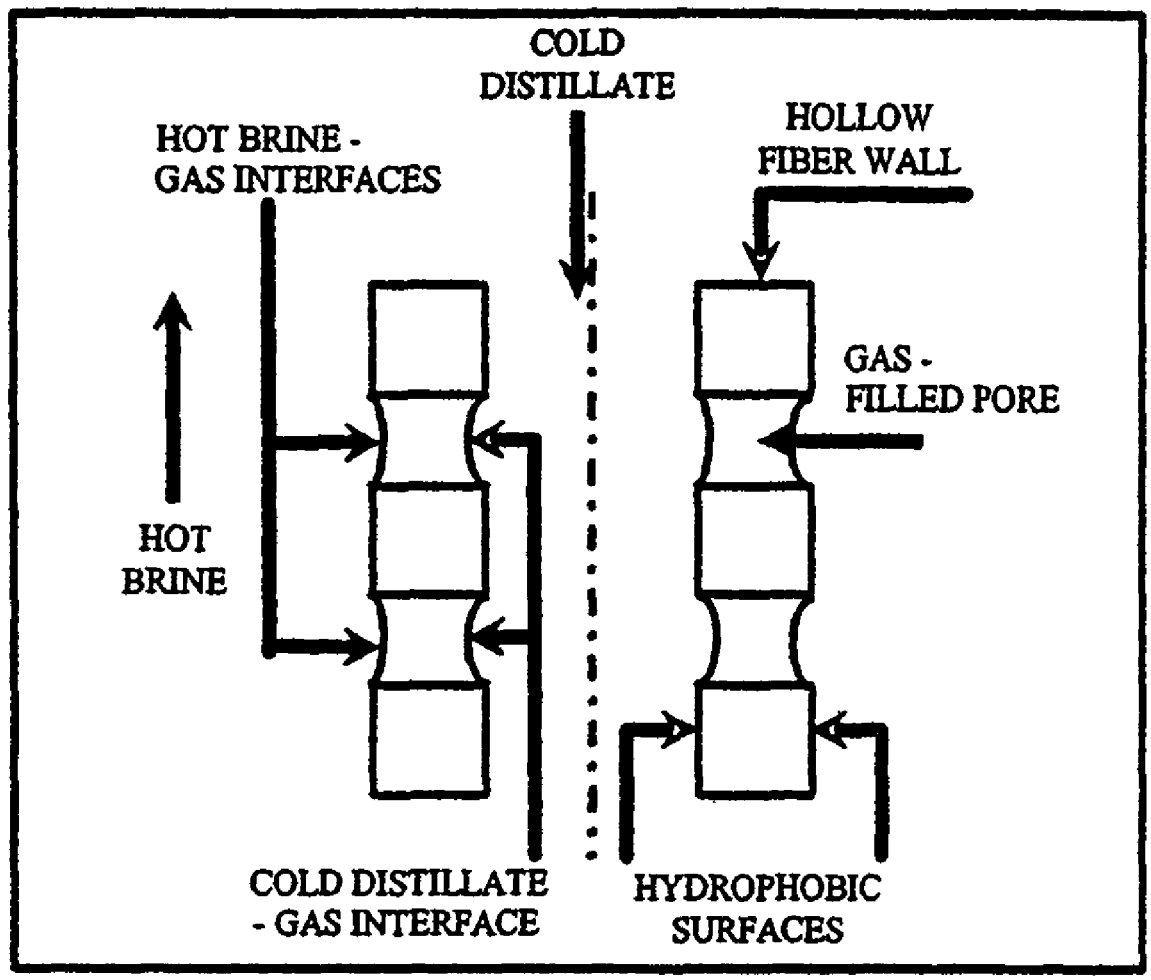
Figure 1a. Conventional direct contact membrane distillation

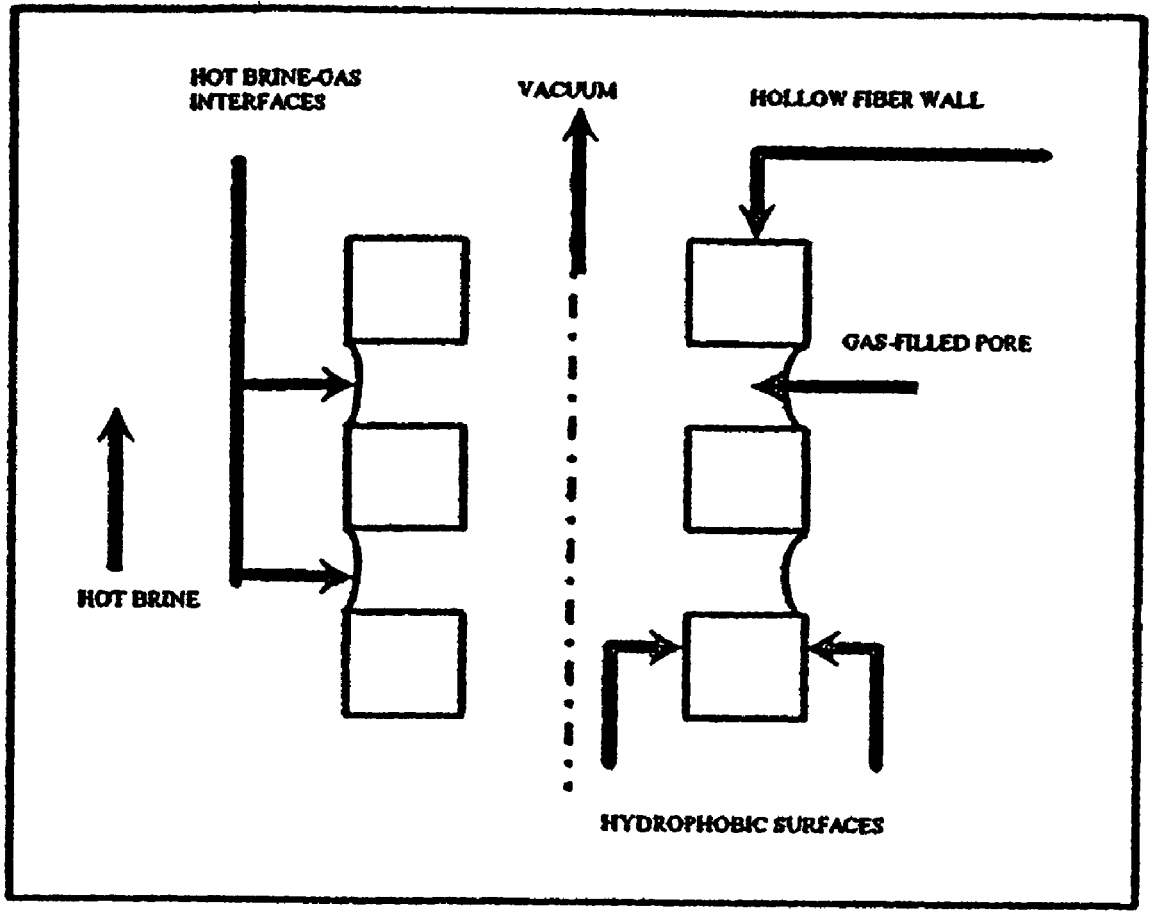
Fig. 1b. Conventional Vacuum Membrane distillation

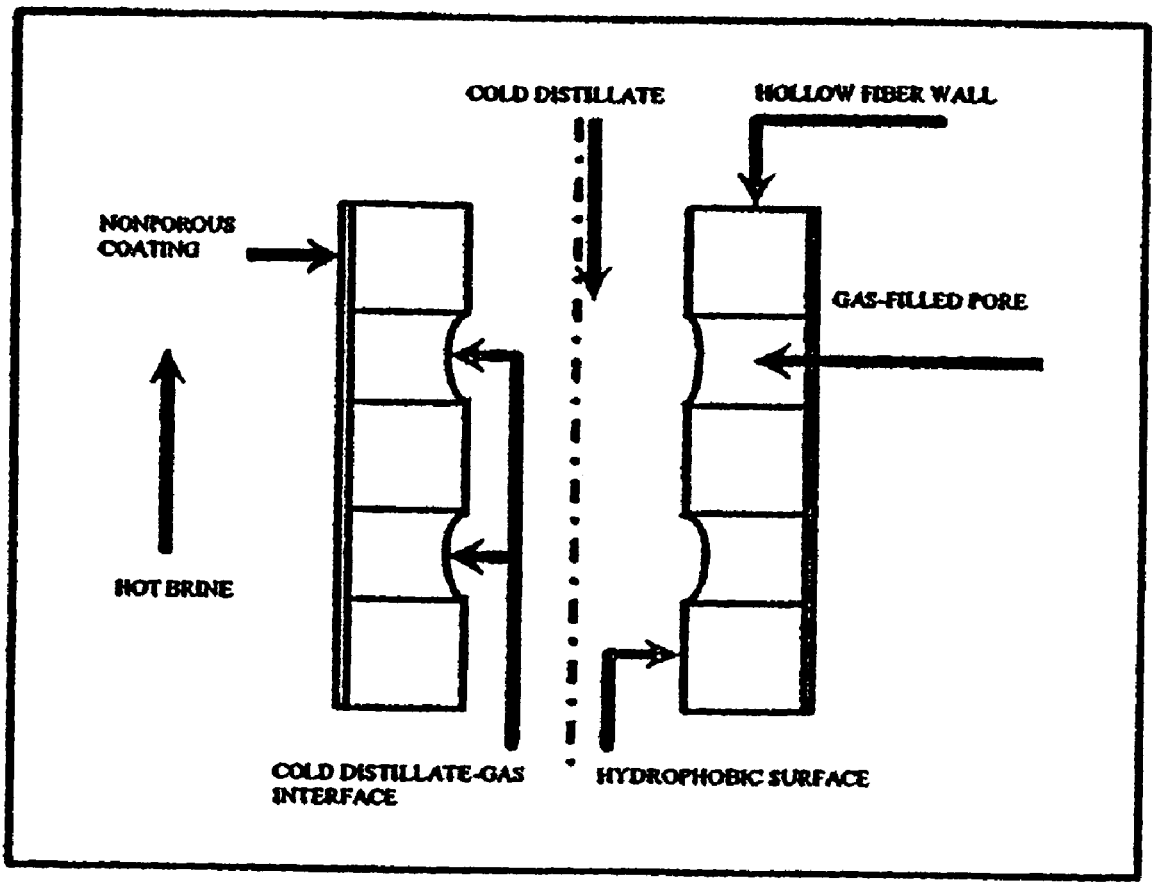
Fig. 1c. Suggested Direct Contact Membrane Distillation

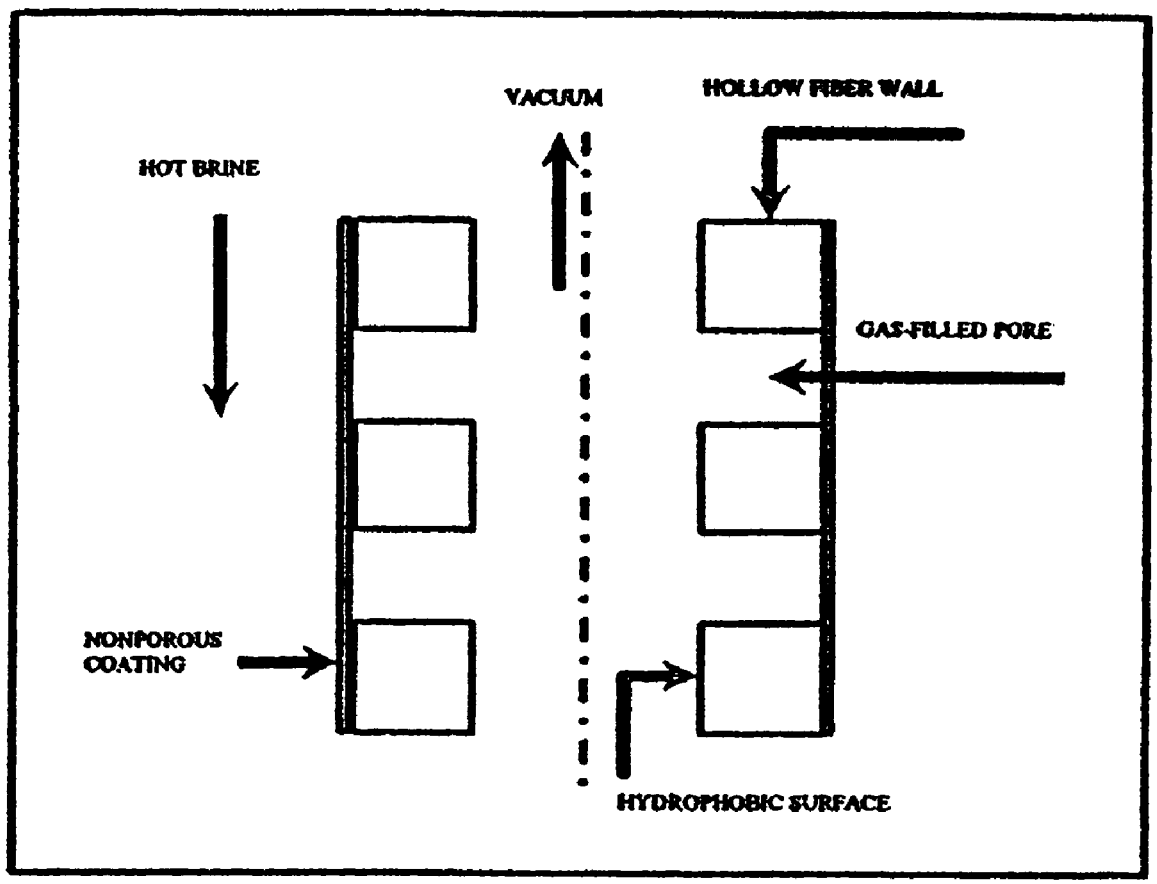
Fig.1d. Suggested Vacuum Membrane Distillation

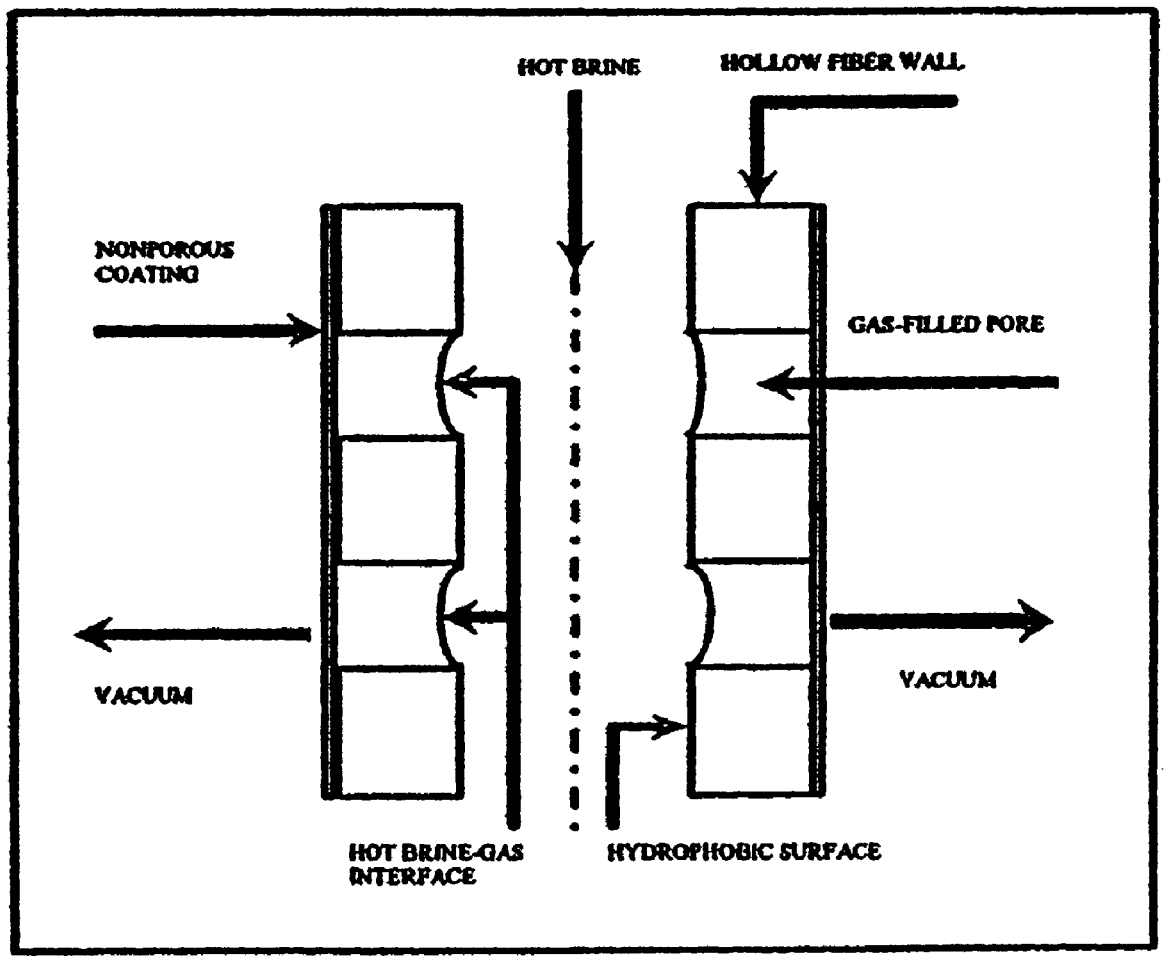
Fig. 1e. Vacuum Membrane Distillation with Hot Brine in Coated Fiber Lumen

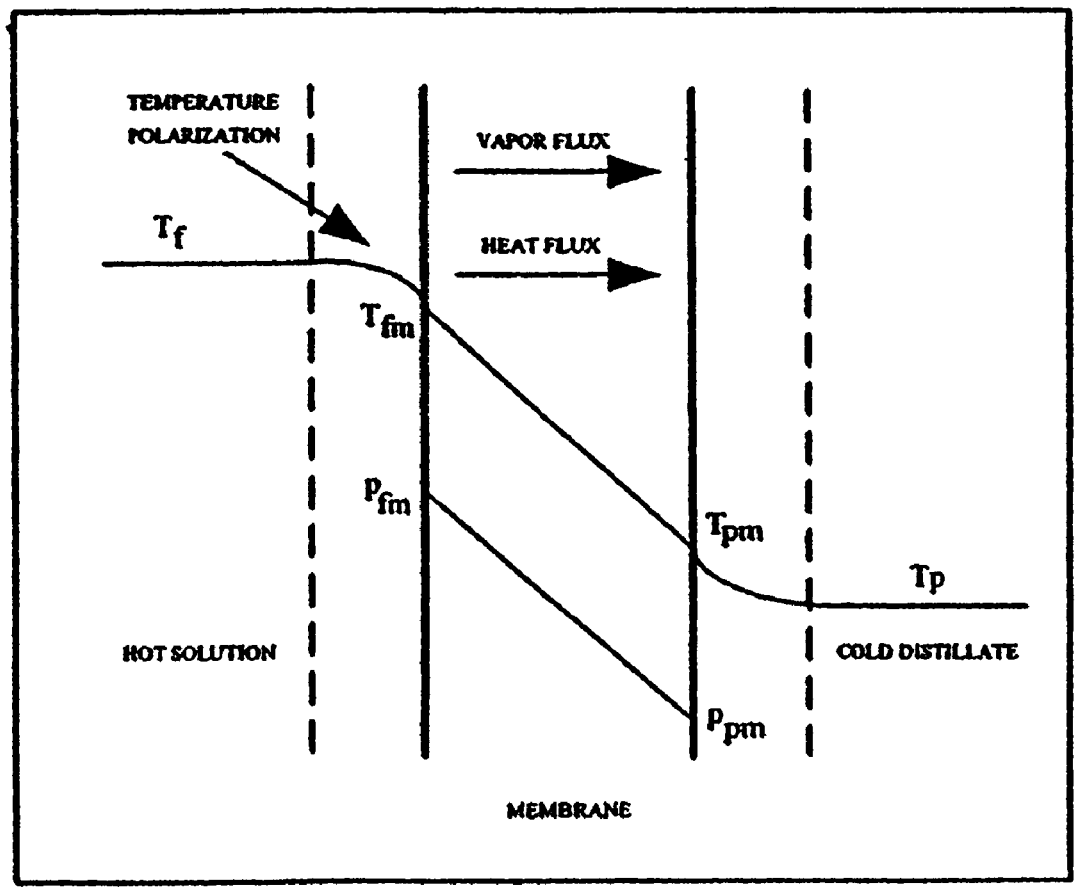
Fig. 1f. Temperature and Partial Pressure Profiles in Direct Contact Membrane Distillation MM: Crossflow membrane moduel 1. Thermocouple    2. Heater    3. Liquid level switch

| Particulars | MXFR #1 | MXFR #2 | MXFR #3 | MXFR #4 |
|---|---|---|---|---|
| Support membrane type | PP 150/330; Accurel MEMBRANA | | | |
| Support membrane | Polypropylene | | | |
| Fiber O.D., μm | 630 | | | |
| Fiber I.D., μm | 330 | | | |
| Wall thickness, μm | 150 | | | |
| Maximum pore size, μm | > 0.20 | | | |
| Membrane porosity, % | ~60 - 80 | | | |
| Coating | *Silicone fluoropolymer | | | |
| Arrangement of fibers | Staggered | | | |
| No. of fibers | (2×20+12×19) = 268 | (2×20+12×19)-15(broken)= 253 | 10×18=180 | 10×18-10 (broken)=170 |
| Effective fiber length, cm | 6.4 | | | |
| **Effective membrane surface area, cm$^2$ | 178 | 168 | 119 | 113 |
| ***Effective cross-sectional area for shell side liquid flow, cm$^2$ | 7.94 | | 8.74 | |
| Rectangular module frame (internal dimensions) | Length: 6.4 cm, width: 2.5 cm, height: 1.8 cm | | | |
| Packing fraction | 0.18 | 0.17 | 0.12 | 0.12 |
| Shell side flow mode | Rectangular cross flow | | | |
| Fabricated at | AMT Inc.; Minnetonka, MN | | | |

* MXFR #1 and MXFR #2 represent one pairing; MXFR #3 and MXFR #4 represent another pairing different from MXFR #1. The coating compositions are proprietary to AMT Inc.

** Based on fiber internal diameter.

*** Based on open area for flow = frame cross sectional area (6.4 × 2.5 cm$^2$) − fiber projected area (no. of fibers in one layer × fiber O.D. × length of fiber cm$^2$).

FIGURE 39a

| Particulars | MXFR #6 | MXFR #7 | MXFR #9 | MXFR #10 |
|---|---|---|---|---|
| Support membrane type | PP 50/200; Accurel MEMBRANA | | PP 50/280; Accurel MEMBRANA | |
| Support membrane | Polypropylene | | | |
| Fiber O.D., μm | 305 | | 397 | |
| Fiber I.D., μm | 200 | | 280 | |
| Wall thickness, μm | 52.5 | | 50 | |
| Maximum pore size, μm | Unknown | | ~ 0.2 | |
| Membrane porosity, % | 60 | | Unknown | |
| Coating | *Silicone fluoropolymer | | | |
| Arrangement of fibers | Staggered | | | |
| No. of fibers | 13×48= 624 | 13×48= 624 | 12×38= 456 | 12×38= 456 |
| Effective fiber length, cm | 6.4 | 6.4 | 6.4 | 6.4 |
| **Effective membrane surface area, $cm^2$ | 251 | 251 | 256.6 | 256.6 |
| ***Effective cross-sectional area for shell side liquid flow, $cm^2$ | 6.63 | | 6.34 | |
| Module frame (internal dimensions) | Length: 6.4 cm, width: 2.5 cm, height: 1.8 cm | | | |
| Packing fraction | 0.10 | | 0.13 | |
| Shell side flow mode | Rectangular cross flow | | | |
| Fabricated at | AMT Inc.; Minnetonka, MN | | | |

\* The coating of MXFR #6 and MXFR #7 differ in ratio of silicone/fluoropolymer mixture. MXFR #9 and MXFR #10 have different coating formulae. The coating compositions are proprietary to AMT Inc.

\*\* Based on fiber internal diameter.

\*\*\* Based on open area for flow = frame cross sectional area (6.4 × 2.5 $cm^2$) – fiber projected area (no. of fibers in one layer × fiber O.D. × length of fiber $cm^2$).

FIGURE 39b

| Particulars | MXFR #1 | MXFR #3 | MXFR #6 | MXFR #7 | MXFR #9 | MXFR #10 | Module 4* |
|---|---|---|---|---|---|---|---|
| Support membrane type | PP 150/330 | PP 150/330 | PP 50/200 | PP 50/200 | PP 50/280 | PP 50/280 | PP 50/200 |
| Coating | | | Silicone fluoropolymer | | | | Silicone |
| Shell side flow mode | | | Cross flow | | | | Parallel flow |
| Permeance of $N_2$, $cm^3$ (STP)/$cm^2 \cdot s \cdot cmHg$** | 0.153 | 0.196 | 0.006 | 0.005 | 0.011 | 0.009 | 0.013 |
| F(VMD-tube), kg/$m^2$-h ($Re_d$)*** | --- | 15.6 (136) | 9.8 (82) | 7.3 (83) | 10.4 (118) | 9.5 (118) | 11.6 (83) |
| F(VMD-shell), kg/$m^2$-h ($Re_d$)**** | --- | 65.0(57) | 12.0(30) | 8.8 (33) | 7.2(39) | 6.8(38) | --- |
| $\eta$ (VMD-average membrane heat transfer efficiency), %+ | --- | 95% | 92% | 94% | 92% | 93% | --- |
| DCMD performance(below):++ $Re_d$ (tube side) | 65 | 68 | 42 | 41 | 50 | 52 | 31 |
| $Re_d$ (shell side) | 54 | 58 | 29 | 28 | 35 | 38 | 33 |
| Pressure drop (tube side), psi | 1.0 | 1.0 | 1.5 | 1.5 | 1.4 | 1.3 | 3.0 |
| Conductive heat flux, kcal/$m^2$s+++ | 3.5 | 3.1 | 5.3 | 4.9 | 5.6 | 5.8 | --- |
| F(DCMD), kg/$m^2$-h++++ | 32.9 | 41.4 | 3.9 | 2.7 | 1.0 | 2.9 | 0.2 |

FIGURE 40

| | |
|---|---|
| * | Module 4 was used in 2001 Project (Sirkar and Qin, 2001). |
| ** | Experimental conditions: Temperature: 25.5 °C; atmospheric pressure: 76 cmHg; $N_2$ inlet: tube side; $N_2$ outlet: shell side. |
| *** | F (VMD-tube): Water vapor flux (VMD), experimental conditions: deionized water (85 °C) as feed flowing through tube side at 900 cm/min of linear velocity; vacuum (60-66 cmHg) at shell side. |
| **** | F (VMD-shell): Water vapor flux (VMD), experimental conditions: saline (1% NaCl at 85 °C) as feed flowing through shell side at around 200 cm/min of interstitial velocity; vacuum (60-66 cmHg) at tube side. |
| + | $\eta$ (VMD-average membrane heat transfer efficiency) = heat used for evaporation of water/total heat loss of feed flowing through membrane module (Equation 20). |
| ++ | DCMD: shell side: 1% saline water at 85 °C (inlet temperature) at 200 cm/min of interstitial velocity; Tube side: DI water at 15 -17 °C (inlet temperature) at 766 cm/min of linear velocity. |
| +++ | Conductive heat flux = (heat transfer rate from the increase of temperature in the tube side - heat transfer rate for evaporation of water)/effective membrane surface area. It is supposed that the heat loss through module faces in the tube side is negligible. |
| ++++ | F (DCMD): Water vapor flux (DCMD). |

FIGURE 40
(continued)

| Inlet temperature (°C) | 60 | 70 | 80 | 89 |
|---|---|---|---|---|
| Reynolds number (shell side) | 32.2 | 36.5 | 42.7 | 43.9 |
| H$_2$O Flux (kg/m$^2$-hr) | 4.45 | 7.28 | 11.2 | 14.7 |

Feed: 1% NaCl solution flowing on shell side, brine interstitial velocity: 297 cm/min (brine flow rate: around 1967 ml/min). Vacuum: 63-66 cmHg in tube side.

FIGURE 41

| Interstitial velocity (cm/min) | 61 | 119 | 235 | 297 |
|---|---|---|---|---|
| Reynolds number (shell side) | 8.3 | 16.3 | 32.3 | 42.7 |
| $H_2O$ flux (kg/m$^2$-hr) | 8.69 | 9.17 | 9.97 | 11.2 |

Feed: 1% NaCl solution flowing through shell side, inlet temperature: 80 °C; Vacuum: 63-66 cmHg in tube side.

FIGURE 42

| Flow mode | Parallel flow (tube side)* | | Cross flow (shell side)** | |
|---|---|---|---|---|
| Module | MXFR #6 | MXFR #7 | MXFR #6 | MXFR #7 |
| Hot stream flow rate, ml/min | 97 | 97 | 1960 | 1960 |
| Linear Velocity, cm/min | 495 | 495 | | |
| Interstitial | | | 295 | 295 |
| Reynolds number | 43.4 | 43.4 | 43.4 | 43.4 |
| Water vapor flux, kg/m$^2$-h | 7.5 | 6.2 | 13 | 9.9 |

\* Feed:    deionized water at 85 °C flowing through tube side; Vacuum: 63-66 cmHg at shell side.

\*\* Feed:   1 % NaCl solution at 85 °C through shell side; Vacuum: 60-66 cmHg at tube side.

FIGURE 43

| Particulars | MXFR #11 | MXFR #12 | MXFR #13 | MXFR #14 | MXFR #15 |
|---|---|---|---|---|---|
| Support membrane type | PP 50/280 Accurel MEMBRANA | | | | |
| Support membrane | PP | | | | |
| Fiber O.D., μm | 397 | | | | |
| Fiber I.D., μm | 280 | | | | |
| Wall thickness, μm | 50 | | | | |
| Maximum pore size, μm | ~ 0.2 | | | | |
| Membrane porosity, % | Unknown | | | | |
| Coating | *Silicone fluoropolymer | | | Teflon | None |
| Arrangement of fibers | Staggered | | | | |
| No. of fibers | 12×38= 456 | | | | |
| Effective fiber length, cm | 6.4 | | | | |
| **Effective membrane surface area, cm$^2$ | 256.6 | | | | |
| ***Effective cross-sectional area for shell side liquid flow, cm$^2$ | 6.34 | | | | |
| Module frame (internal dimensions) | Length: 6.4 cm, width: 2.5 cm, height: 1.8 cm | | | | |
| Packing fraction | 0.13 | | | | |
| Shell side flow mode | Cross flow | | | | |
| Fabricated at | AMT Inc. Minnetonka, MN | | | | |

* The coating of the MXFR #11 is similar to the MXFR #9 (Phase II Project). The MXFR #12 has a thinner coating of the same composition as the MXFR #11. The MXFR #13 has less silicone in the coating than the MXFR #11.

** Based on fiber internal diameter.

*** Based on open area for flow = frame cross sectional area (6.4 × 2.5 cm$^2$) − fiber projected area (no. of fibers in one layer × fiber O.D. × length of fiber cm$^2$).

FIGURE 44

| Particulars | S/N 1002 | S/N 1003 | S/N 1004 | S/N 1005 |
|---|---|---|---|---|
| Support membrane type | PP 150/330 Accurel MEMBRANA | | | |
| Support membrane | PP | | | |
| Fiber O.D., μm | 630 | | | |
| Fiber I.D., μm | 330 | | | |
| Wall thickness, μm | 150 | | | |
| Maximum pore size, μm | >0.2 upto 0.6 | | | |
| Membrane porosity | ~0.6-0.8 | | | |
| Coating | *Silicone fluoropolymer | | | |
| Arrangement of fibers | Staggered | | | |
| No. of fibers | 11×68=748 | | 16×68=1088 | |
| Effective fiber length, cm | 25.4 | | | |
| **Effective membrane surface area, cm$^2$ | 1970 | | 2864 | |
| ***Effective cross-sectional area for shell side liquid flow, cm$^2$ | 108.86 | | | |
| Rectangular module frame (internal dimensions) | L: 25.4 cm, W: (3.25+3.5) ×2.54/2 = 8.57cm, H: 4.45 cm | | | |
| Packing fraction of fibers | 0.227 | 0.227 | 0.22 | 0.22 |
| Shell side flow mode | Cross flow | | | |
| Fabricated at | AMT Inc., Minnetonka, MN | | | |

* All membranes represent a recipe similar to the copolymer coating on MXFR #3 of Phase II Project. Coating developed by Applied Membrane Technology, Inc., Minnetonka, MN.

** Based on fiber internal diameter.

*** Based on open area for flow = frame cross sectional area (25.4×8.57cm$^2$) − fiber projected area (no. of fibers in one layer × fiber O.D. × length of fiber cm$^2$).

FIGURE 45

| Particulars | MXFR #9* | MXFR #10* | MXFR #11 | MXFR #12 | MXFR #13 | MXFR #14 | MXFR #15 |
|---|---|---|---|---|---|---|---|
| Support membrane type | PP 50/280 | | | | | | |
| Coating | Silicone fluoropolymer | | | | | Teflon | Uncoated |
| Shell side flow mode | Cross flow | | | | | | |
| Permeance of $N_2$, $cm^3$ (STP)/$cm^2 \cdot s \cdot cm\, Hg$** | 0.011 | 0.009 | 0.018 | 0.024 | 0.017 | 0.020 | 0.018 |
| F(VMD)s, $kg/m^2 \cdot h$ ($Re_{d\text{-}shell}$)*** | 7.2 (39) | 6.8 (38) | 11.1 (37.1) | 13.8 (38.0) | 10.9 (39.0) | 12.3 (38.8) | --- |
| F(DCMD), $kg/m^2 \cdot h$ [+] | 1.0 | 2.9 | 4.3 | 4.5 | 4.3 | 5.4 | 5.3 |
| Conductive heat flux (DCMD), $kcal/m^2 s$ [++] | 5.6 | 5.8 | 6.3 | 7.7 | 6.5 | 6.4 | 6.2 |

* MXFR #9 and MXFR #10 were used in Phase II Project (Sirkar and Li, 2003).

** Experimental conditions: Temperature: 25.5 °C; atmospheric pressure: 76 cm Hg; $N_2$ inlet: tube side; $N_2$ outlet: shell side.

*** F(VMD)s: Water vapor flux (VMD), experimental conditions: brine (1 % NaCl at 85 °C) as feed flowing through shell side at 200 cm/min of interstitial velocity; vacuum (60-66 cm Hg) at tube side.

[+] F(DCMD): Water vapor flux (DCMD), experimental conditions: shell side: 1% brine water at 85 °C (inlet temperature) at 200 cm/min of interstitial velocity; tube side: DI water at 15 -17 °C (inlet temperature) at 766 cm/min of linear velocity.

[++] Conductive heat flux = (heat transfer rate from the increase of temperature in the tube side - heat transfer rate for evaporation of water)/effective membrane surface area. It is supposed that the heat loss through the module faces in the tube side is negligible.

FIGURE 46

| Particulars | S/N 1002 | S/N 1003 | S/N 1004 | S/N 1005 | MXFR #3* |
|---|---|---|---|---|---|
| Shell side flow mode | Cross flow | | | | |
| Permeance of $N_2$**, $cm^3(STP)/cm^2 \cdot s \cdot cm\,Hg$ | 0.070 | 0.070 | 0.027 | 0.050 | 0.196 |
| DCMD performance (below)***: $N_v$****, $kg/m^2 \cdot h$ | -- | -- | 23.3 | 22.9 | 41.4 |
| $Re_T$ (tube side) | -- | -- | 118 | 122 | 68 |
| $Re_s$ (shell side) | -- | -- | 71 | 72 | 58 |
| Pressure drop (tube side)+, kPa | -- | -- | 11.5 | 11.7 | 6.9 |
| $\eta$ ++ | -- | -- | 0.44 | 0.42 | 0.65 |

\* MXFR #3 data from Phase II Project (Sirkar and Li, 2003) included here for comparison.

\*\* Experimental conditions: 25.5°C, 76 cmHg; $N_2$ inlet: tube side; $N_2$ outlet: shell side.

\*\*\* DCMD for MXFR #1 and MXFR #3: shell side: 1% saline water at 85°C (inlet temperature) at 200 cm/min of interstitial velocity; tube side: D.I. water at 15 -17°C (inlet temperature) at 760 cm/min of linear velocity.

DCMD for S/N 1004 and S/N 1005: shell side: 3% saline water at 85-88°C (inlet temperature) at 235 cm/min of interstitial velocity; tube side: D.I. water at 20-24°C (inlet temperature) at 1200 cm/min of linear velocity. DCMD was not performed for modules S/N 1002 and S/N 1003 due to tube-sheet leakage.

\*\*\*\* $N_v$: Water vapor flux.

+ Pressure drop of cold distillate on the tube side along the module length.

++ $\eta$: Evaporation efficiency.

FIGURE 47

| Module | Shell side (feed, brine) | | | Tube side (distillate water) | | | | |
| --- | --- | --- | --- | --- | --- | --- | --- | --- |
| | NaCl concentration % | Inlet temperature °C | Outlet temperature °C | Interstitial velocity cm/min | Inlet temperature °C | Outlet temperature °C | Linear velocity cm/min | Flux kg/m²-h |
| MXFR #3 | 1 | 90.1 | 86.6 | 231 | 18.1 | 62 | 1650 | 79 |
| S/N 1004 | 3 | 88.3 | 82.1 | 276 | 36 | 73 | 4360 | 60* |

* $N_2$ permeation data indicate the coatings in the hollow fibers of modules S/N 1004 and S/N 1005 to be less porous than those in the fibers of MXFR #3 (Table 9b)

FIGURE 48

DESALINATION DEVICES AND SYSTEMS USING POROUS HYDROPHOBIC HOLLOW FIBERS AND HYDROPHOBIC POROUS COATINGS

CROSS-REFERENCE TO RELATED APPLICATIONS

The present application claims the benefit of a co-pending provisional application entitled "Devices and Methods for Direct Contact Membrane Distillation (DCMD) and Vacuum Membrane Distillation (VMD) Desalination," which was filed on Jul. 28, 2004 and assigned Ser. No. 60/591,956. The entire contents of the foregoing provisional patent application (including, without limitation, the Exhibits thereto) are incorporated herein by reference.

BACKGROUND

1. Technical Field

The present disclosure is directed to membrane devices and methods for direct contact membrane distillation (DCMD) and vacuum membrane distillation (VMD). More particularly, the present disclosure is directed to advantageous DCMD and VMD systems and methods for use in desalination of brine.

2. Background of the Disclosure

Research and development studies have been directed at improving commercialized reverse osmosis and thermally-driven desalination processes. Indeed, research and development of desalination technologies to increase the availability of cheap and reliable sources of potable water is of significant importance due to the ever increasing population and their needs. Research and development efforts have focused primarily on existing membrane-based and thermally-driven processes and technologies.

A system of great research interest in membrane distillation (MD) is the production of fresh water from saline water, i.e., desalination. The potential advantages of membrane distillation for water production by such desalination techniques include:

(a) membrane distillation produces high quality distillate;
(b) water can be distilled at relatively low temperatures (e.g., 30 to 100° C.) and low pressure (e.g., 1 atm);
(c) low grade heat (e.g., solar, industrial waste heat, or desalination waste heat) may be used; and
(d) the water does not require extensive pretreatment to prevent membrane fouling as in pressure-based membrane processes.

Potential disadvantages associated with membrane distillation techniques in desalination applications include:

(a) the water evaporation rate is strongly controlled by the brine side heat transfer coefficient resulting in a relatively low permeate flux compared to other membrane filtration processes, e.g., reverse osmosis (RO);
(b) over an extended time, there is flux decay and distillate contamination due to pore wetting; and
(c) uncertain economic cost.

Generally, membrane distillation (MD) is an evaporation process of a volatile solvent or solute species from a solution (in most cases, an aqueous solution), driven by a difference between its partial pressure over the solution contacting one side of a porous hydrophobic membrane and its partial pressure on the other side of the membrane. When the partial pressure difference through the membrane is created by the direct contacting of a liquid cooler than the feed on the other side of the membrane, the process is called direct contact membrane distillation (DCMD). This is illustrated for a hollow fiber-based process in FIG. 1a, where the hot brine flows on the shell side of the fiber and the cold distillate flows on the tube side through the fiber bore. When the side of the hollow fiber membrane opposite to the hot brine is subjected to vacuum to develop a partial pressure difference across the membrane, the process is identified as vacuum membrane distillation (VMD). FIG. 1b illustrates a conventional VMD process where the hot brine flows on the shell side of the fiber and vacuum is applied on the tube side.

In a MD process, the membrane is generally porous and hydrophobic. In one variety of MD, direct contact membrane distillation (DCMD), hot brine flows on one side of a gas-filled porous hydrophobic hollow fiber membrane and cold distillate flows on the other side of the membrane. Surface tension forces withhold liquids from the pores and prevent penetration by the liquids. The withholding of the liquids is intended to prevent contact between the two liquids in a DCMD process. Generally, the solutions being processed are aqueous and their surface tensions are higher than the critical surface tension of the polymeric membrane.

In a DCMD process, the temperature difference translates to a corresponding vapor pressure difference across the membrane and provides a driving force for the membrane distillation process. Evaporation occurs at the solution surface if the vapor pressure on the solution side is greater than the vapor pressure at the condensate surface. Vapors then diffuse through the pores to the cooler surface where they condense. The relationships of mass and heat transport for different membrane and process parameters involved in membrane distillation have been investigated theoretically (Schofield et al., 1987, 1990a, 1990b; Lawson and Lloyd, 1996a; Martinez-Diez and Vazquez-Gonzalez, 1999).

The primary deficiencies of conventional DCMD techniques in desalination applications include flux reduction due to long-term pore wetting, reduced brine-side heat and mass transfer coefficients, and conductive heat loss.

The present inventors have engaged in research and development directed to addressing shortcomings and deficiencies in DCMD distillation-based desalination processes. Early work by the present inventors was described in a report to the Bureau of Reclamation, Denver Federal Center. The report was dated Mar. 30, 2001 and was entitled "Novel Membrane and Device for Direct Contact Membrane Distillation-Based Desalination Process" (the "2001 Report"). The contents of the 2001 Report are incorporated herein by reference for background purposes.

As described in the 2001 Report, DCMD and VMD of brine for desalination suffer from long-term flux decay due to membrane pore wetting and low water flux due to poor transport coefficients in the hot brine. With particular reference to the research described in the 2001 Report, modules having an ultrathin microporous/porous silicone coating on the outside surface of hydrophobic porous polypropylene hollow fibers of smaller diameters were employed. Using a parallel flow module (Module 4) and high hot water velocity in the fiber bore (FIG. 1e) yielded a water flux of 15 kg/m$^2$-h at 91° C. in VMD. There was no pore wetting during and after a cumulative experimental duration of 1000 hours (among them approximately 400 hours for 1 wt % or 3 wt % brine) without any module washing in between the runs. The ultrathin plasmapolymerized silicone coating on the porous hollow fiber surface was successful in preventing any pore wetting by hot water or hot saline solutions when these solutions were flowing on the coating side. A large rectangular module having 6000 microporous hollow fibers having an I.D. of 200 μm and outside diameter (O.D.) of 305 μm (polypropylene, Akzo) with a coating yielded very low water vapor flux in DCMD.

Generally, the performance in DCMD for all modules studied was poor in the sense that the water vapor flux was quite low, i.e., in the range of 0.01-0.8 kg/m²-h. It was observed that for the system dimensions, the shell side Reynolds number of hot brine achieved under the laboratory conditions was quite low. Further, conductive heat loss was substantial. Moreover, the cold distillate temperature was too high at the exit. The research described in the 2001 Report demonstrated that conventional fiber types, dimensions and flow conditions are inimical to successful desalination performance in DCMD applications.

Thus, despite prior research and development efforts, a need remains for membrane distillation devices, systems and methods/techniques that are easier to use, cost effective and use available energy, e.g., low-grade waste heat that is not currently utilized. Further needs and opportunities will be apparent from the detailed description which follows.

SUMMARY OF THE DISCLOSURE

Advantageous DCMD and VMD devices, systems and methods/techniques for use in desalination applications are provided herein. The DCMD and VMD devices/systems employ coated porous hydrophobic hollow fiber membranes. Exemplary coatings for use according to the present disclosure include plasmapolymerized microporous/porous coatings, e.g., an ultrathin layer of a silicone-fluoropolymer. The disclosed coatings are advantageous in that they essentially eliminate pore wetting of the membrane, while permitting substantially unimpeded water vapor permeance through the fiber walls.

The disclosed DCMD and VMD membranes are generally characterized by larger fiber bore diameters and wall thickness. These membrane properties substantially reduce the loss of brine sensible heat, e.g., heat loss via conductive heat flux through the membrane wall and the vapor space. Moreover, in exemplary embodiments of the disclosed desalination systems, the brine-side heat transfer coefficient is dramatically enhanced by horizontal/vertical cross flow of brine over the outside surface of the coated fibers. According to advantageous implementations of the disclosed desalination systems, superior water vapor fluxes may be achieved. For example, in illustrative embodiments of the present disclosure, water vapor fluxes in the range of 41-80 kg/m²-h have been achieved from brine feed at 85-90° C.

Thus, the disclosed desalination systems yield extraordinarily productive, yet stable, performance for hot brine desalination at a variety of brine concentrations. Further, the cost parameters associated with operation of the disclosed DCMD devices/systems compare favourably to conventional reverse osmosis desalination, offering potential cost savings for desalination applications.

Additional features, functions and advantages associated with the disclosed DCMD/VMD devices and systems will be readily apparent to persons skilled in the art from the description which follows and the figures/exhibits appended hereto. In addition, further features, functions and advantages associated with desalination methods and techniques according to the present disclosure will be readily apparent to persons skilled in the art from the description which follows and the figures/exhibits appended hereto.

BRIEF DESCRIPTION OF THE FIGURES

To assist those of skill in the art in making and using the devices/systems described herein, and in practicing the methods/techniques described herein, reference is made to the figures appended hereto wherein:

FIG. 1a is a schematic of a conventional direct contact membrane distillation system;

FIG. 1b is a schematic of a conventional vacuum membrane distillation system;

FIG. 1c is a schematic of an exemplary direct contact membrane distillation system according to the present disclosure;

FIG. 1d is a schematic of an exemplary vacuum membrane distillation system according to the present disclosure;

FIG. 1e is a schematic of an exemplary vacuum membrane distillation system with hot brine passing through a coated fiber lumen according to the present disclosure;

FIG. 1f is a plot of temperature and partial pressure profiles in an exemplary direct contact membrane distillation system;

FIGS. 39a and 39b are tables setting forth the characteristics of hollow fibers and membrane modules used in experimental studies of the present disclosure;

FIG. 40 is a table setting forth design parameters, gas permeation properties and performances of hollow fiber membrane modules according to the present disclosure;

FIG. 41 is a table setting forth the effect of temperature on water vapor flux in VMD for an exemplary module [MXFR #6] according to the present disclosure;

FIG. 42 is a table setting forth the effect of shell side Reynolds number on water vapor permeation flux of an exemplary module [MXFR #6] according to the present disclosure;

FIG. 43 is a table setting forth the effect of parallel flow versus cross flow on water vapor flux of exemplary modules [MXFR #6 and MXFR #7] according to the present disclosure;

FIG. 44 is a table setting forth details of small membrane modules and hollow fibers according to the present disclosure;

FIG. 45 is a table setting forth details of larger membrane modules and hollow fibers according to the present disclosure;

FIG. 46 is a table setting forth characteristics of small hollow fiber membrane modules, gas permeation properties and performances in VMD and DCMD according to the present disclosure;

FIG. 47 is a table setting forth nitrogen permeation properties and DCMD performances of larger hollow fiber membrane modules according to the present disclosure; and FIG. 48 is a table setting forth comparison of data from modules S/N 1004 and MXFR #3 for scale up considerations.

DETAILED DESCRIPTION OF EXEMPLARY EMBODIMENTS

Figure 2:
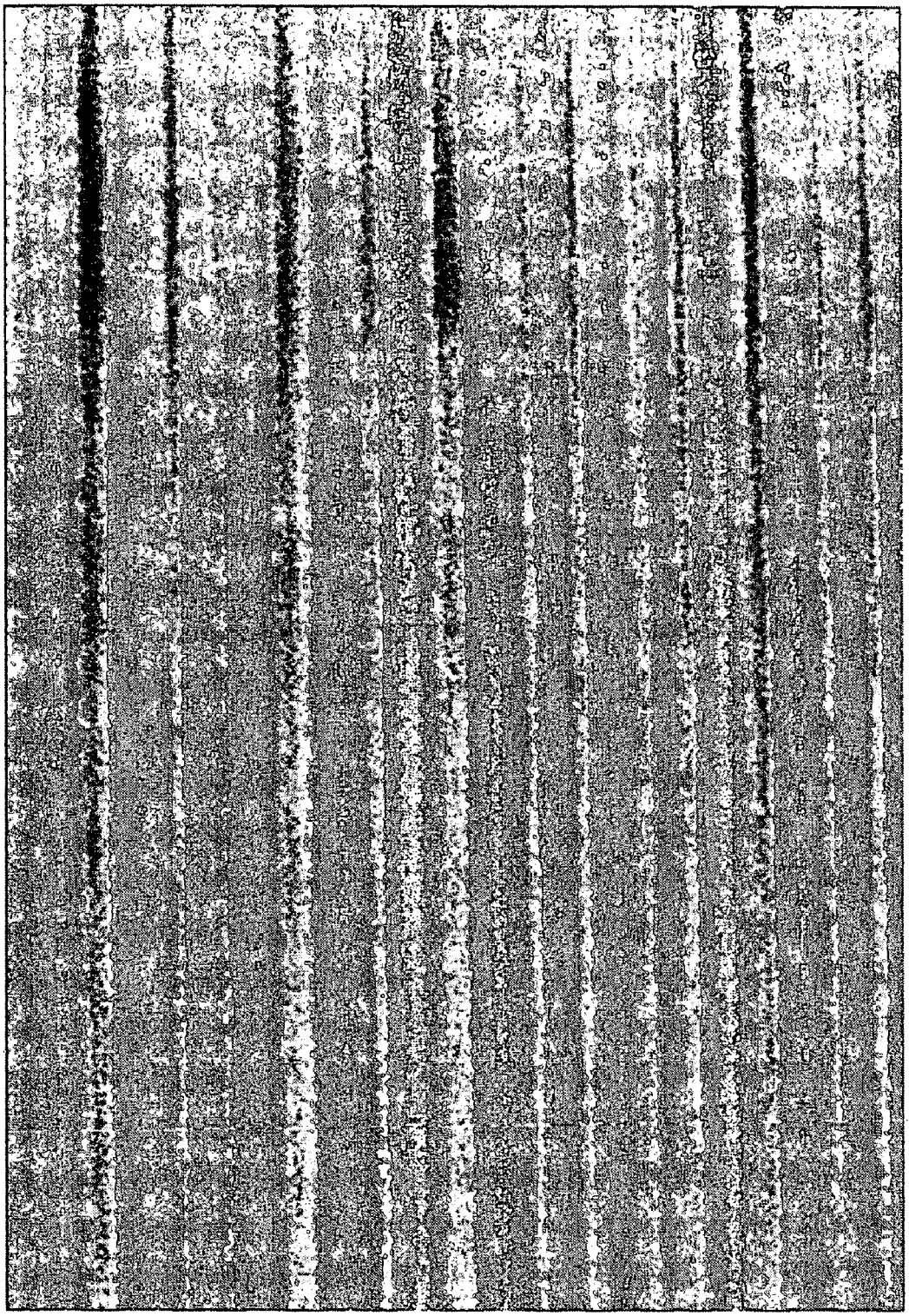
FIG. 2 is a side view of a plurality of coated, microporous hollow fibers according to an exemplary embodiment of the present disclosure.

Advantageous DCMD and VMD devices, systems and methods/techniques for use in a variety of industrial and/or commercial applications, including specifically desalination applications, are provided according to the present disclosure. Coated, porous hydrophobic hollow fiber membranes are used according to the present disclosure. Exemplary coatings include plasmapolymerized microporous/porous coatings, e.g., an ultrathin layer of a silicone-fluoropolymer. Pore wetting is substantially reduced and water vapor permeance through the fiber wall is essentially unimpeded.

The disclosed DCMD and VMD membranes are generally characterized by larger fiber bore diameters and wall thicknesses. The physical properties of the disclosed membranes substantially reduce the loss of brine sensible heat, e.g., heat loss via conductive heat flux through the membrane wall and the vapor space. In addition, according to exemplary embodiments of the present disclosure, the brine-side heat transfer coefficient is enhanced by horizontal/vertical cross flow of brine over the outside surface of the coated fibers. Advantageous water vapor fluxes are achieved according to the present disclosure, e.g., water vapor fluxes in the range of 41-80 kg/m$^2$-h for brine feed at 85-90° C. may be achieved.

The present disclosure is presented in two phases. An initial phase relates to research and development activities at a smaller scale, and exemplary embodiments of the disclosed DCMD/VMD systems at such initial scale. The second phase relates to research and development activities associated with scaling up the disclosed DCMD/VMD systems and exemplary embodiments thereof at such scaled-up level. Although exemplary embodiments of the disclosed systems/methods are described herein with reference to desalination applications, it is to be understood that the disclosed systems/methods are susceptible to additional/alternative applications, and the present disclosure expressly encompasses such additional/alternative applications. A glossary of symbols/terms is appended hereto.

(A) Initial Phase

As described herein, membrane systems for use in DCMD desalination processes were fabricated wherein: (1) the porous hydrophobic hollow fiber membrane had a thin water-vapor permeable hydrophobic microporous/porous coating of a silicone-fluoropolymer plasmapolymerized on the fiber outside diameter on the hot brine side to prevent and/or limit pore wetting; (2) to significantly increase the brine-side heat transfer coefficient, the hot brine feed was in a rectangular cross flow mode vis-à-vis the hollow fiber membranes; (3) the hydrophobic porous hollow fibers had thick walls and high porosity; and (4) the module design ensured that the temperature rise of the cold distillate was minimal.

It is known that the vacuum membrane distillation (VMD) technique, wherein there exists vacuum instead of cold distillate flow on one side of the membrane, the other side having hot brine flow, can illuminate many features of the brine side of a DCMD process. Therefore, extensive data was obtained and is provided herein for both DCMD and VMD operations. Porous hydrophobic polypropylene hollow fiber membranes were utilized in exemplary embodiments of the present disclosure, such fibers having internal diameters between 200 and 330 μm and wall thickness between 50-150 μm. These fibers had different plasmapolymerized microporous/porous coatings of a silicone-fluoropolymer. The module designs provided rectangular cross flow. The fiber number in a module was varied between 170-624. The membrane surface area was varied between 113-257 cm$^2$. The brine feed temperature ranged between 60 and 90° C. in DCMD.

In disclosed exemplary embodiments of the present disclosure, at a high feed velocity over the fibers, a water permeation flux as high as 79 kg/m$^2$-h was achieved in DCMD at 90° C. through a unit referred to as the small "MXFR #3 module." This desirable flux level indicated that, using appropriate fibers and a reasonable cross flow velocity on the shell side, the water permeation flux according to the present disclosure can be substantial. No leakage of salt or water was encountered during extended use of these modules in DCMD or VMD.

The MXFR #3 module built with larger fibers (330 μm internal diameter (I.D.), 150 μm wall thickness) and a related module "MXFR #1" unit yielded the best DCMD performance. Nitrogen permeation tests through different modules indicated that the fibers in this module had the highest N$_2$ permeance. An extended-term DCMD test was carried out for a period of 120 hours at 85° C. using the MXFR #3 module. The steady state water vapor flux was found to be 54 kg/m$^2$-h. The initial time flux decay was likely to be due to a thermal creep in the coatings. Fouling from dirt was quite visible. DCMD and VMD results suggest that higher gas permeance of the microporous/porous coatings, larger fiber wall porosity and pore size, larger fiber I.D. and appropriate flow rates of hot brine and cold distillate are important factors contributing to a stable and high value of water-vapor flux in DCMD according to the present disclosure.

According to the present disclosure, there are a number of ways to overcome the deficiencies in conventional prior art systems. To prevent pore wetting and long-term flux decay, an extremely thin, highly water vapor permeable microporous/porous coating of a hydrophobic silicone-fluoropolymer may be applied on the outside surface of the porous hydrophobic hollow fibers facing the hot brine to make the membrane essentially non-wettable. The resulting exemplary configuration for a DCMD system is illustrated in FIG. 1c. The corresponding exemplary configuration for a VMD system is shown in FIG. 1d. Secondly, transverse flow of hot brine over this coated fiber surface may be implemented via novel rectangular cross flow module designs to enhance the brine side heat transfer coefficient, reduce temperature polarization, and thereby increase the water vapor flux across the membrane.

The initial phase described herein explored a number of approaches to enhance the actual performance of a DCMD process. The rectangular cross flow module design, the fiber packing and the experimental flow conditions were such as to ensure the achievement of high Reynolds number in the shell side cross flow of the hot brine. This reduced the temperature polarization on the brine side (FIG. 1f). The increased fiber bore diameter, the decreased fiber number, and an appropriate distillate flow rate based on overall system design/operation were employed to provide limited temperature rise in the cold distillate under moderate pressure drop. Under these conditions, small rectangular hollow fiber modules were employed to study the desalination performance and water vapor flux achieved under DCMD conditions.

Vacuum membrane distillation using pure water as well as saline water was also carried out to better understand the DCMD performance. VMD experiments were done with hot feed through the tube side as well as the shell side. An extended-term study was carried out with one rectangular cross flow module for a continuous period of five (5) days. Nitrogen permeation tests of the coated fibers were carried out to correlate the DCMD performances with the resistances of the microporous/porous plasmapolymerized silicone-fluoropolymer coating and the porous fiber. The experimental activities are described in greater detail herein below.

1. Six small hollow fiber modules having rectangular cross flow of hot brine over the outside fiber diameter and cold distillate flow in the fiber bore were studied for DCMD-based water recovery from hot feed brine over a temperature range of 60-90° C. The fibers had a microporous/porous plasmapolymerized coating of a silicone-fluoropolymer on the outer diameter. No salt leakage into the fiber bore distillate streams was observed. Module MXFR #3 was used extensively for more than 400 hours, including a continuous five (5) day DCMD run. Extensive VMD runs with different modules also demonstrated that there was no pore wetting.

2. A water vapor permeation flux of 79 kg/m$^2$-hr based on the fiber internal diameter (I.D.) was achieved at 90° C. in DCMD in the MXFR #3 module with the hot brine in rectangular cross flow on the fiber O.D. and cold distillate in the fiber bore. Such a high flux value was advantageously achieved according to the present disclosure due to the high heat transfer coefficient in the rectangular cross flow of brine, more open microporous/porous silicone-fluoropolymer coating on the fiber O.D., thicker fiber wall reducing conductive heat loss, and a lower cold distillate temperature rise due to higher distillate flow rate in the larger diameter fiber bores which ensured a low distillate pressure drop.

The effective cross-sectional area for shell-side hot brine flow in the module studied was ~9 cm². It is contemplated that scaled up modules having a brine flow cross sectional area of 100-200 cm² would provide advantageous results. It is further contemplated that increased membrane surface areas will yield superior results, e.g., membrane surface areas in the range of 120 cm² to around 0.2-0.3 m² and higher, e.g., at least as high as 2.0 m². In addition, it is contemplated that modules containing 1 m² membrane area will provide superior performance and that multiple modules, e.g., 5-6 modules, in a stack will yield high volumes of distillate, e.g., 1 gallon per minute of distillate.

3. In the five (5) day continuous DCMD run carried out with 85.5° C. brine in module MXFR #3, the water vapor flux decreased from an initial value of ~70 kg/m²-hr to a stable value of ~54 kg/m²-hr. Experiments carried out later under the same conditions yielded a flux of 60 kg/m²-hr without any module cleaning. These results suggest that dirt, fouling, creep in the coating, and/or the like may contribute to the observed initial flux drop in DCMD.

4. The performance of MXFR #1 module was somewhat close to the performance of the MXFR #3 module. Other modules employing smaller fibers having less open microporous/porous silicone-fluoropolymer coatings and smaller wall thickness yielded poorer performance in DCMD.

Membrane Modules

Eight rectangular cross flow, hollow fiber modules were obtained from Applied Membrane Technology Inc., Minnetonka, Minn. ("AMT"). The porous hollow fiber membranes in these modules were plasma-coated with different proprietary materials by AMT. The characteristics of the hollow fibers and the membrane modules are listed in the tables set forth in FIGS. 39a and 39b. Among the modules employing larger diameter fibers, MXFR #1 and MXFR #2 represent one pair; MXFR #3 and MXFR #4 represent another pair different from MXFR #1. MXFR #2 and MXFR #4 had some blocked broken fibers. Therefore, modules MXFR #2 and MXFR #4 were not used in any VMD and DCMD measurements. Modules MXFR #5 and MXFR #8 were not received from AMT, so they are not listed in Table 1b. An exemplary side view of the fiber arrangement in the modules is shown in FIG. 2.

Figure 3:
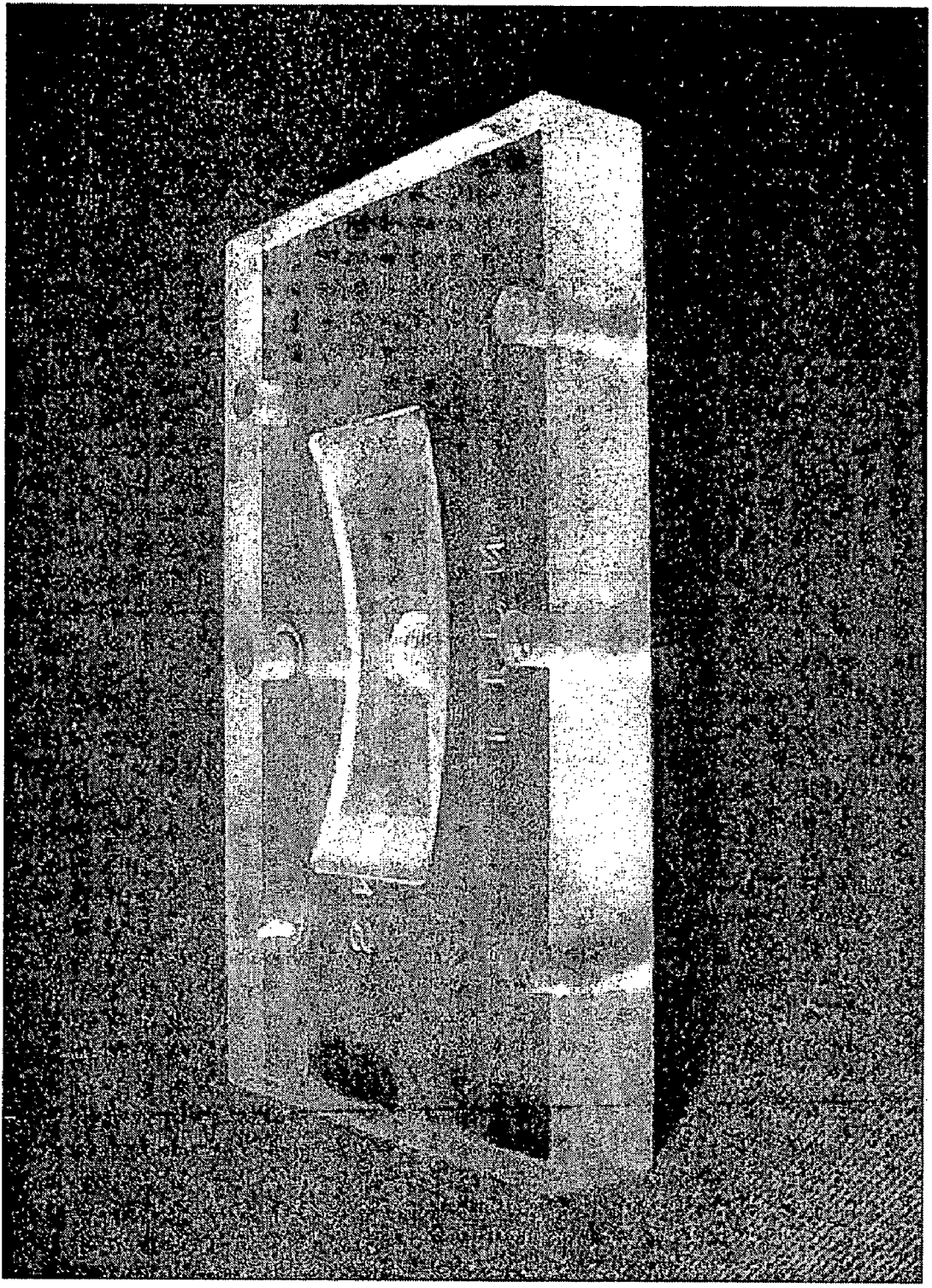
FIG. 3 is a perspective view of an exemplary face for a rectangular cross flow module according to the present disclosure.
Figure 4:
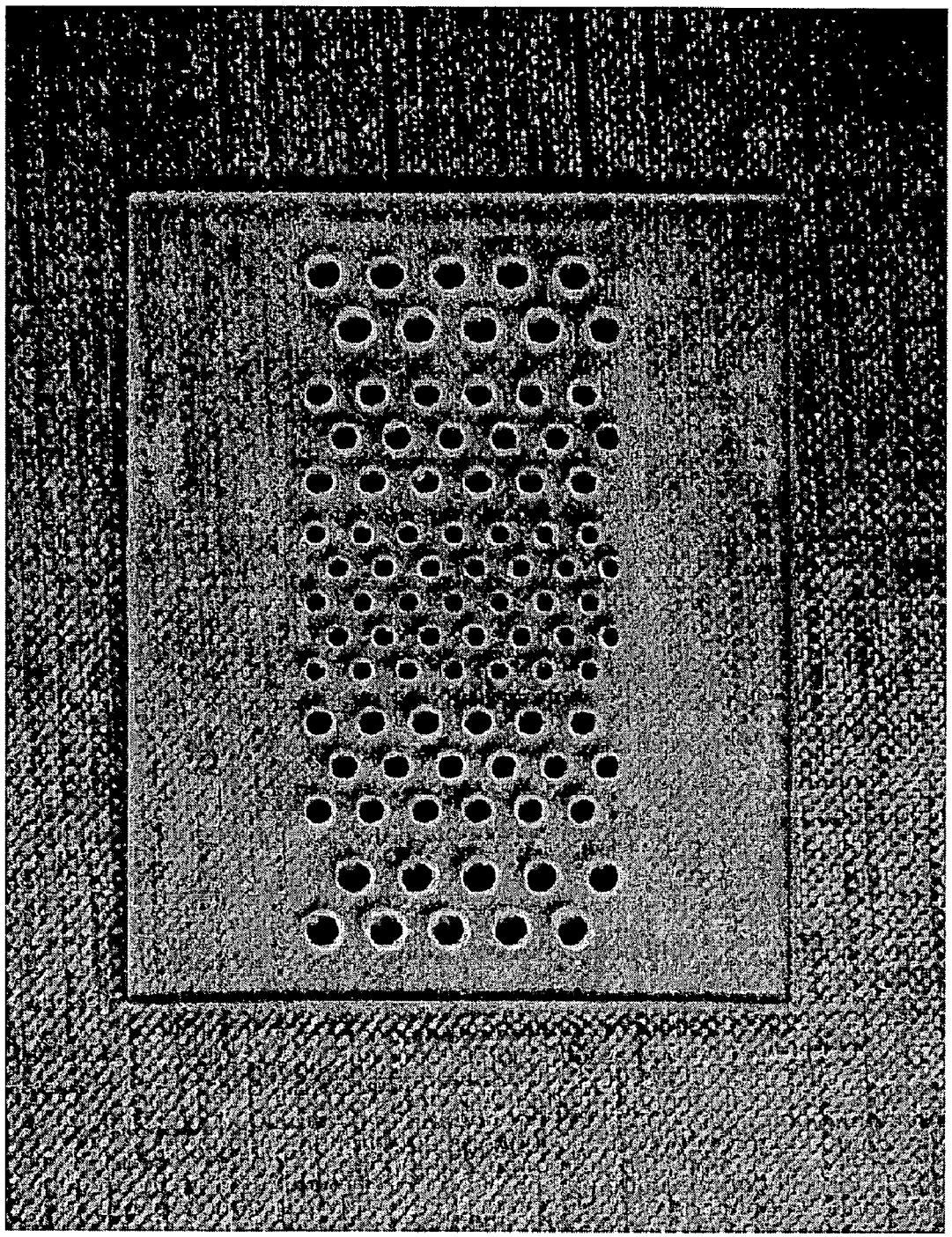
FIG. 4 is a front view of an exemplary face plate fabricated for a rectangular cross flow module according to the present disclosure.

Since the modules received from AMT, Inc. provided only rectangular channels having coated hollow fibers running across the system and two open faces, a diverging section and a converging section were designed and fabricated to allow the liquid to flow uniformly in cross flow outside of and perpendicular to the fibers. The diverging section and the converging section included two boxes having a curved shape (see FIG. 3). Two face plates were made from two flat plastic sheets. On each sheet, ninety one (91) smaller holes having a wide size distribution were formed. The hole sizes were distributed such that the holes at the center were smaller, while those further away were progressively larger (see FIG. 4). This design ensured that the feed solution flowed uniformly through the shell side of the fibers. The material used in fabricating the face boxes and face plates was clear cast acrylic plastic of conventional thickness and heat transfer resistance.

Figure 5:
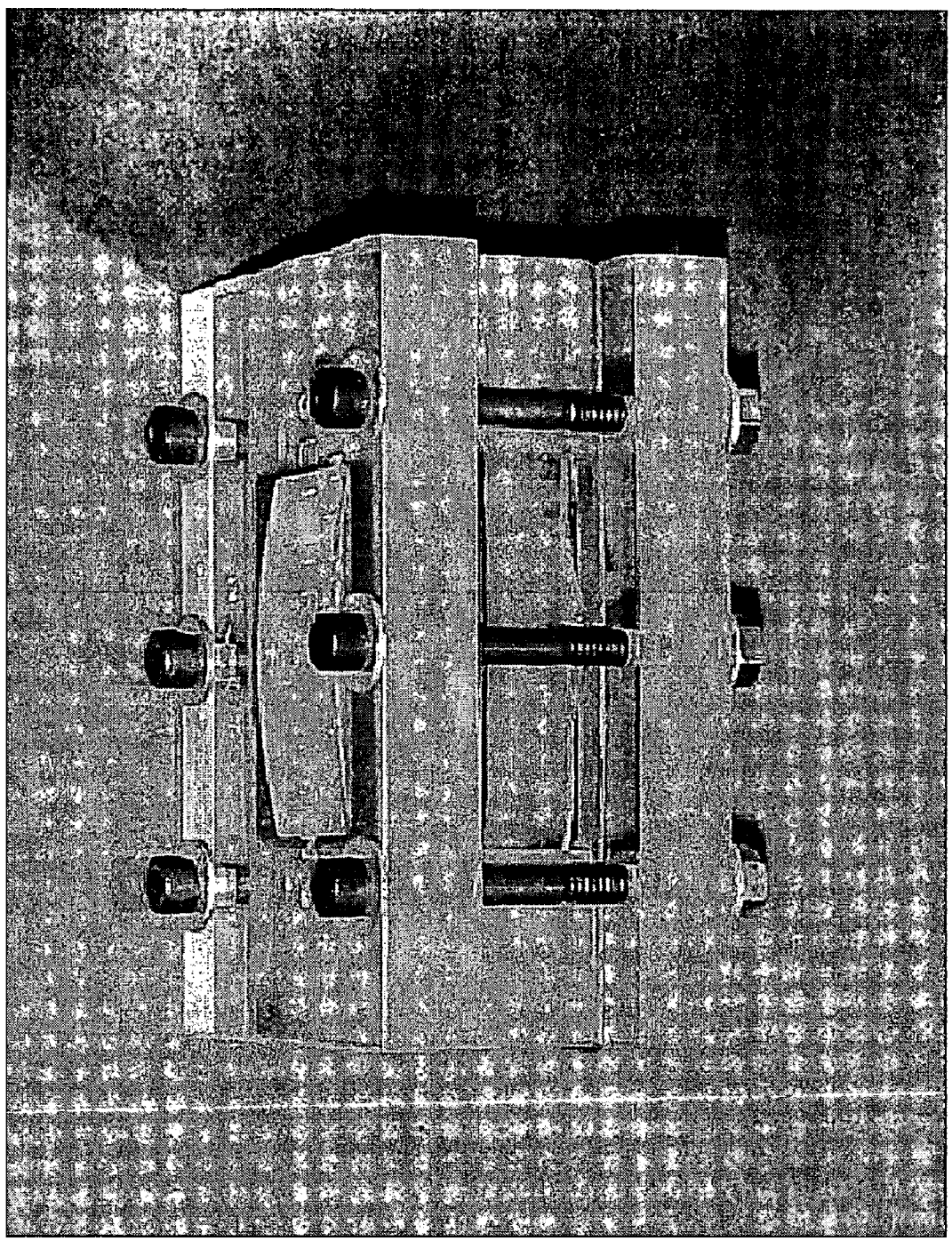
FIG. 5 is a perspective view of an exemplary rectangular cross flow module assembly.

Two face boxes and face plates were assembled with a rectangular membrane module channel to constitute the complete device (see FIG. 5). Neoprene gaskets (⅙□) were used between the face box, the face plate and the module channel on each side to create a seal between the respective parts. Hot brine was allowed to enter one face box, then exit the box through the face plate holes which distributed the liquid flow evenly, and then enter the flow channel. On the other side, the liquid exited the channel through the face plate holes and collected in the face box, then flowed beyond the box and thus the module. By the exemplary design described herein, there was no free space between the faces of the two boxes and the fiber layer. Therefore, the liquid crossed the fiber layer uniformly and perpendicularly to ensure good heat and mass transfer.

Experimental Apparatus and Procedures

Figure 6:
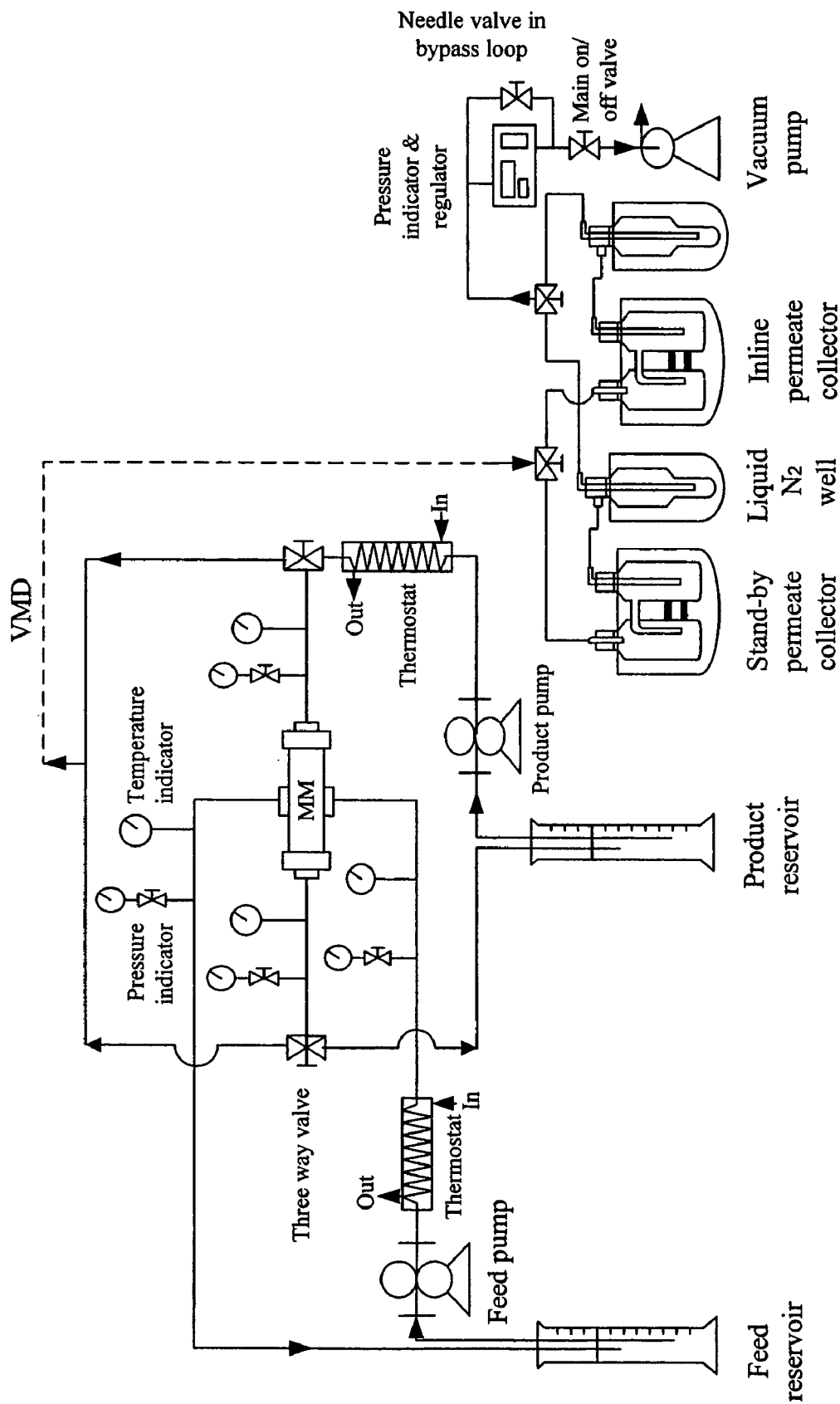
FIG. 6 is a flow diagram of an exemplary membrane distillation system according to the present disclosure pursuant to which both DCMD and VMD processes may be operated.

The experimental apparatus for this initial phase was developed such that either the DCMD process or the VMD process could be studied easily. The change from DCMD to VMD or from VMD to DCMD could be easily implemented by operating two three-way valves. A schematic of an exemplary system of the present disclosure is shown in FIG. 6. A summary of the project tasks is provided below for reference of persons skilled in the art:

Task 1. Develop laboratory-scale cross flow hollow fiber membrane modules having an appropriate coating on the fibers.

Task 2. Study the VMD behaviors of different membrane modules obtained in Task 1.

Task 3. Study the DCMD behaviors of different modules found promising in Task 2.

Task 4. Study the DCMD behavior of a promising module selected from Task 3 for an extended period.

Task 5. Develop a preliminary cost estimate for DCMD-based desalination of brine.

Task 6. Prepare and analyze data.

Experimental Set-Up and Operation

DCMD: In the setup for DCMD operation shown in FIG. 6, deionized water or saline water feed was introduced to the shell side from a reservoir by a digital Masterflex peristaltic pump (Model No. 77601-10 with L/P 82 tubing) at a constant flow rate (the flow rates of the liquid system can be varied between 400-13,000 ml/min). The connecting tubing was immersed in the water bath before the feed entered the module. Two HAAKE temperature controllers (Model No. D-76227) maintained the bath temperature at a given value and thus maintained a constant entrance temperature for the hot feed. Outside the membrane module, the feed was circulated to the feed reservoir and was re-warmed.

Deionized water was introduced as a cooling liquid on the fiber lumen side of the module from a reservoir by another digital Masterflex peristaltic pump (Model No. 7518-60) at a constant flow rate. The connecting line was immersed in a Cole-Parmer Polystat refrigerated bath (Model No. 12111-20) at a given low temperature before the water entered the module. The inlet and outlet temperatures of the hot feed and the cold water were measured by four thermocouples connected to a Cole-Parmer temperature monitor (Model No. 90610-10). The electrical conductivity or the salt concentration of the samples was measured by a conductivity meter (Model No. 115, Orion Research, Beverly, Mass.).

When the readings of the flow rates of the hot solution, cold distillate water and the four inlet and outlet temperatures reached constant values, it was assumed that the operating conditions had reached a steady state. From that point, the volume increase in the cooling water reservoir was used to calculate the water vapor flux through the membrane under the given experimental conditions. Water vapor flux was calculated from the following relation:

$$\text{Water vapor flux}\left(\frac{kg}{m^2-h}\right) = \frac{\text{vol. of water transferred(l)} \times \text{density of water(kg/l)}}{\text{membrane area(m}^2) \times \text{time(h)}} \quad (1)$$

The membrane area was calculated based on hollow fiber inside area: $s=n\pi d_i L$.

VMD: In the setup for VMD, as shown in FIG. 6, hot deionized water or saline water was introduced as a feed to the fiber lumen side or shell side from a reservoir by a digital Masterflex peristaltic pump at a constant flow rate. The feed pipeline was immersed in the water bath before the feed entered the module. The bath temperature was maintained by two temperature controllers at a given level so as to maintain a constant entrance temperature for the hot feed. The exit on the other side of the module was connected to an evacuation system to maintain vacuum by a Fisher Scientific vacuum pump (Model No. M8C). The vacuum was monitored by a J-KEM Scientific digital vacuum regulator (model 200) and controlled by means of a needle valve attached to the bypass loop of the regulator at a preset pressure within ±1 mm Hg. Two glass vacuum traps (United Lab Glass, Richmond, Calif.) immersed in two liquid $N_2$ wells (Dewar flask; Lab Glass Inc., Vineland, N.J.) and connected in series to the vacuum pump were used to collect the permeate vapor.

Before measurement of the water vapor flux, the three-way ball valves attached between the vacuum pump and the vacuum traps were switched to connect the vacuum pump with the inline permeate collector. When the vacuum reached the designated value, the three-way ball valve was switched to the stand-by trap. Then another three-way ball valve, attached between the hollow fiber module and the vacuum trap, was switched over to the stand-by vacuum trap. After stabilization of the vacuum in the stand-by trap (its vacuum value was the same as the value in the inline permeate collector), both valves were switched to inline permeate collector at the same time to start to collect the permeate vapor. Permeate vapors were collected for a fixed interval of time in the inline permeate collector. This trap was then isolated from the system for sampling purposes by a pair of three-way ball valves while the stand-by vacuum trap was brought online. The isolated vacuum trap was then removed from the liquid $N_2$ well and its temperature was allowed to rise to room temperature. The electrical conductivity or the salt concentration in the samples was measured by a conductivity meter.

The weights of the inline permeate collector were taken before and after permeate collection for calculation of water flux. Water vapor flux was calculated from the following:

$$\text{Water vapor flux}\left(\frac{kg}{m^2-hr}\right) = \frac{\text{wt. of condensed water(kg)}}{\text{membrane area(m}^2) \times \text{time(hr)}} \quad (2)$$

The calculation was based on the fiber inside area; membrane area $s=n\pi d_i L$.

Leak Testing: All membrane modules listed in the tables of FIGS. 39a and 39b were tested for leakage before DCMD and VMD measurements. Before the leak tests, each membrane module was activated by circulating deionized water in the shell side and tube side at a very low flow rate and at room temperature for at least ten (10) hours. Then the module was assembled in the DCMD system. 1% NaCl solution at 85° C. flowed through the shell side at a constant flow rate between 600-2000 ml/min, and deionized water flowed through the tube side at room temperature. The conductivity of the distillate was monitored with increasing saline flow rate. If a rise in conductivity of the distillate water was noted with operating time, the test membrane module was leaking. Otherwise, the test membrane module was leak free. After the DCMD leak testing, the leak-free membrane module from DCMD tests was tested under VMD. The procedure of VMD leak testing was the same as the DCMD test procedure, except as follows: exchange the circulating deionized water in tube side under DCMD with vacuum. The presence of water in the vacuum line indicated leakage.

The leak testing indicated that module MXFR #2 was leaking even at a low brine flow rate or inlet pressure; Module MXFR #1 started leaking while the flow rate at the shell side was over 1200 ml/min. The other modules did not appear to leak under conditions used in VMD and DCMD test procedures. The gauge pressures of the flowing liquids in DCMD tests were around 3 psi (15.6 cmHg gauge).

Figure 7:
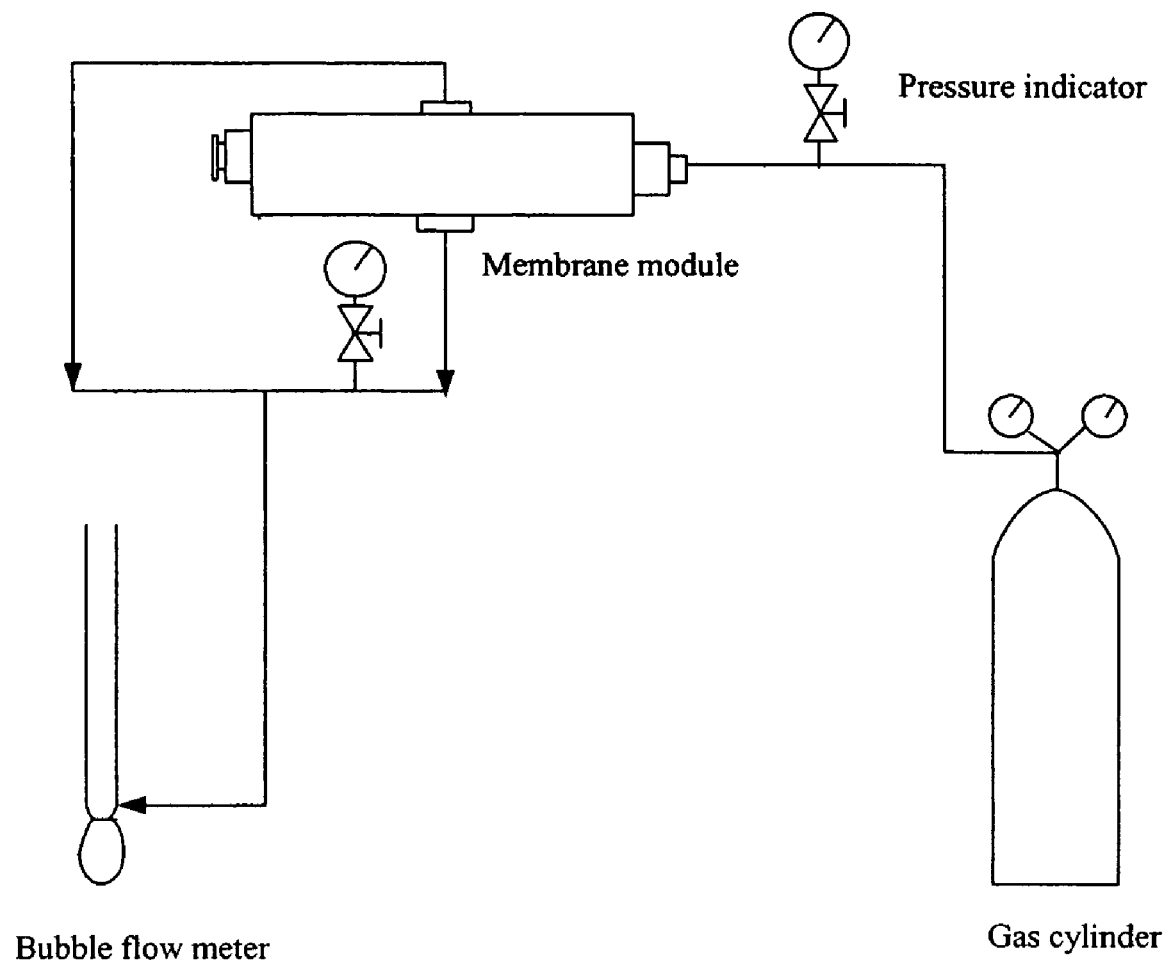
FIG. 7 is a flow diagram of an exemplary system layout for membrane gas permeation measurements according to the present disclosure.

Gas Permeation: A system was also established for the measurement of gas permeance of the coated porous hollow fiber membranes using a gas permeation apparatus (see FIG. 7). The $N_2$ gas from the cylinder permeated through the membrane from the tube side to the shell side. The upstream and downstream pressures were measured by an Ashcroft Test Gauge (PT. No. 63-5631). The downstream flow rate of the gas was measured using a soap bubble flow meter. During the permeation measurements, the upstream pressure was maintained at a constant pressure, between 0.1-0.6 psig (0.5-3.1 cmHg gauge). The permeation measurements were made at room temperature. The permeant gas was $N_2$.

The $N_2$ permeance of the hollow fiber membranes is related to the measured steady-state permeation rate of nitrogen through the membrane by Eq. (3):

$$\frac{Q_{N_2}}{\delta_M}(\text{permeance}) = \frac{P_1 V_1 T_0}{P_0 T_1 \cdot s \cdot \Delta P_{N_2}} \quad (3)$$

In Eq. (3), $T_0=273.15$ K, $P_0=760$ Torr, $\Delta P_{N_2}$ corrected to STP is pressure difference across the membrane, s is the inside membrane area, $P_1$ is the atmospheric pressure, $T_1$ is the room temperature, $V_1$ is the volume flow rate of gas through the membrane during measurement at room temperature, $Q_{N_2}$ is the permeability coefficient of $N_2$ permeation through the membrane of effective thickness $\delta_M$.

Calculation of Reynolds numbers: Reynolds number is normally defined as follows:

$$Re = \frac{D \times V \times \rho}{\mu} \quad (4)$$

Where: Re: Reynolds number; D: characteristic dimension; V: velocity; ρ: density; μ: dynamic viscosity (absolute viscosity).

In Tasks 2, 3 and 4 (identified above), the Reynolds numbers of the feed or the distillate flowing through the shell or the tube side were defined as diameter-based Reynolds number ($Re_d$). In the calculation of $Re_d$ based on Eq. (4), fiber I.D.

($d_i$) and linear velocity are used for tube side parallel flow, and fiber O.D. and interstitial velocity for shell side cross flow.

Interstitial velocity=brine flow rate/open area for flow through the shell side  (5)

The open area for flow through the shell side is set forth at the bottom of the tables in FIGS. 39a and 39b.

Linear velocity=flow rate/open area for flow through the tube side  (6)

In the literature, boundary layer heat transfer coefficients are almost always estimated from empirical correlations. For laminar flow in a circular tube (i.e., fiber lumen), the Sieder-Tate equation is popularly employed (Gryta et al., 1997; Hobler, 1986):

$$Nu_p=1.86(d_iRe_dPr/L)^{0.33}(\mu/\mu_w)^{0.14} \quad (7)$$

where Nusselt number, $Nu_p=h_p d_i/k$, $Re_d=V_L d_i \rho/\mu$ and the Prandtl number, $Pr=c_p\mu/k$. Further $h_p$ is the tube side boundary layer heat transfer coefficient, $d_i$ is the tube/fiber I.D., k is the liquid thermal conductivity, $\mu_W$ is the liquid viscosity evaluated at the tube-wall temperature, $c_p$ is the liquid heat capacity, and L is the tube length. The viscosity correction factor $(\mu/\mu_w)^{0.14}$ normally is negligible for MD applications (Lawson and Lloyd, 1996b). Equation (7) is suitable for laminar tubular flow conditions ($Re_d$<2100).

No publication addressing the calculation of the boundary layer heat transfer coefficient of liquid flowing on the shell side of rectangular cross flow hollow fiber modules has been located. The Zukauskas equation is often used in the calculation of the Nusselt number for cross flow over tube bundles in heat exchangers when $10<Re_d<5\times10^2$ (Incropera and Dewitt, 2002; Kreith and Bohn, 2001):

$$Nu_f=1.04Re_d^{0.4}Pr^{0.36}(Pr/Pr_w)^{0.25}F_c \quad (8)$$

where Nusselt number, $Nu_f=h_f d_o/k$. Further $h_f$ is the shell side boundary layer heat transfer coefficient, $d_o$ represents the tube/fiber O.D., $Pr_w$ is the Prandtl number evaluated at the tube-wall temperature, $F_c$ is the tube-row correction factor. All properties except $Pr_w$ are evaluated at arithmetic mean of the fluid inlet and outlet temperatures.

These equations are provided as a basis for using $Re_d$ in reporting data herein, even though there is a potential issue due to fibers potentially moving and any irregularity of flow from the entrance section. Further, the velocity used in $Re_d$ is the interstitial velocity which takes into account the fiber packing density.

Definitions of heat transfer coefficients: At steady state, the effective heat flux at the two liquid-membrane interfaces (see FIG. 1f) may be described by:

$$Q=h_fA_{rf}(T_f-T_{fm})=h_fA_{rf}\Delta T_F=h_pA_{rp}(T_{pm}-T_p)=h_pA_{rp}\Delta T_p, \quad (9)$$

where Q is the effective heat flux through the membrane, $\Delta T_F$ is the temperature difference between brine bulk temperature, $T_f$ and the temperature of the brine-membrane interface on the feed side, $T_{fm}$, $\Delta T_p$ is the temperature difference between the temperature of the membrane-distillate interface, $T_{pm}$, and the distillate bulk temperature on distillate side, $T_p$. In the hollow fiber module, the membrane thickness is comparable with the inside diameter of the fiber. This results in considerable difference between the outside and inside area of the hollow fiber membrane. In this case, a change of the membrane surface area for heat transfer should be taken into account. Here, $A_r$ is the area ratio for the heat transferred through the membrane. Since the internal diameter-based surface area is used herein, therefore $A_{rf}$ for the interfacial area between the hot brine and the O.D. is $(d_o/d_i)$; the corresponding $A_{rp}$ is $(d_i/d_i)=1$.

At the pore mouth on the membrane surface, water from the brine is vaporized; the heat flux transferred by this vapor flux across the membrane is:

$$Q_V=h_vA_{r\,ln}(T_{fm}-T_{pm})=h_vA_{r\,ln}\Delta T_m=N_VA_{r\,ln}\Delta H_V \quad (10)$$

where $h_v$ is the heat transfer coefficient related to the water vapor flux, $\Delta T_m$ is the trans-membrane temperature difference ($T_{fm}-T_{pm}$), $N_V$ is the mass flux of water vapor across the membrane and $\Delta H_V$ is the heat of vaporization/mass of water. The surface area ratio ($A_{r\,ln}$) is defined as $(d_{r\,ln}/d_i)$ where $d_{r\,ln}$ is the logarithmic mean diameter, $((d_o-d_i)/\ln(d_o/d_i))$.

Heat is additionally conducted through the nonporous solid polymeric part of the membrane and the gas phase that fills the pores at a rate:

$$Q_m=h_mA_{r\,ln}(T_{fm}-T_{pm})=h_mA_{r\,ln}\Delta T_m \quad (11)$$

where $h_m$ is the membrane heat transfer coefficient. Further:

$$h_m=\epsilon h_{mg}+(1-\epsilon)h_{ms} \quad (12)$$

where $\epsilon$ is the membrane porosity, and $h_{mg}$ and $h_{ms}$ represent the heat transfer coefficients of the vapor/gas within the membrane pores and the solid polymeric membrane material respectively. The coefficient $h_{mg}$ is generally an order of magnitude smaller than $h_{ms}$; for example, the thermal conductivities of polypropylene (PP), air and water vapor are respectively $k_{PP}$=0.17 W/m-K, $k_{air}$=0.03 W/m-K and $k_{watervapor}$=0.025 W/m-K in the temperature range from 20° C. to 100° C. Therefore, the value of $h_m$ is minimized by maximizing the membrane porosity; as disclosed herein, advantageous DCMD processing may be achieved by providing high porosity and high wall thickness membranes so that conductive heat loss through the membrane can be reduced considerably. The plasmapolymerized microporous/porous coating introduces a factor which may be considered an unknown at this time for modeling purposes.

The total effective heat flux across the membrane, Q, is related to $Q_V$ and $Q_m$ by:

$$Q=Q_V+Q_m=(h_v+h_m)A_{r\,ln}\Delta T_m \quad (13)$$

Since the heat transfer mechanism in DCMD is described as a series of resistances, the overall heat transfer coefficient of the DCMD process, U, is conventionally obtained as a series of resistances defined here with respect to $A_{rp}$: brine film resistance $(1/h_f)$, effective membrane resistance $(1/h_c)$ and distillate film resistance $(1/h_p)$:

$$UA_{rp} = \left[\frac{1}{A_{rf}h_f}+\frac{1}{A_{rln}h_c}+\frac{1}{A_{rp}h_p}\right]^{-1} \quad (14)$$

where $$h_c = h_m + h_v = h_m + \frac{N_V\Delta H_V}{\Delta T_m} \quad (15)$$

Incorporation of expression (15) in relation (14) leads to the following complex relationship between the overall heat flux Q and the mass flux of water vapor $N_V$:

$$Q = \left[\frac{1}{A_{rf}h_f}+\frac{1}{A_{rln}h_m+N_VA_{rln}\Delta H_V/\Delta T_m}+\frac{1}{A_{rp}h_p}\right]^{-1}\Delta T = UA_{rp}\Delta T \quad (16)$$

where $\Delta T$ is the bulk temperature difference, $T_f-T_p$; the value of $A_r$ for U depends on the basis of calculation, it can be $A_{rf}$ or $A_{rp}$, or $A_{r\,ln}$. For purposes herein, $A_{rp}$ is taken as the basis.

Of the two components of the membrane heat transfer coefficient, $h_c$, the component $h_v$ is responsible for the most important quantity in DCMD, namely, the water vapor flux. To maximize the latter for a given $h_v$, $\Delta T_m$ should be maximized which in turn will maximize $N_V$ by increasing the temperature $T_{fm}$ which determines the vapor pressure of water at the brine-membrane pore mouth. The value of $T_{fm}$ is usually described via the temperature polarization coefficient (TPC):

$$TPC = \frac{T_{fm} - T_{pm}}{T_f - T_p} = \frac{\Delta T_m}{\Delta T} \qquad (17)$$

TPC is the fraction of external applied thermal driving force that contributes to the mass transfer. If an overall boundary layer heat transfer coefficient h is defined via:

$$\frac{1}{hA_{rln}} = \frac{1}{A_{rf}h_f} + \frac{1}{A_{rp}h_p} \qquad (18)$$

then TPC can be defined by:

$$TPC = \frac{\Delta T_m}{\Delta T} = 1 - \frac{UA_{rp}}{hA_{rln}} \qquad (19)$$

Temperature polarization has a negative influence on the productivity of the membrane distillation process as a consequence of the decrease in the temperature of the brine (therefore, the water vapor pressure) on the evaporation surface and its increase on the condensation surface. Ideally, TPC should equal 1, but usually it is lower.

Experimental Results and Discussion

VMD Performances (Task 2)

VMD performances of all leak-free membrane modules listed in the tables of FIGS. 39a and 39b have been determined. The effects of the inlet temperature, feed velocity, module flow configuration (parallel flow or horizontal cross flow), and the brine feeding mode (shell side or lumen side) on the water vapor flux and the outlet temperature were investigated.

Figure 8:
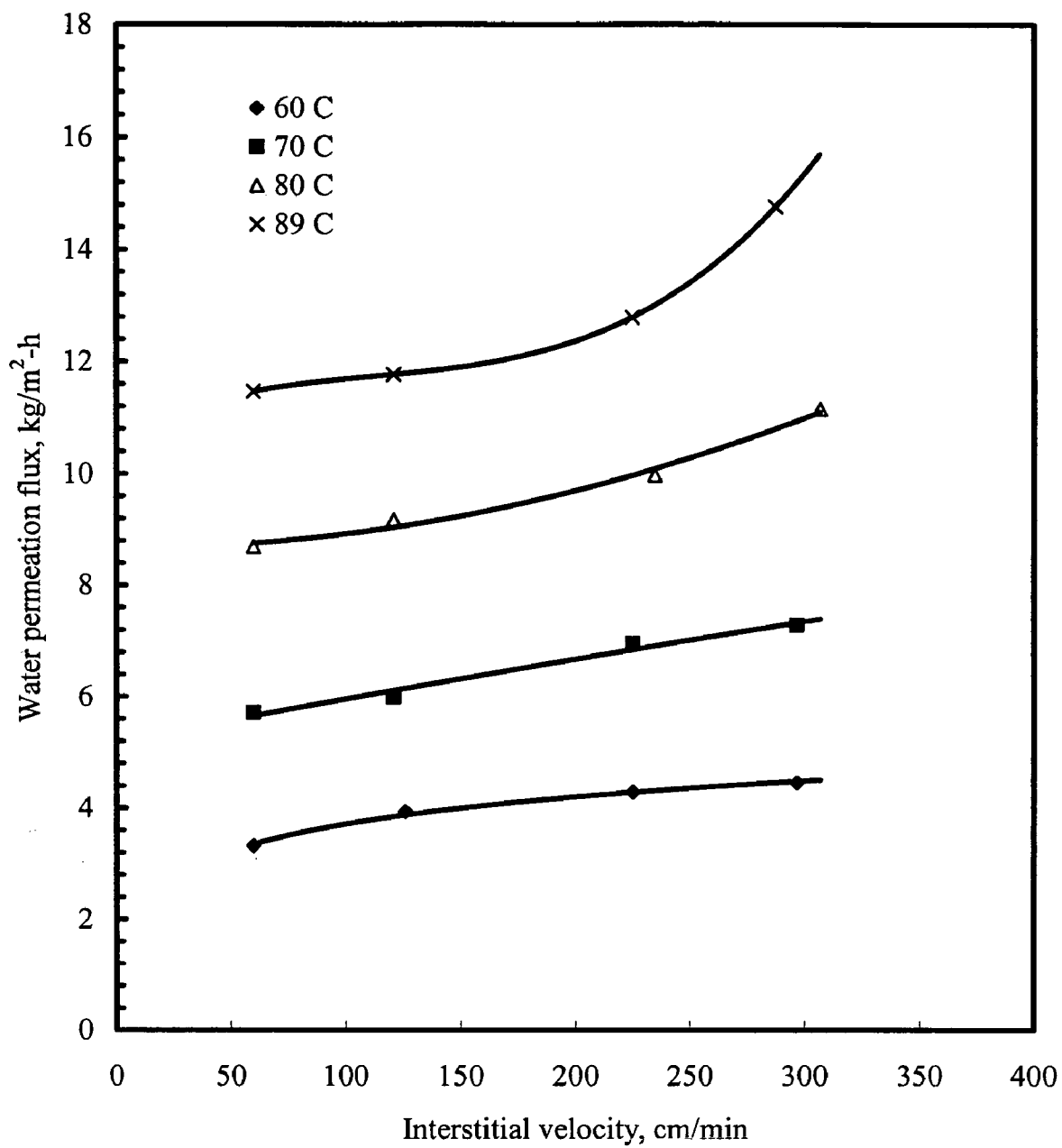
FIG. 8 is a plot showing variations of water vapor flux with interstitial velocity of hot brine for VMD (module MXFR #6) according to an embodiment of the present disclosure.
Figure 9:
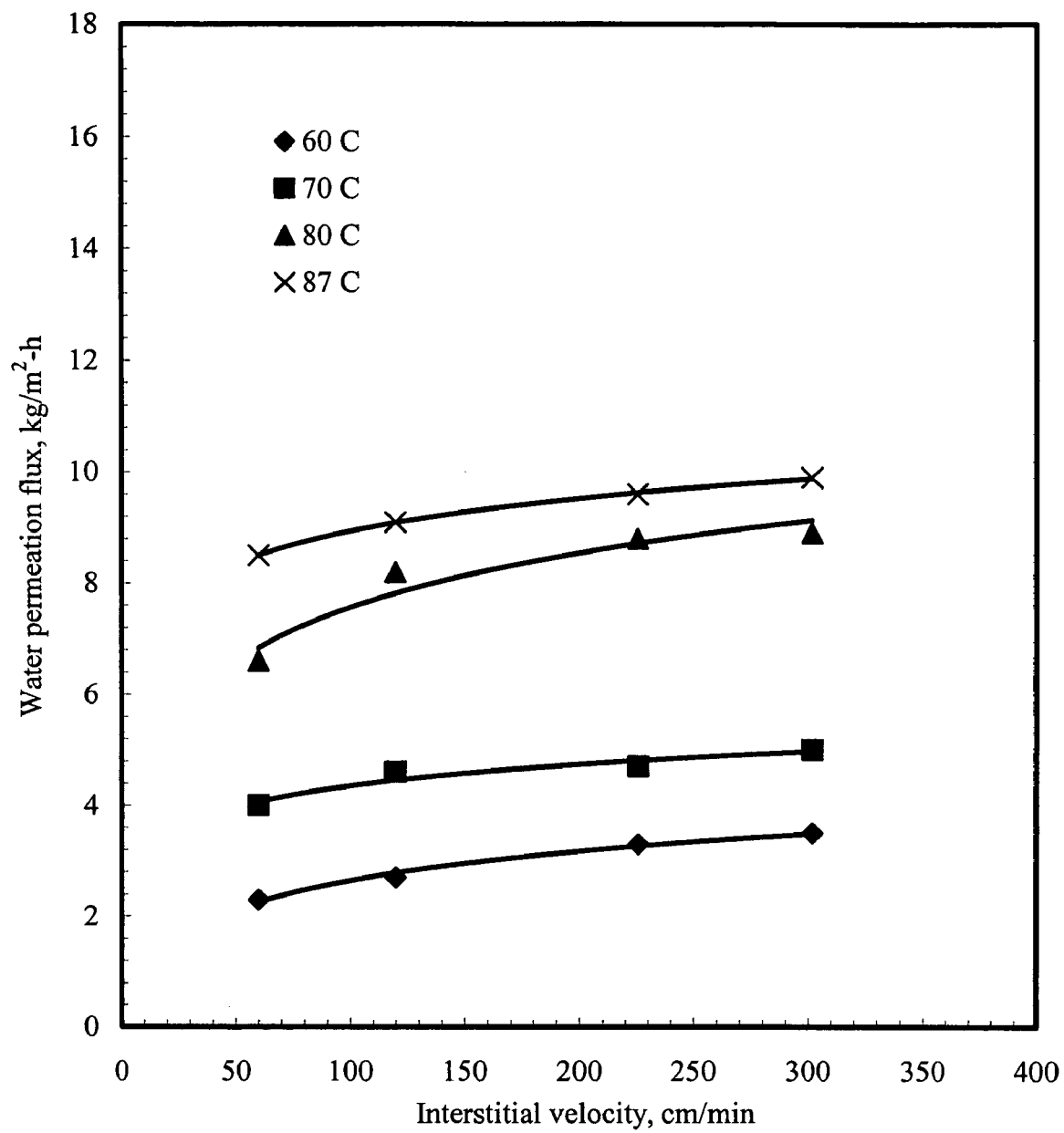
FIG. 9 is a plot showing variations of water vapor flux with interstitial velocity of hot brine for VMD (module MXFR #7) according to an embodiment of the present disclosure.

The modules MXFR #6 and MXFR #7 have the same support hollow fiber membrane (polypropylene 50/200), but different coatings. The gas permeation experimental results showed that MXFR #7 has smaller final pore dimensions than MXFR #6 (see the table set forth in FIG. 40). MXFR #6 displayed higher VMD-based water vapor flux than MXFR #7. This shows that the coating in MXFR #7 provides more resistance to water vapor transfer. Typical VMD experimental data according to the present disclosure are shown in the plots of FIGS. 8 and 9. As the temperature of the hot saline feed was increased, the water permeation flux was increased. Also, the water permeation flux increased with an increase in the interstitial velocity of the feed through the shell side.

Normally the liquid flow regime is characterized by its Reynolds number. The effect of Reynolds number of the rectangular cross flow at the shell side on the water vapor flux is summarized in the tables of FIGS. 41 and 42. Both temperature and the flow rate of the feed solution have obvious effects on Reynolds number. At a given feed temperature, the Reynolds number increases with the increasing velocity of the feed, which causes the water vapor flux to increase (FIG. 42). Compared to the flow rate, feed temperature has a small effect on the Reynolds number at a given flow rate. That is because there are only limited changes in the density and viscosity of water in the given temperature range. But the effect of temperature on the water vapor permeation flux is striking. The increase of temperature not only increases the Reynolds number, but also drastically increases the water vapor pressure which is the driving force (FIG. 41). So optimization of the flow rate and feed temperature is an effective way to contribute to high water vapor permeation flux in VMD according to the present disclosure.

Figure 10:
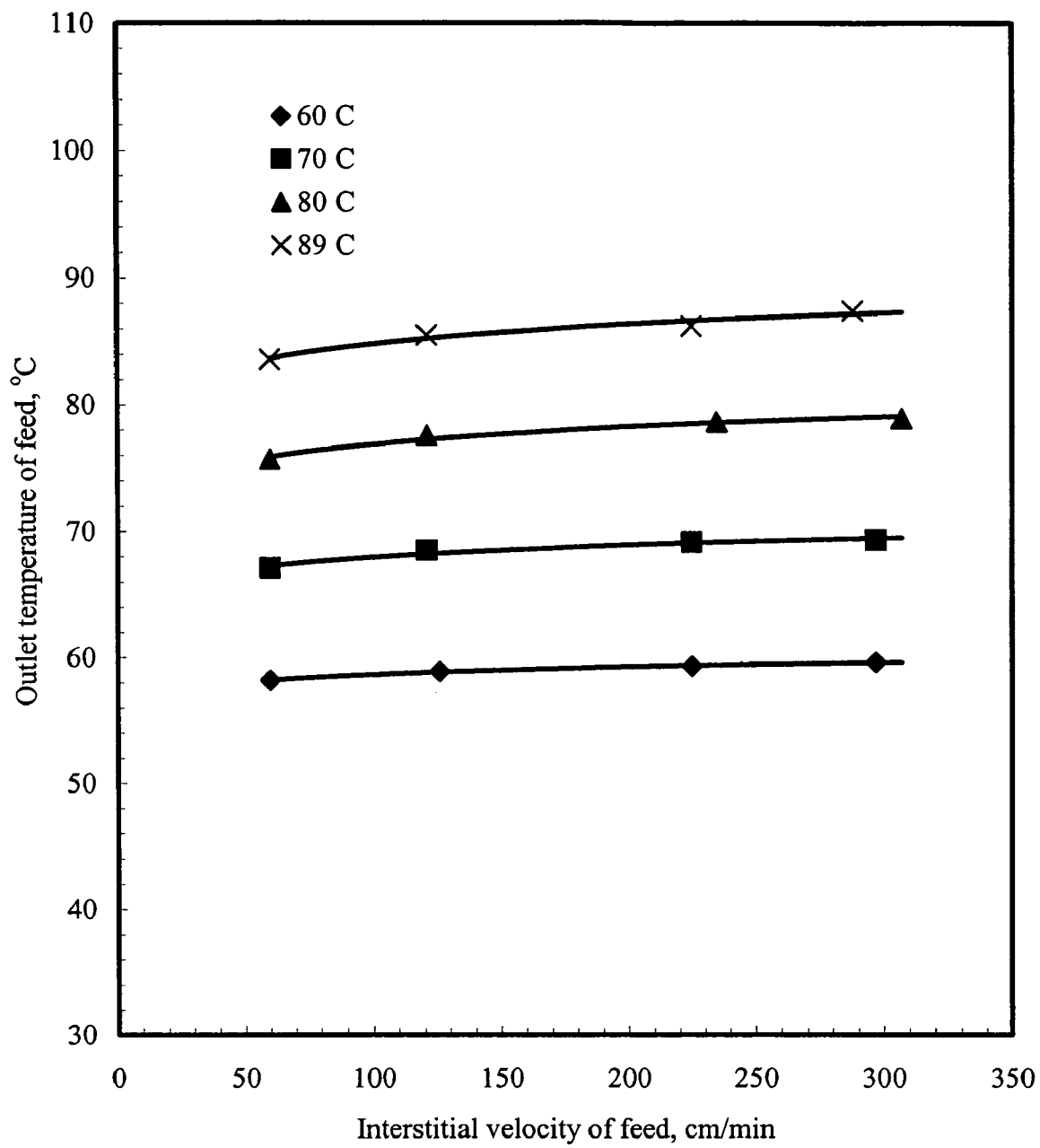
FIG. 10 is a plot showing variations of outlet temperature with interstitial velocity of hot brine for VMD (module MXFR #6) according to an embodiment of the present disclosure.
Figure 11:
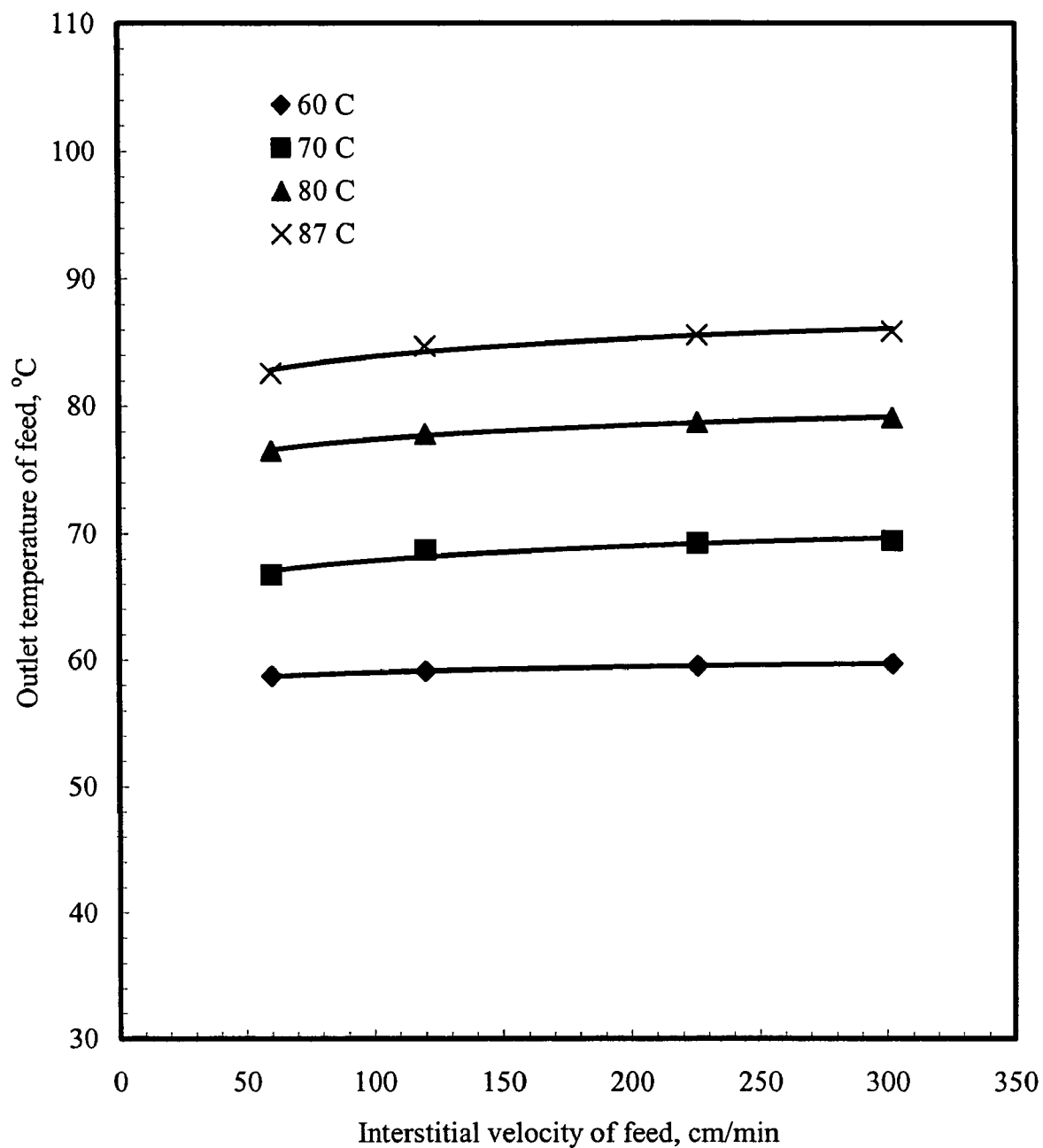
FIG. 11 is a plot showing variations of outlet temperature with interstitial velocity of hot brine for VMD (module MXFR #7) according to an embodiment of the present disclosure.

There is another factor that leads to a high water vapor flux at a high feed flow rate. The increase of feed flow rate decreases the residence time of feed in the module, and increases the feed outlet temperature, which increases the driving force and the Reynolds number in a limited way. FIGS. 10 and 11 illustrate the variation of the feed outlet temperature with its interstitial velocity. It is readily apparent that the temperature difference between the inlet temperature and the outlet temperature becomes larger with an increase of the inlet temperature. That is because the high water vapor flux at a higher temperature causes more heat removal from the feed solution needed for water evaporation. For the same reason, the higher water vapor flux of MXFR #6 is the reason why MXFR #6 has a much higher temperature difference between feed inlet temperature and outlet temperature than MXFR #7 at a given feed inlet temperature.

The effect of the flow mode on VMD performance of membrane modules MXFR #6 and MXFR #7 is summarized in the table set forth in FIG. 43. Compared to parallel flow, cross flow can reduce temperature polarization considerably and achieve much higher heat transfer coefficients at a similar Reynolds number. So cross flow of hot brine on the outside diameter of the hollow fiber membranes is effective in achieving a high water vapor flux in VMD. The membrane modules show much higher water vapor flux in cross flow than that in parallel flow. (As demonstrated below, the fact that deionized water was used for parallel flow and 1% brine for cross flow is of no consequence).

The details on all hollow fiber membrane modules received from AMT, their gas permeation properties, and their performances in VMD (and DCMD) under particular conditions are summarized herein (see FIG. 40). In all cases, the hot deionized water flowed through the tube side at 85° C. and the vacuum was between 60-66 cmHg at the shell side; the water vapor fluxes of these modules displayed a trend identical to their $N_2$ permeance trend. The gas permeance data illustrate the resistance to $N_2$ permeation through the microporous/porous coating and the porous substrate. Among the modules set forth in FIG. 40, the coating opening of MXFR #3 is largest, the fiber porous structure is very open, and its VMD water vapor flux is highest (15.6 kg/m²-h). High porosity of the hydrophobic support membrane and appropriate hydrophobic coating openings/thickness are therefore quite valuable for achieving advantageous membrane distillation according to the present disclosure.

Figure 12:
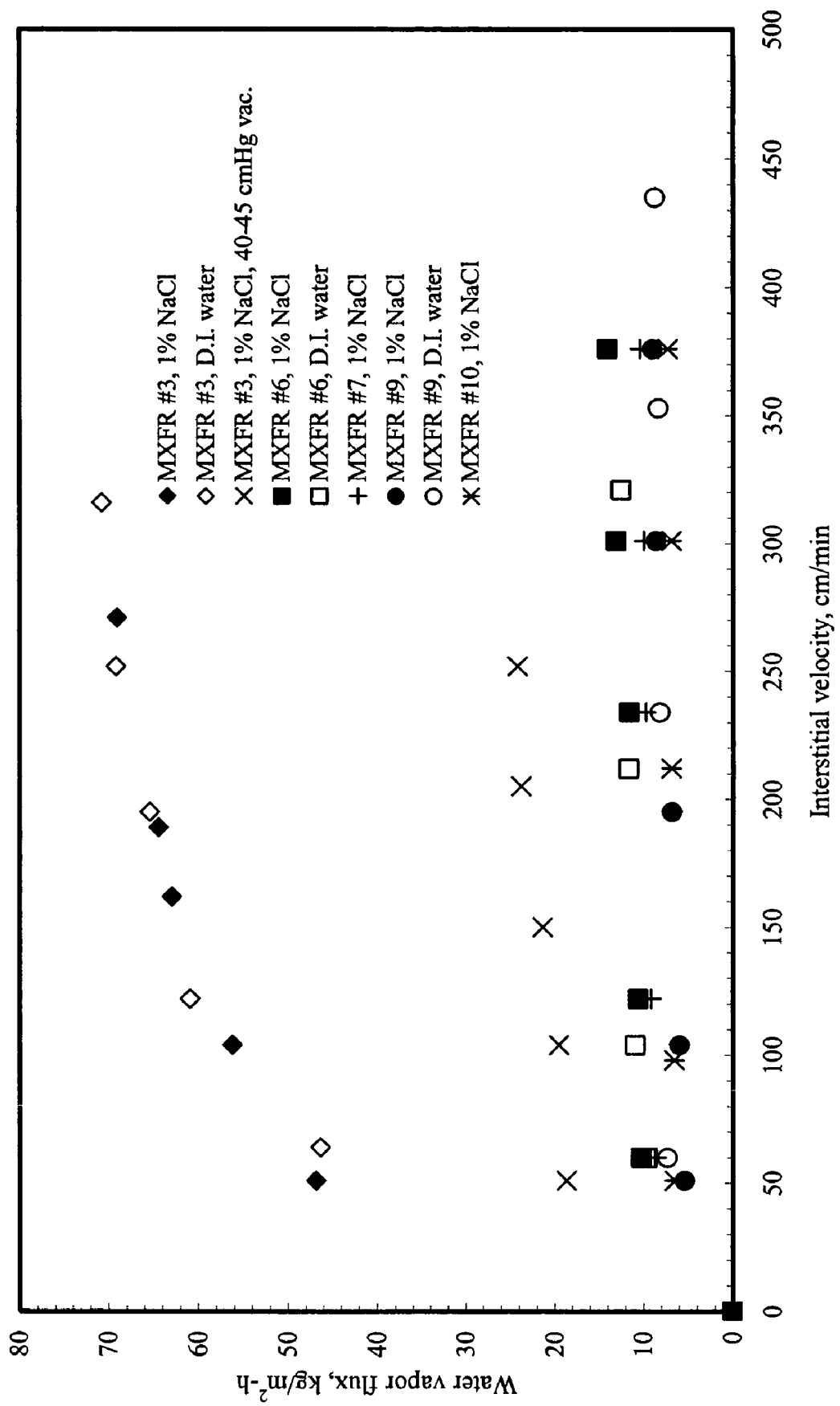
FIG. 12 is a plot showing variations in water vapor flux relative to interstitial velocity for VMD for various modules.

FIG. 12 shows data obtained using various membrane modules for VMD for hot feed flowing through the shell side at 85° C. The interstitial velocity of feed was varied from 50 cm/min to 435 cm/min. Deionized water as well as 1% brine were used. The vacuum level was varied between 60 cmHg and 66 cmHg. Module MXFR #3 yielded a water vapor flux of 46 kg/m²-h to 71 kg/m²-h as the Reynolds number was varied from 28 to 95. These water vapor flux values are quite high for a hollow fiber membrane module in VMD. The performances of MXFR #6, MXFR #7, MXFR #9 and MXFR #10 were notably inferior to that of MXFR #3. The difference in water vapor flux is likely due to a difference in the resistance based on the coating layer and substrate since MXFR #3 has a much higher $N_2$ permeation rate than the other four modules (see FIG. 40).

Figure 13:
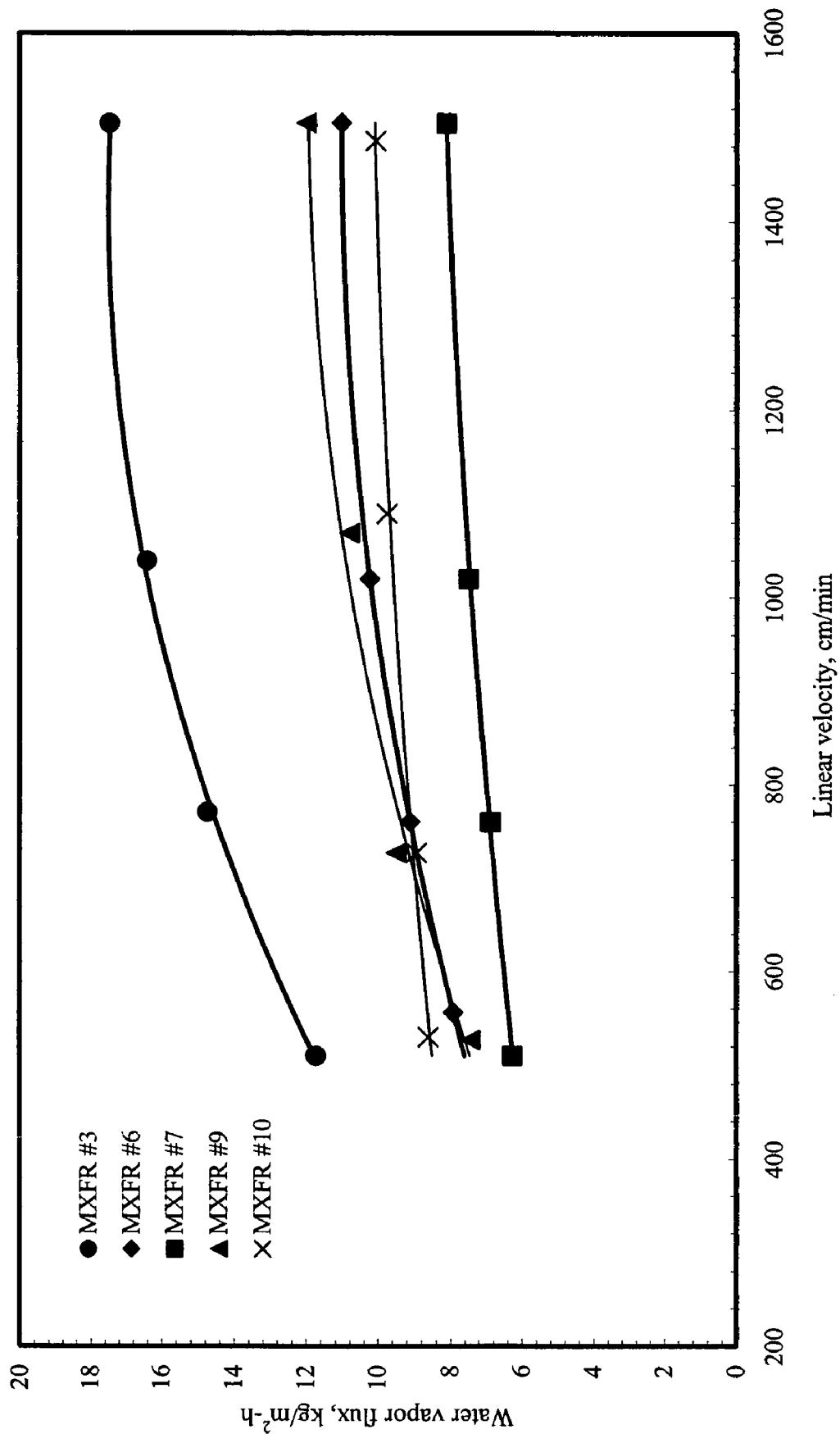
FIG. 13 is a plot showing variations in water vapor flux relative to linear velocity for VMD for various modules.

FIG. 13 illustrates the variation of water vapor flux in modules MXFR #3, MXFR #6, MXFR #7, MXFR #9 and MXFR #10 with the flow rate of hot deionized water when the feed flowed on the fiber lumen side at an inlet temperature of 85° C. It was found that the rectangular cross flow modules MXFR #6, MXFR #7, MXFR #9, MXFR #10 and the parallel flow module, i.e., Module 4 had water vapor fluxes much lower than those of MXFR #3, whether the feed flowed on the tube side or the shell side in VMD (see FIG. 40). The module configurations (parallel flow in tube side and cross flow in shell side) did not show significant influence on the fluxes of modules MXFR #6, MXFR #7, MXFR #9 and MXFR #10, which further supports the conclusion that the resistance comes mainly from the membrane for water vapor permeation in these four modules. For MXFR #10, the water vapor flux was almost independent of the feed flow rate, especially when the feed flows on the shell side. Being quite different from these modules, MXFR #3 not only has a very high water vapor flux for feed flowing on the shell side, but also a high flux value (reaching 17.5 kg/m²-h) for feed flowing on the tube side at an inlet temperature of 85° C. As shown in FIGS. 39a, 39b and 40, the difference between MXFR #3 and the other modules is that MXFR #3 has a larger I.D. and O.D., higher porosity and more open surface (higher $N_2$ permeance), which allows the hydrodynamics to have a strong influence over the VMD performance of MXFR #3.

Using the thermodynamic properties of water, the membrane heat transfer efficiency η can be calculated as:

$$\eta = N_V \Delta H_V s A_{r,ln} / V_{feed} c_p \Delta T_f \quad (20)$$

$V_{feed}$ is the volume flow rate of the feed, $N_V$ is the water mass flux through the membrane, $\Delta H_V$ is the heat of vaporization of water having a specific heat $c_p$, and $\Delta T_f$ is the temperature drop of feed along the module length. We found that in a VMD process, whether the feed passed on the lumen side or the shell side, the heat transfer efficiency was as high as ≧90% (FIG. 40).

In terms of water quality, whatever the membrane fiber and module configuration, no trace of salt was found in the distillate. The disclosed VMD process may be advantageously employed to obtain distillate water from brine and industrial wastewater; however, a separate vacuum pump and a condenser are needed in VMD.

DCMD Performances (Task 3)

The VMD performances of six modules, namely, MXFR #1, MXFR #3, MXFR #6, MXFR #7, MXFR #9 and MXFR #10 were discussed in the previous section. In this section, the DCMD performances of these six rectangular cross flow membrane modules and one parallel flow membrane module (Module 4) used in the 2001 Project (Sirkar and Qin, 2001) are discussed.

Figure 14:
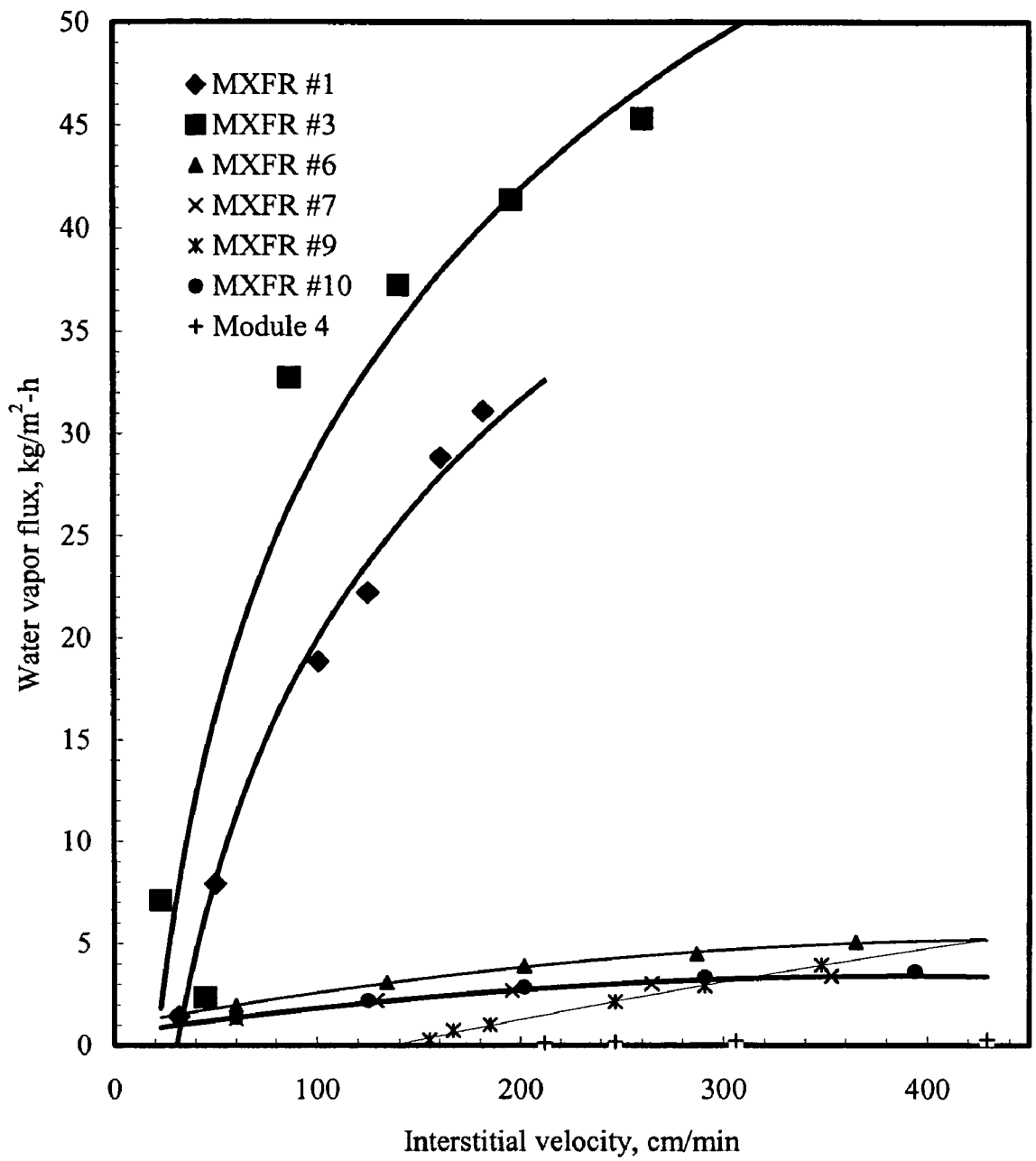
FIG. 14 is a plot showing DCMD performance based on variations of water vapor flux relative to interstitial velocity for various modules.

(1) Comparison of Rectangular Membrane Module with Parallel Flow Membrane Module Of the membrane modules studied in VMD, those modules exhibiting satisfactory DCMD performances are identified herein and the factors affecting DCMD behaviors of the membrane modules are explored; to that end, the DCMD performances of six rectangular cross flow membrane modules and a parallel flow module (Module 4) under similar experimental conditions are addressed (see FIGS. 14 and 40).

In the DCMD studies, membrane modules MXFR #3 and MXFR #1 displayed much higher water vapor flux than modules MXFR #6, MXFR #7, MXFR #9, MXFR #10 and Module 4. Under the given experimental conditions, the water vapor flux of module MXFR #3 reached 45 kg/m²-hr, and the water vapor fluxes of modules MXFR #6, MXFR #7, MXFR #9 and MXFR #10 were lower than 5 kg/m²-h. That was an unexpected and highly encouraging experimental result. According to the present disclosure, larger fiber pores, more open coating, much thicker wall, large fiber bore ID and cross flow design for hot brine of MXFR #3 and MXFR #1 are believed to be the main reasons for the excellent DCMD performances of these modules.

The polypropylene 150/330 fibers in modules MXFR #1 and MXFR #3 have large inner diameters (330 μm) which allows these membranes to have high distillate flow rate in the tube side so as to effectively reduce the temperature increase of the cold distillate stream. Meanwhile, the large fiber bore allows the distillate flow pressure drop to remain low. The larger outer diameter of MXFR #1 and MXFR #3 (~630 μm, O.D.) compared to the other modules (~305 μm, O.D.), increases the brine Reynolds number for the larger fibers at a given velocity (see FIG. 40). However, the effect on the heat transfer coefficient is a multiplication factor between about 1.3 and 1.9 times.

Ideally, the only heat to be transferred across the membrane pores is that needed to evaporate the water vapor across the membrane. In reality, there will be an additional amount of heat transferred by conduction through the membrane. This conductive flux consists of the sum of the conductive heat flux through the nonporous part of the polymeric membrane and the conductive heat flux through the gas in the pores of the membrane. The loss due to this conductive flux directly results in a decrease of temperature of the hot feed solution and increase of temperature of the cold distillate water flowing in the module. It is known that membrane distillation is a process driven by temperature difference. According to the present disclosure, the DCMD performance of a membrane module is generally improved by an increase of the membrane wall thickness due to a decrease of conductive heat flux. The experimental results are shown in FIG. 40. Clearly, these results demonstrate that the large fibers in modules MXFR #1 and MXFR #3 have smaller conductive heat loss and much higher water vapor fluxes.

Gas permeation measurements indicated that the $N_2$ permeance of MXFR #3 reached 0.196 cm³(STP)/cm²·s·cmHg, which is much higher than the values for MXFR #6, MXFR #7, MXFR#9, MXFR #10 and Module 4 (0.005-0.013 cm³ (STP)/cm²·s·cmHg). The gas permeance value directly reflects how open the pores of the hollow fiber are as well as the effect of the polymeric coating. The open area for water vapor molecule permeation not only includes the open area of the pore but also the water vapor permeability of the coating membrane covering the open pore mouth of the hollow fiber. A suitable opening and a very thin coating are important for getting very high water vapor flux in DCMD performance according to the present disclosure. That MXFR #3 has a much higher water vapor flux than the other modules is explainable based on the foregoing factors.

Based on the results described herein, it is apparent that, comparing the water vapor flux of the modules having different flow patterns, the DCMD performance was improved dramatically by a rectangular cross flow arrangement. The cross flow of hot feed solution over the fibers on the shell side increases the heat transfer coefficients dramatically as compared to similar Reynolds numbers for parallel flow. Also, it is known from the literature of membrane contactors employing microporous hydrophobic hollow fibers (Wickramasinghe et al. (1992); Yang and Cussler (1986)) that cross flow can increase the mass transfer coefficient by a factor of 5-7 at the same Reynolds number.

All cross flow membrane modules tested herein showed much higher water vapor fluxes in DCMD than the parallel flow membrane module. Compared to modules MXFR #6, MXFR #7, MXFR #9 and MXFR #10, the hollow fiber membranes in modules MXFR #1 and MXFR #3 have a much thicker wall, allowing MXFR #1 and MXFR #3 to have a lower conductive heat flux. Further, these modules have a larger fiber inner diameter, which allows higher tube side flow rate so that the distillate temperature rise is lower and higher Reynolds number is accommodated to increase the heat transfer coefficient and reduce the temperature polarization. Moreover, these modules have a more open (or thin) coating and high porosity of fibers, allowing MXFR #1 and MXFR #3 to have a very high effective open area for water vapor transport through the membrane from the shell side to the tube side. All of these factors contributed to modules MXFR #1 and MXFR #3 displaying excellent DCMD performances.

(2) Module MXFR #3

Because of the excellent DCMD performance of MXFR #3, particular attention is devoted to the properties of membrane module MXFR #3. The relations between the feed temperature, feed velocity and water vapor permeation flux were investigated. The variation of water vapor permeation flux with the interstitial velocity of hot saline (1%) as feed at different brine inlet temperatures is shown in FIG. 15.

Figure 16:
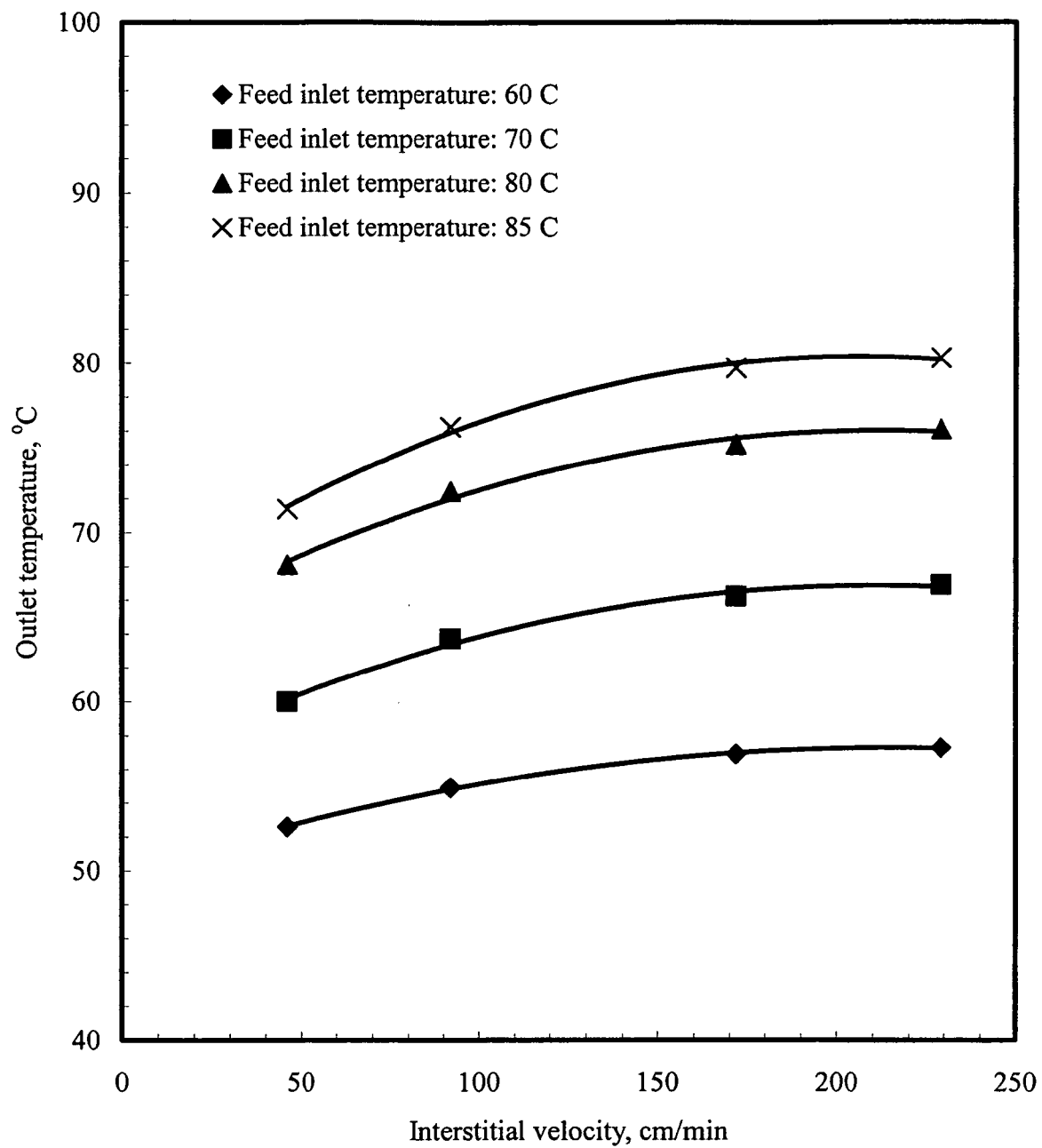
FIG. 16 is a plot showing variations in outlet temperature relative to DCMD for various inlet temperatures according to the present disclosure [module MXFR #3]

For a given brine temperature, an increase of interstitial velocity in cross flow on the shell side leads to an increase of Reynolds number which maximizes the brine-side boundary layer heat transfer coefficient. A higher heat transfer coefficient leads to higher sensible heat loss which supports the increased water vapor permeation flux. The effect of feed flow rate is more readily apparent, especially at high temperatures. Meanwhile, the increase of feed flow rate decreases the residence time of feed in the module, and increases the feed outlet temperature which increases the vapor pressure-based driving force and the Reynolds number. FIG. 16 shows the variation of feed outlet temperature with interstitial velocity. It is readily apparent that the temperature difference between inlet temperature and outlet temperature becomes larger with an increase of inlet temperature at a given velocity on the shell side. That is because the high water vapor flux at a high temperature causes more heat removal from the feed solution for water evaporation.

Figure 15:
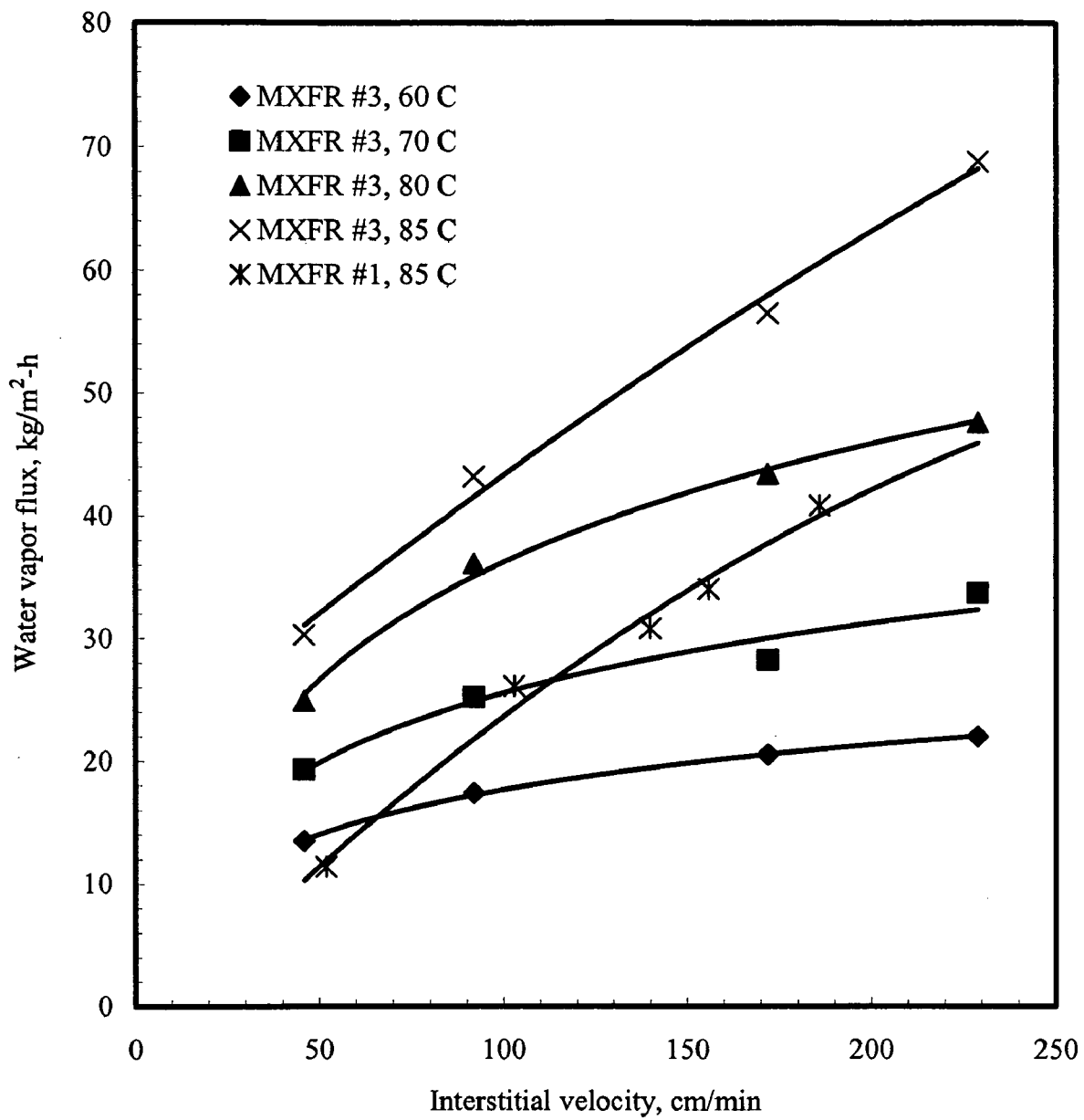
FIG. 15 is a plot showing variations in water vapor flux relative to interstitial velocity for DCMD for various modules.
Figure 17:
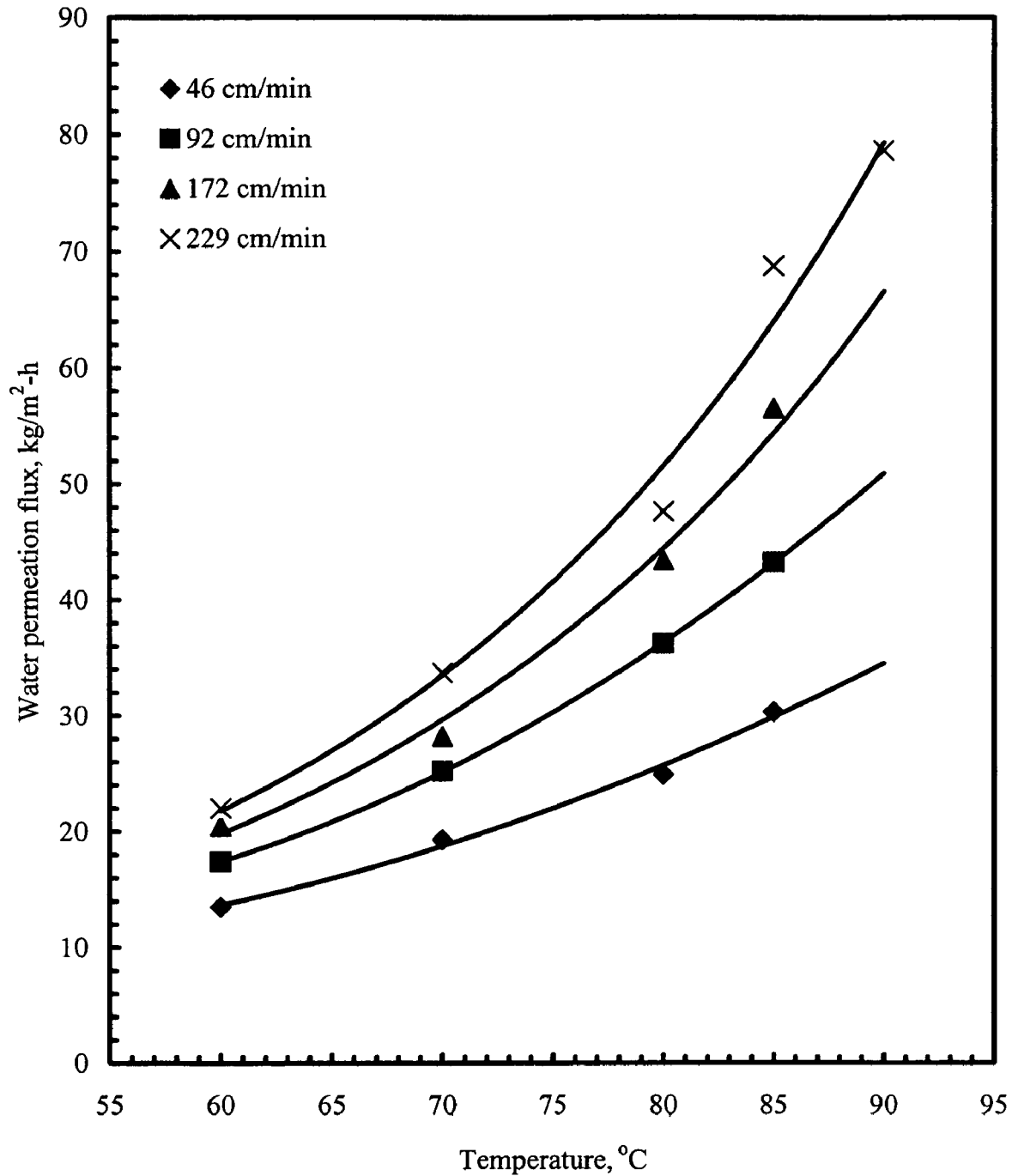
FIG. 17 is a plot showing variations in water permeation flux relative to inlet temperature for different interstitial velocities for DCMD according to the present disclosure [module MXFR #3]

Based on the data of FIG. 15, the effect of feed inlet temperature on water vapor flux is illustrated in FIG. 17 for the module MXFR #3. Normally the feed temperature has a small effect on the Reynolds number at a given flow rate. That is because there are only limited changes in the density and the viscosity of water in the given temperature range. But the effect of temperature on the water vapor permeation flux is striking for purposes herein. The increase of temperature dramatically increases the water vapor pressure which is the driving force. That is why the water vapor flux rises almost exponentially with temperature as the temperature rises. (The plot of FIG. 17 includes a data point at 90° C.; this data point was not present in FIG. 15.)

Figure 18:
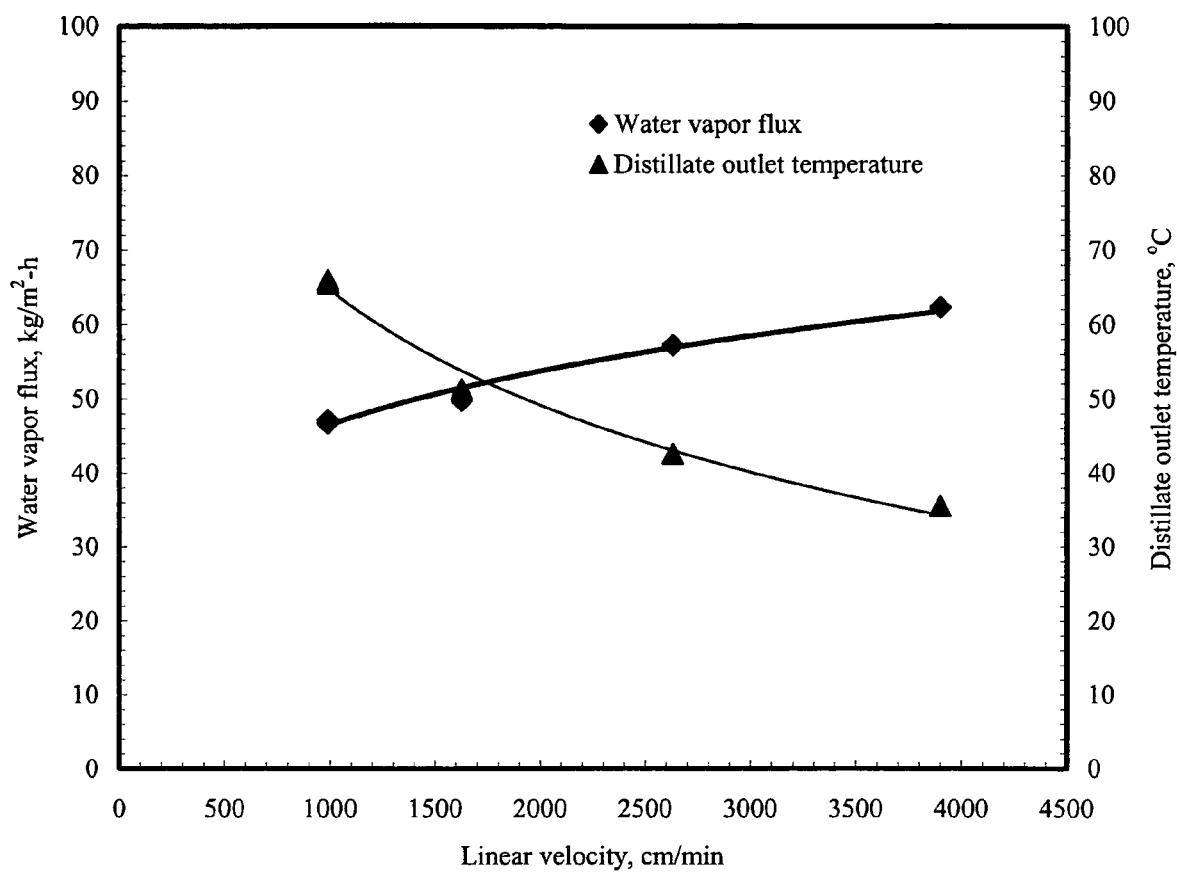
FIG. 18 is a plot showing variations in water vapor flux relative to linear velocity at distillate for DCMD [module MXFR #3]

The effect of the flow rate of the cold distillate water flowing through the tube side of module MXFR #3 on the water vapor flux in DCMD is illustrated in FIG. 18. The increase of the distillate flow rate makes the distillate temperature rise much less, which thereby maintains the needed $\Delta T$ for higher water vapor permeation flux. The water vapor flux rises with an increase in the flow rate of the cold water. But the extent of the increase of water vapor flux is much lower than that due to an increased brine flow rate in the shell side. This is because the conditions of this so-called "temperature polarization" on the cold distillate side are not as critical; the water vapor pressure at the relatively low distillate temperatures changes only slowly with temperature.

The effect of deionized (D.I.) water and saline solution as feed on the vapor permeation flux was compared. Under the same experimental conditions (membrane module: MXFR #1; feed: D.I. water or 1% NaCl solution; inlet temperature: 80° C.; interstitial velocity: 50 cm/min on the shell side; distillate: D.I. water, inlet temperature: 16° C., velocity: 980 cm/min on the tube side), the vapor permeation flux in the case of saline (1% NaCl) flowing on shell side is 21.7 kg/m$^2$-hr, which is slightly lower than that (23.0 kg/m$^2$-hr) obtained when D.I. water was used as feed. The primary reason is that the salt in water leads to a small decrease in water vapor pressure. A minor effect is also due to the fact that NaCl in water changes the Reynolds number to a limited degree.

Figure 19:
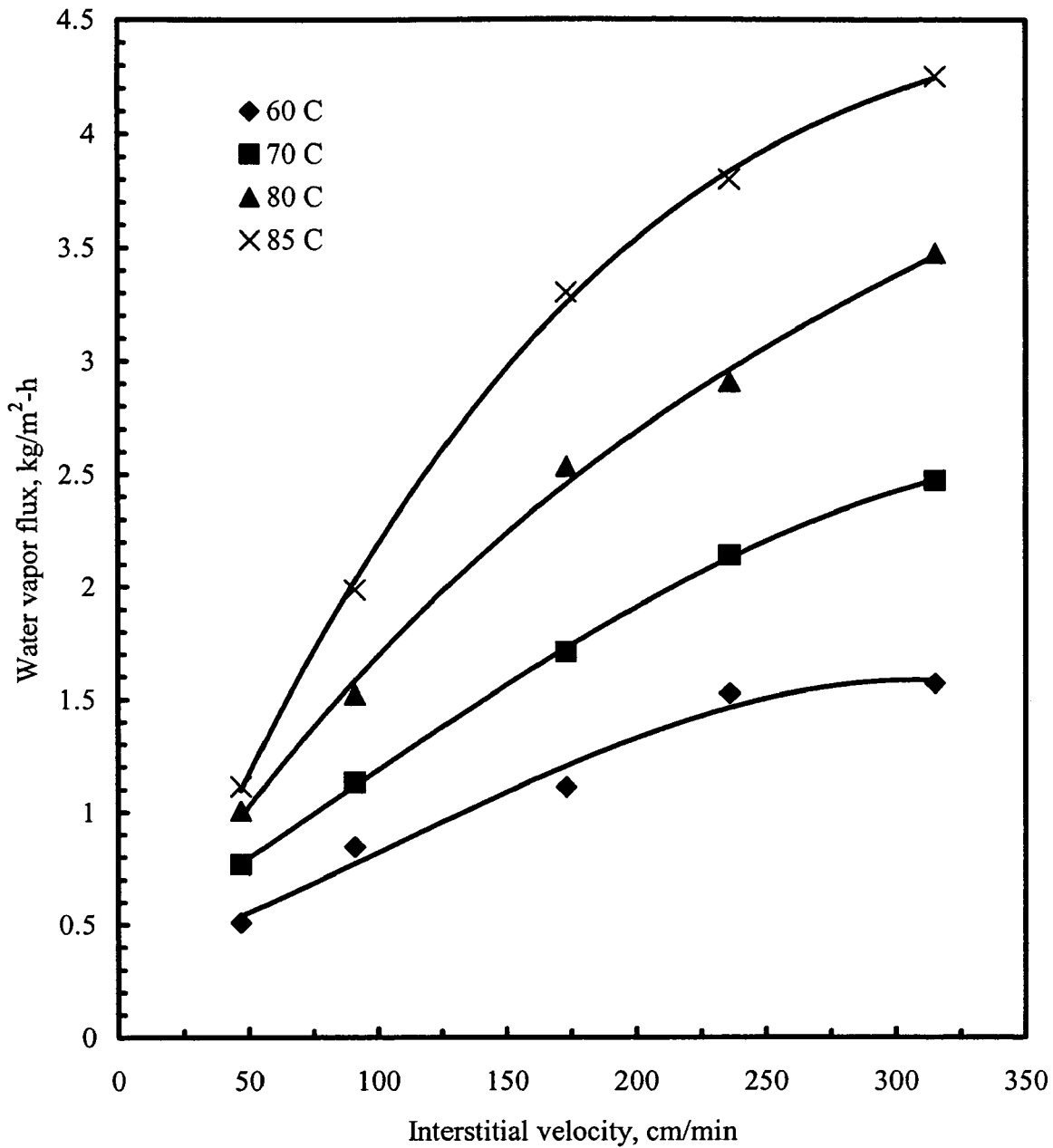
FIG. 19 is a plot showing variations in water vapor flux relative to interstitial velocity at various temperatures for DCMD [module MXFR #9]
Figure 20:
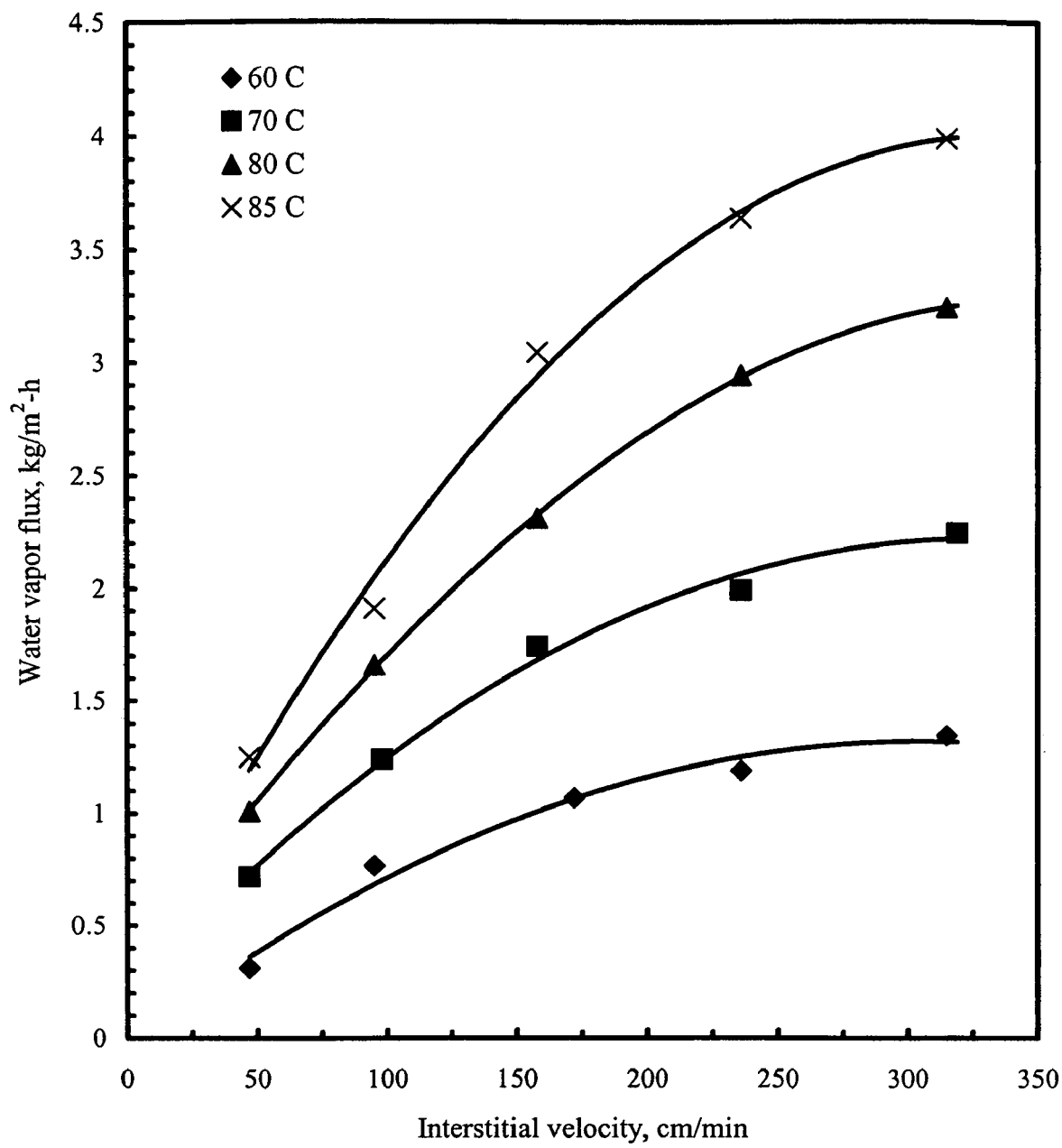
FIG. 20 is a plot showing variations in water vapor flux relative to interstitial velocity at various temperatures for DCMD [module MXFR #10]

The effect of flow rate of the brine flowing through the shell side and the feed temperature on the water vapor flux of membrane modules MXFR #9 and MXFR #10 were also investigated (see FIGS. 19 and 20). These modules had higher N$_2$ permeances than MXFR #6 and MXFR #7 and therefore were of interest over a wider ranger of feed temperatures. As expected according to the present disclosure, increased flow rate increases the water vapor flux drastically. However, the magnitudes of the water fluxes were still quite low.

DCMD Experiments for an Extended Period (Task 4)

Figure 21:
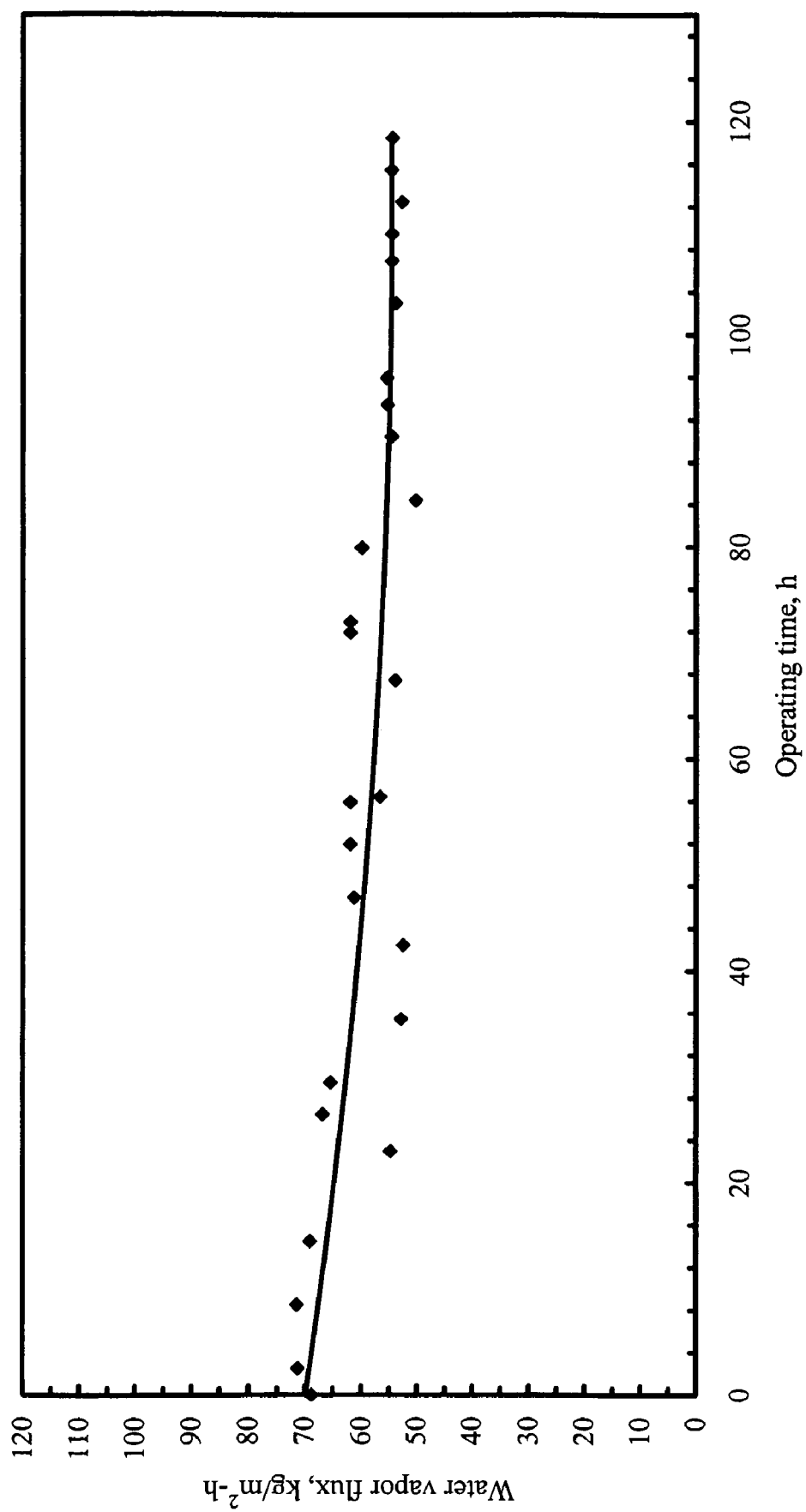
FIG. 21 is a plot showing water vapor flux relative to operating time for DCMD [module MXFR #3]

Based on the results from Task 3, the membrane module MXFR #3 was employed for an extended DCMD run. A feed of 1% hot brine was circulated through the shell side of module MXFR #3 and the feed reservoir. Cold deionized water was recirculated as the distillate stream through the lumen, the distillate reservoir and the thermostat, as shown in FIG. 6. FIG. 21 shows the variation of water vapor flux with operating time. For a brine feed at 85.5° C., this experiment lasted five (5) days. The membrane performance was not completely stable until the experiment was run for 90 hours. The stable water vapor flux was 54 kg/m$^2$-h. There was a reduction of 23% in the water permeation flux. Although the role of dirt and other materials depositing on the membrane surface can not be ruled out, a possible reason for this decrease of water vapor flux is the thermal creep in the membrane and coating material with time around the mouth of the partially covered pore at a high temperature. Module MXFR #3 was observed to display a significantly higher DCMD flux of H$_2$O vapor (~60 kg/m$^2$-h) at the beginning of a new experiment after the 5-day long extended-term run was over. Cleaning of the module after the extended-term run was not undertaken.

The conductivity of the cold distillate was monitored during this extended experiment. The concentration of salt was always less than 8 mg/l, which indicates that the membrane pores were not wetted by the hot brine during this experiment. No bacterial stain was observed in the membrane module or the brine reservoir during the 5-day experiment. Generally, bacterium can not grow in water at 85° C. However, the pressure drop in the cold distillate water passing through the lumen side of the module was slightly increased (by 25%). This indicates the possibility of dirt build up in the hollow fiber tube sheet. In the absence of any prefiltration, flow reversal is an appropriate means for cleaning any such build up.

Figure 22:
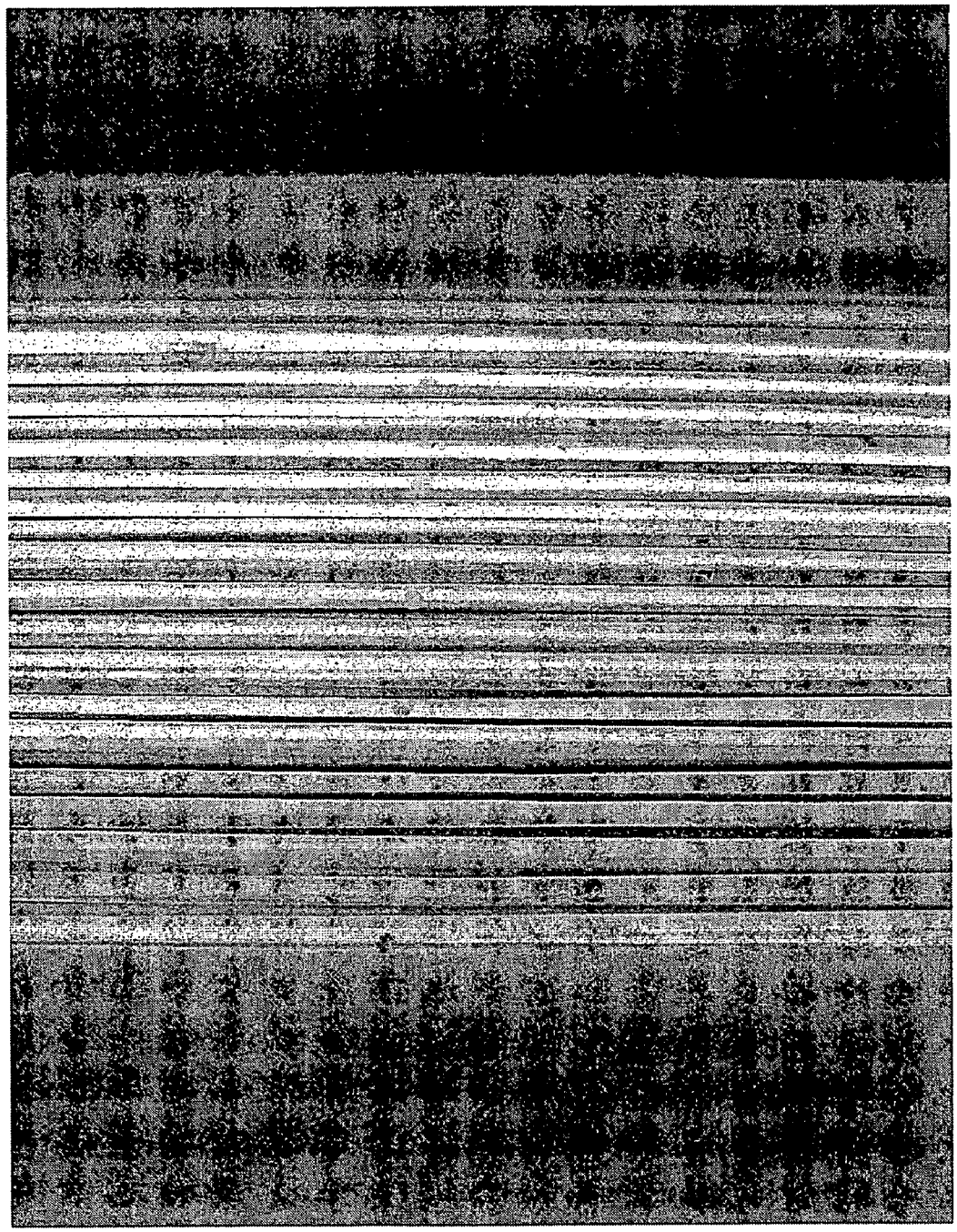
FIG. 22 is a side view of the hollow fibers in module MXFR #3 after runs spanning almost 400 hours which shows that almost all fibers are separated from each other.

Membrane module MXFR #3 was used for around 400 hours for VMD and DCMD tests (see FIG. 22). Under identical experimental conditions used in earlier experiments for VMD and DCMD, MXFR #3 showed essentially similar performances, except that the color of the fibers included in module MXFR #3 became slightly yellowish from white.

This discoloration is believed to have been caused by some dirt depositing on the coated section, although thermal effects can not be ruled out. Since the bulk of the area of the open mouth of the pore was covered by a plasma-polymerized coating, and the $H_2O$ vapor flux was predominantly through the remaining open area of the pore, the water vapor flux could not be reduced substantially due to the dirt depositing unless the pores become blocked by these deposits. As will be readily apparent to persons skilled in the art, an effective cleaning method may be employed to address the deposit of foreign materials.

During this experimental study, it was observed that some of the fibers in MXFR #6, MXFR #7, MXFR #9 and MXFR #10 got together during and after the DCMD and VMD runs. Such conditions were not visible in MXFR #1 and MXFR #3 modules (see FIG. 22). In the polar liquid phase of water, the nonpolar fibers tend to be together to reduce the surface free energy by affinity on the surface of the hollow fibers. Two opposing factors, namely packing fraction and the outer diameter of fiber, affect the extent of stickiness. Small outer diameter fibers assembled with a higher packing fraction in the module can easily come together in water. On the contrary, the fibers in MXFR #3, having a larger O.D. (630 μm) and packed with a smaller packing fraction (0.12), are separated from each other. Of course, the sticking of fibers would decrease the effective surface of the membrane for water permeation and affect membrane distillation (MD) performance negatively. The role of a fiber mat with a spacer in between each fiber as currently used in Celgard hollow fiber modules may be effective to reduce fiber sticking.

In conclusion, six rectangular cross flow membrane modules were studied in VMD and DCMD. The membrane distillation performances were improved dramatically by using modules having cross flow compared to parallel flow. The membrane module MXFR #3 prepared from fibers with larger inner diameter, larger wall thickness and more open plasma-polymerized silicone-fluoropolymer coating displayed excellent VMD and DCMD performances. The water vapor flux of the foregoing modules reached as high as 69 kg/m$^2$-h at 85° C. and 79 kg/m$^2$-h at 90° C. in DCMD. These are much higher fluxes than any published data for hollow fiber modules. The silicone-fluoropolymer coating provides effective capacity to protect the membrane against fouling. Over the course of many runs covering over 400 hours (after the 120 hour extended run), no salt leakage was observed and the membrane performance demonstrated very good stability.

Cost Estimate (Task 5)

A comparison of seawater desalination by reverse osmosis (RO) and the proposed direct contact membrane distillation (DCMD) process with respect to the production cost is provided herein. For our basis of calculation, a purified water production rate of 1,000,000 gal/day (3800 m$^3$/day) is assumed. The values for RO are taken from Ray (2001). Other references include Peters and Timmerhaus (1991) and Mulder (1991).

The calculation of production cost is normally based on capital cost and operating cost. For the comparison between RO and DCMD, the following assumptions were employed:

(1) RO and DCMD desalination plants have the same production rate—1,000,000 gpd.

(2) RO: operating pressure 1000 psi, 30% recovery, feed flow rate 2.3 kgal/min (=0.15 m$^3$/s), energy recovery 30%. DCMD: operating pressure 5 psi, 30% recovery, feed flow rate 2.3 kgal/min (=0.15 m$^3$/s).

(3) The costs of some capital items—site development, water, utilities, construction overhead and contingency, and some operating costs—membrane replacement, labor, spare parts and filters in RO application are the same as those in DCMD.

(4) Both RO membrane and DCMD membrane have the same price ($/m$^2$). The permeation flux of DCMD is 1.5 times higher than RO. Estimated membrane lifetime is 3 years.

(5) In DCMD, there are two special situations:

(a) An initial amount of cooled distillate water flows on the distillate side. This water gets heated up as it collects the condensate. A fraction of this heated distillate is taken out as product. The rest is cooled in a heat exchanger by cooling water which is cooled down again by means of a cooling tower. Thus, additional costs involved include those of (i) distillate heat exchanger; (ii) cooling tower, and (iii) cooling water lost by evaporation in cooling tower.

(b) On the hot brine side, the exiting hot brine temperature is sufficiently lowered. An amount of fresh hot brine is added to it and then this brine is heated up in a heat exchanger by the waste heat source so that it can be fed again to the membrane stack. A 30% recovery is assumed; an even higher recovery is anticipated. However, the higher recovery will require a few passes. The costs involved are (i) brine heat exchanger; and (ii) additional pumping cost.

The total production cost of water by the DCMD process according to the present disclosure has been estimated to be only $2.97/1000 gal, which is about half of that for the RO process due to the low pressure operation of DCMD process, high water vapor flux and good anti-fouling properties of the DCMD membrane and process. Compared to the RO process widely used in the desalination industry, the salt content of water recovered using the disclosed DCMD system is <20 ppm, but the salt content in water obtained from a single-stage RO system is >200 ppm. Therefore, application of the advantageous systems, devices and methods of the present disclosure offer significant advantages relative to existing technology for purposes of industrial desalination.

Of note, recent cost reports for water treatment process showed that the production cost of water by RO was $4.77/1000 gal (Cost Model, Program for PC, D-8230 WaTER Desalination and Water Purification Research and Economic Program, Reclamation's Website, http://www.usbr.gov/water/desal.html, 2002-2003).

In sum, the results of the Initial Phase demonstrate the following advantageous results according to the present disclosure:

1. The increase of shell-side hot brine velocity over the hollow fibers in cross flow substantially increases the water vapor flux. A four-fold increase in the interstitial velocity (FIG. 15) produces, for example, more than two-fold flux increase at higher feed inlet temperatures. Higher velocity leads to higher heat transfer coefficient which reduces the temperature polarization; the latter in turn increases the water vapor pressure of the brine dramatically, thereby increasing the driving force for water permeation.

2. The extent of openness of the microporous/porous silicone-fluoropolymer coating on the O.D. of the hydrophobic porous polypropylene hollow fiber is very important for the achievement of a higher water vapor flux. The higher the $N_2$ permeance of such a coating, the higher is the water vapor flux. Yet there was no salt leakage observed in the experimental studies reported herein through such a coating.

3. Thicker and more porous hollow fiber walls lead to a lower loss of the brine enthalpy via heat conduction through the polymeric part of the fiber walls.

4. Very high water vapor fluxes in the range 30-80 kg/m²-hr are achievable in DCMD using rectangular cross flow, larger hollow fibers having a more open microporous/porous silicone-fluoropolymer hydrophobic coating, and appropriate Reynolds numbers in the brine flow and the cold distillate flow. Such fluxes, once sustained on a long-term basis and on a large scale, will considerably increase the commercial viability of DCMD according to the present disclosure, e.g., for water desalination and other industrial applications.

5. To the extent the flux decrease during the initial period of a 5-day long extended DCMD run is attributable to foulants/dirt or thermal creep, appropriate corrective action (as will be readily apparent to and implemented by persons of ordinary skill in the art) will substantially aid the commercial potential of the DCMD technology disclosed herein.

6. A fiber mat arrangement using an appropriate spacer between the fibers may be employed to advantageously prevent clumping of the fibers via hydrophobic surfaces liking each other in an aqueous environment. It is noted that commercial hollow fiber modules (e.g., Celgard Inc.) use such structures in cross flow Liquicel® modules.

Although the fibers employed in the Initial Phase were fabricated from polypropylene, additional membrane materials may be employed in fabricating membranes according to the present disclosure. Exemplary fiber materials, i.e., materials for use in fabricating hollow fibers according to the present disclosure, include a wider range of hydrophobic polymeric materials. Particular examples include polyvinylidene fluoride (PVDF); poly(4-methyl-1-pentene) (PMP); polytetrafluoroethylene (PTFE); polyacrylonitrile; perfluorodimethyldioxole-tetrafluoroethylene (PDD-TFE), and polyethylene. Based on the disclosure contained herein, alternative fiber materials will be readily apparent to persons skilled in the art and such alternative materials are expressly encompassed within the spirit and scope of the present disclosure.

In addition, the present disclosure identifies exemplary coating materials for use in coating the external surfaces of the disclosed hollow fibers. The exemplary coatings disclosed herein may be advantageously applied by plasmapolymerization, although other coatings and/or coating techniques may be employed to advantage according to the present disclosure, as will be readily apparent to persons skilled in the art from the description contained herein. Thus, for example, coatings such as polydimethylsiloxane (PDMS) or its other copolymers with fluoromonomers may be utilized according to the present disclosure. The coating may also be prepared from PDD-TFE (perfluoro-2,2-dimethyl-1,3-dioxole with tetrafluoroethylene) and similar copolymers. The coating may be selected and applied such that the pore sizes vary across a relatively broad range, e.g., from 30 Å to 5 μm. Similarly, the coating thickness may vary across a relatively broad range, e.g., from 500 Å to 15 μm. The coating of the present disclosure advantageously provides a hydrophobic gap between the hot brine and the porous hydrophobic hollow fiber proper.

A variety of other cross flow designs may be employed according to the present disclosure. Such alternative module designs are generally of use for the membrane distillation applications of the present disclosure, provided the hot brine is in cross flow over the outside surface of the hollow fibers. The overall geometry of the module need not be rectangular (as shown in exemplary embodiments disclosed herein), but may take a variety of alternative geometric configurations, e.g., a cylindrical geometry with hot brine entering centrally through a tube and flowing radially out through the bed of hollow fibers in cross flow. In this cylindrical embodiment, the central tube may be provided with perforations in the wall for brine exit. However, as will be apparent to persons skilled in the art, brine flow may be reversed, i.e., directed radially inwardly, without departing from the spirit or scope of the present disclosure. Indeed, additional variations on the specific structures, operating conditions and process parameters may be employed without departing from the spirit or scope of the present disclosure, as will be apparent to persons skilled in the art from the detailed disclosure provided herein.

(B) Scale-Up Phase

By way of overview, in the Scale-Up Phase, the membrane surface area was scaled up by more than an order of magnitude relative to the Initial Phase using an exemplary porous hydrophobic polypropylene hollow fiber membrane (internal diameter 330 μm, wall thickness 150 μm) tested in connection with the Initial Phase (described above). These fibers had a plasmapolymerized microporous/porous coating of a silicone-fluoropolymer close to that of the module MXFR #3. In the rectangular cross flow module design, the number of fibers in a module was 1088. The membrane surface area in each module was 2864 cm². The brine feed temperature ranged between 40 and 94° C. in DCMD. At a high feed velocity over the fibers, a water permeation flux as high as 60 kg/m²-h was achieved in DCMD at 90° C. through the module S/N 1004 (as described in greater detail herein).

The flux value achieved in the scaled up module was similar to that achieved in an order of magnitude smaller module (MXFR #3) in the Initial Phase. Further, the Reynolds number for the brine flow was in the range used in the Initial Phase, indicating that use of appropriate fibers and a reasonable cross flow velocity on the shell side can advantageously achieve desired water permeation flux levels according to the present disclosure, regardless of the operation scale. No leakage of salt or water was encountered during extended use of the scaled up module in DCMD.

Nitrogen permeation tests through different modules indicated that the fibers in the module S/N 1004 had significantly lower $N_2$ permeance than that in the smaller scale MXFR #3 module, indicating that the coating on the outer surface of the hollow fiber was tighter than that on the fibers in the MXFR #3 module. This difference caused the water vapor flux of larger module S/N 1004 to be somewhat smaller than that of the smaller module MXFR #3 of the Initial Phase. An extended-term DCMD test was carried out for a period of 128 hours at a temperature of 87-90° C. using the module S/N 1004. The steady state water vapor flux was found to be ~54 kg/m²-h. This performance is quite close to the steady state flux achieved in the long-term test in the Initial Phase described above.

The initial time flux decay (only 6%) was likely due to a thermal creep in the coatings and a slight fouling on the surfaces of the fibers. The membrane pores were not wetted by the hot brine during the operation. The silicone-fluoropolymer coating provided an effective barrier to protect the membrane. The performance of a 2-module stack was also studied and the successful performance of the stack in experimental operation illustrated how a number of horizontal cross flow modules may be stacked in a small volume and used to extract greater amounts of water vapor, e.g., as much water vapor as possible, from a given hot brine stream. Moreover, the disclosed systems were operated with brine concentrations of higher salt concentration, e.g., 6% and 10%, which demonstrated very limited flux reductions and effective operation of the disclosed DCMD process for brine concentrate volume reduction.

Since the performance of the disclosed process for a given module/flow design depends strongly on the membrane, additional work was initiated with small modules of the type used in the Initial Phase. These membranes involved polypropylene hollow fibers of smaller dimensions (280 µm I.D., 397 µm O.D.) and a variety of silicone-fluoropolymer coatings (including non-coated samples). Based on the observed DCMD performances of such modules, larger polypropylene hollow fibers of the 150/330 type (150 µm wall thickness, 330 µm I.D.) and a plasma-polymerized microporous/porous silicone-fluoropolymer coating of the type used successfully in module MXFR #3 of the Initial Phase were evaluated. The membrane surface area in these modules was varied between 1970 and 2864 cm$^2$. The internal module dimensions for hot brine flow were 25.4 cm length, 8.57 cm width and 4.45 cm height. The fibers had a substantially staggered arrangement in 11 or 16 deep layers.

Modules having the foregoing design were obtained; the face boxes and face plates were designed to ensure as uniform a hot brine cross flow as possible. The performances of one large module as well as a stack of two such modules have been investigated with hot brine in DCM. The experimental investigations carried out involved brine concentrations up to 10%, and brine feed temperatures between 40-94° C. An extended study was also carried out for five (5) days. A preliminary cost estimate for DCMD-based desalination of brine was also calculated according to the scaled up versions of the disclosed devices/systems.

i. Overview to Conclusions from Scale-Up Phase

1. Two hollow fiber membrane modules (S/N 1004 and S/N 1005), each having a surface area of 0.2864 m$^2$ and a rectangular cross flow of hot brine over the outside fiber diameter, were successfully studied for DCMD-based water recovery from hot feed brine. The brine temperature for module S/N1004 was varied over a range of 40-94° C. The membrane surface area in the two hollow fiber membrane modules was more than an order of magnitude larger than the modules employed in the Initial Phase described above. The hollow fibers employed in these scaled up modules are larger (330 µm I.D. and 150 µm wall thickness), and correspond to the fibers employed in the most successful module (MXFR #3) of the Initial Phase. The microporous/porous plasmapolymerized silicone-fluoropolymer coating on the outer diameter of these fibers was somewhat tighter than that in the module MXFR #3 of the Initial Phase. The fibers were four (4) times longer than those in the Initial Phase. Module S/N 1004 was used for a cumulative time of about 300 hours and continuously over a period of five (5) days/127 hours. No salt leakage was observed.

2. A water vapor flux of 60 kg/m$^2$-hr based on the fiber internal diameter was achieved at 90° C. in DCMD in module S/N 1004 with hot brine in rectangular cross flow on the fiber outer diameter and cold distillate (at an inlet temperature of 34° C.) in the fiber bore. This water flux value is advantageously high and demonstrates that the high flux values achieved in the Initial Phase using smaller modules can also be achieved in larger modules. Scalability of the horizontal cross flow based hollow fiber membrane modules having an appropriate microporous/porous silicone-fluoropolymer coating on the outside surface of larger diameter porous polypropylene fibers has been demonstrated. However, to ensure scalability, the cold distillate flow rate must be sufficient to prevent an inordinate rise in distillate outlet temperature, which becomes especially important for larger modules having much longer hollow fibers.

3. Among a number of ways to increase the membrane surface area exposed to a particular hot brine feed stream, stacking a number of identical modules along the flow path is one option according to the present disclosure. Experimental studies with exemplary stacked modules according to the present disclosure (S/N 1004 and S/N 1005) have demonstrated that stacked modules are a viable option, allowing extraction of sensible heat via reasonable values of water vapor flux from the hot brine even as its temperature decreases along the flow path.

4. The DCMD process using the disclosed membranes can be used to successfully extract water vapor from brine having as much as 10% salt. The water vapor flux is reduced marginally by the increase in salt concentration. Therefore, the DCM process of the present disclosure may be employed to extract water from brine concentrates and aid in their disposal by substantial volume reduction. Based on experimental results herein, brines of even higher concentration may be successfully processed according to the present disclosure.

5. The disclosed DCMD process and membrane modules are productive, even when the hot brine feed temperature is significantly lower than 80-90° C., yielding high water vapor fluxes even at the reduced feed temperatures. A 60° C. brine feed yielded 20 kg/m$^2$-h water vapor flux, which is a reasonable result based on the relatively low feed temperature.

6. The 5-day long continuous DCMD run using module S/N 1004 exhibited no salt leakage and demonstrated that the scaled-up module can perform as well as the much smaller module (MXFR #3) of the Initial Phase, both in terms of water vapor flux and distillate water quality. Fouling was not observed; a 1 µm microfilter was employed (as in most hollow fiber membrane-based processes). The stable water vapor flux of around 54-58 kg/m$^2$-h is advantageously high and attractive.

7. Techniques for potting of the larger fibers in the larger modules for purposes of scaled-up operations may be of some long-term importance.

8. Operations wherein multi-module stacks are employed to yield high volumes of distillate, e.g., 1-5 gallons/min of distillate, are contemplated and feasible based on the results described herein.

9. In exemplary embodiments of the present disclosure, a multimodular stack may be utilized/fabricated with one module which is deeper in the shell-side hot brine flow direction containing more (and potentially many more) layers of hollow fibers.

10. It is contemplated that the DCMD process of the present disclosure may be enhanced and/or modified by using hot brine of concentrations in the range of 10-40%, e.g., for potential applications in desalination concentrate volume reduction.

11. Scales or impurity deposits on the fiber modules may be removed by acid solutions and/or prevented (at least in part) with anti-scalants.

ii. Experimental Details—Membrane Modules

Five smaller rectangular cross flow hollow fiber modules (inner dimensions: length 6.4 cm, width 2.5 cm, height 1.8. cm) and four much larger rectangular cross flow hollow fiber modules (inner dimensions: length 25.4 cm, width 8.57 cm, height 4.45 cm) were developed for direct contact membrane distillation (DCMD). These modules with open faces were fabricated by Applied Membrane Technologies Inc., Minnetonka, Minn. (henceforth, AMT).

Each of the five small rectangular modules contained 456 staggered fibers (polypropylene 50/280) (280 µm I.D., 50 µm wall thickness) manufactured by Membrana (Wuppertal, Germany). The porous fibers in modules MXFR #11, MXFR #12 and MXFR #13 were plasma-coated by AMT with silicone-fluoropolymer having different thicknesses and pore mouth openings; the fibers in MXFR #14 were coated only with Teflon; the fibers in MXFR #15 were uncoated. The details of these five modules are shown in the table of FIG. 44.

All porous hollow fiber membranes in the four larger modules had a plasmapolymerized silicone-fluoropolymer coating on the outer surface having a microporous structure similar to the coating used on module MXFR #3 of the Initial Phase. The precursor of the coated membrane in these larger modules was the polypropylene 150/330 hollow fiber (330 μm ID, 150 μm wall thickness) manufactured by Membrana. All fibers in the modules were staggered. The only difference between these four larger modules was that there were 748 hollow fibers in modules S/N 1002 and S/N 1003, and 1088 fibers in modules S/N 1004 and S/N 1005.

Design of the cross flow rectangular modules yields a much higher brine-side heat transfer coefficient (shell-side) compared to that achieved in parallel flow at similar Reynolds numbers (per the results of the Initial Phase). The ultrathin coating has high water vapor permeance and potentially makes the fiber permanently non-wettable from the shell-side under applicable operating conditions. Compared to the coated PP 50/200 and PP 50/280 fibers, the coated PP 150/330 hollow fibers have a much smaller membrane heat transfer coefficient (660 W/m$^2$K) which can effectively reduce the conductive heat loss. Values of membrane heat transfer coefficient were calculated based on experimental data in the Initial Phase. The definition of heat transfer coefficient and associated correlations were discussed above.

Figure 23:
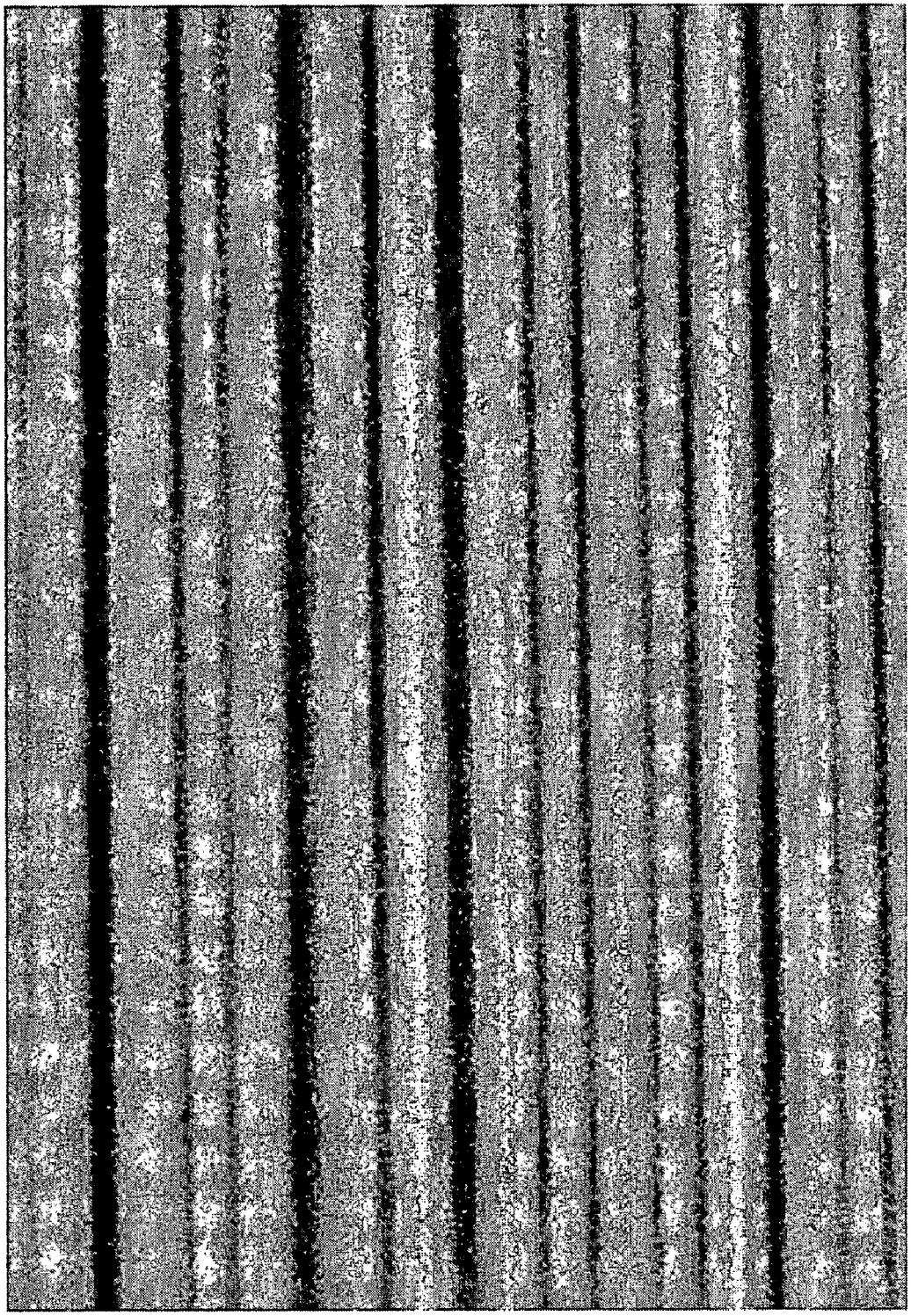
FIG. 23 is a side view of an arrangement of exemplary coated microporous hollow fibers in a rectangular cross flow test module of larger dimension.

The large diameters of the hollow fibers facilitate establishing a relatively high brine-side Reynolds number, which raises the overall boundary layer heat transfer coefficient and reduces the polarization coefficients of temperature and concentration. On the other hand, the larger bore hollow fibers allows the cold distillate flow rate to be high so as to maintain a high □T vis-a-vis the hot brine at a low value of lumen pressure drop. The characteristics of the larger membrane modules and their membranes are given in the table of FIG. 45. The fiber arrangement in a module is shown in FIG. 23.

Figure 24:
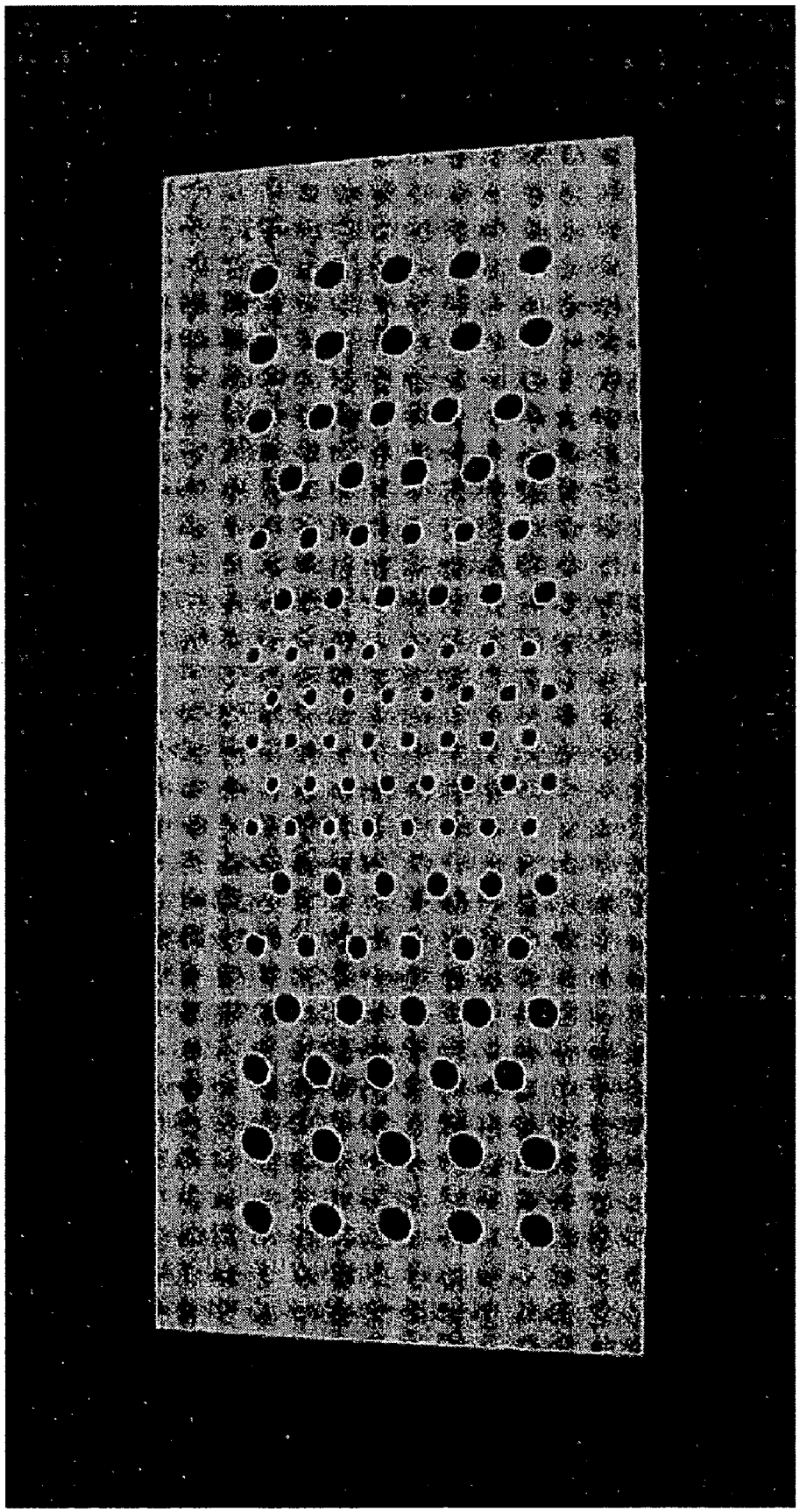
FIG. 24 is a front view of an exemplary face plate for a rectangular cross flow module of larger size according to the present disclosure.

Since the modules received from AMT were only rectangular channels having coated hollow fibers running across and included two open faces, a diverging section and a converging section were designed and fabricated to allow the liquid to flow uniformly in cross flow outside of and perpendicular to the fibers. The diverging section and the converging section were two boxes having a curved shape. Two faceplates were made from two flat plastic sheets. On each sheet, 104 smaller holes having a wide size distribution were opened (the hole sizes were such that the holes at the center were smaller, while those further away were progressively larger) (see FIG. 24). The foregoing design ensured that the feed solution flowed uniformly through the shell side of the fibers. The material used for the face boxes and face plates was translucent polypropylene having an appropriate thickness and thermal resistance.

Figure 25:
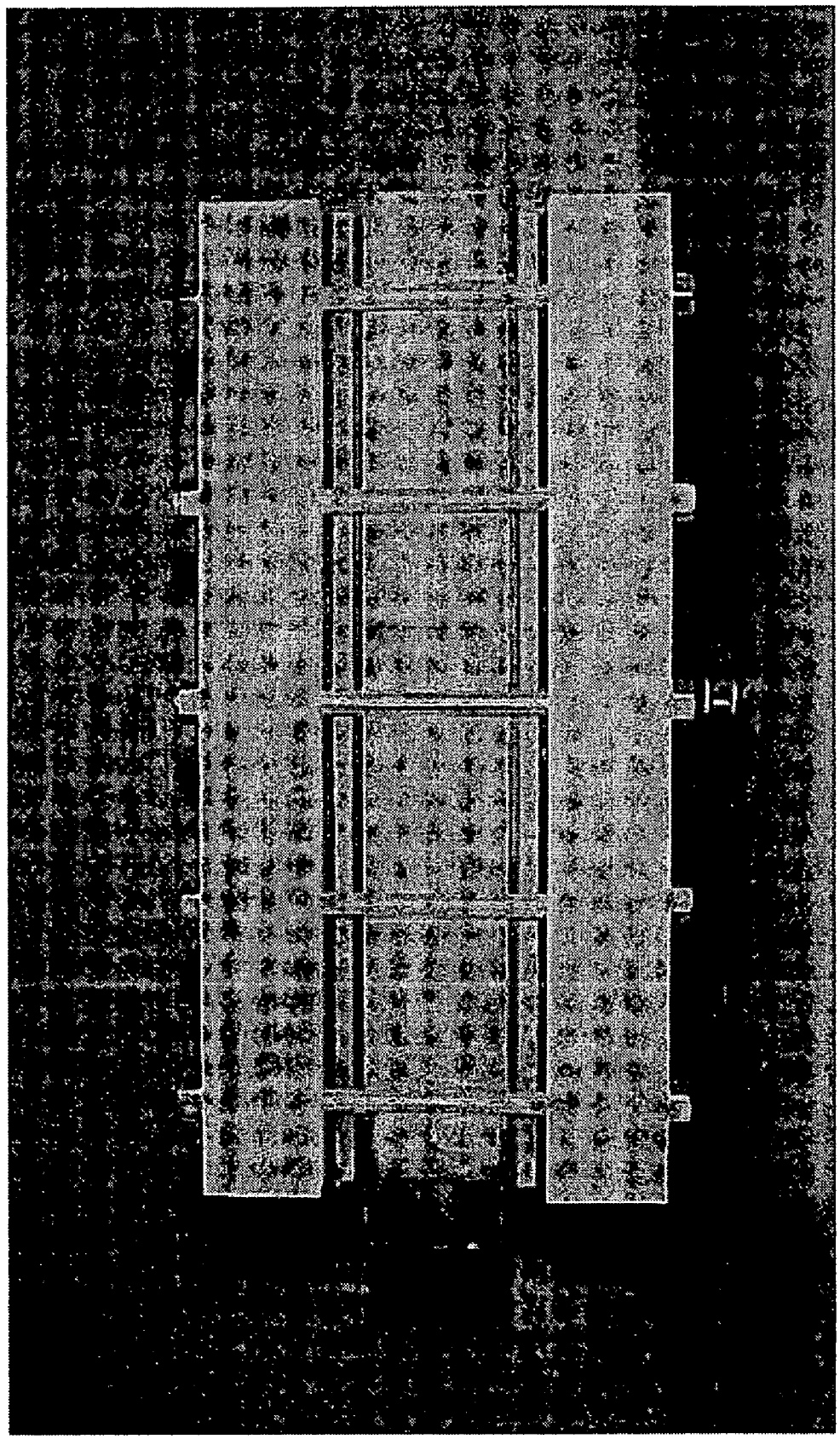
FIG. 25 is a side view of an exemplary rectangular cross flow module assembly.

Two face boxes and face plates were assembled with a rectangular membrane module channel and 10 bolts to constitute the complete device (see FIG. 25). Neoprene gaskets (⅛") were used between the face box, the face plate and the module channel on each side to seal the components with respect to each other. Hot brine was allowed to enter one face box, then leave the box through the face plate holes which distributed the liquid flow evenly, and then enter the flow channel. On the other side, the liquid left the channel through the face plate holes and collected in the face box and then flowed beyond the box and thus the module. By this advantageous design, as a result of the gasket between the face plate and the frame containing the fibers, there was no free space therebetween. Further there was a small axial gap around ¼"
between the module frame surface and the beginning of the fibers. Therefore, uniform or relatively uniform flow of the liquid across the fiber layer was perpendicular to the fibers and facilitated good heat and mass transfer.

Experimental Apparatus and Procedures

Figure 26:
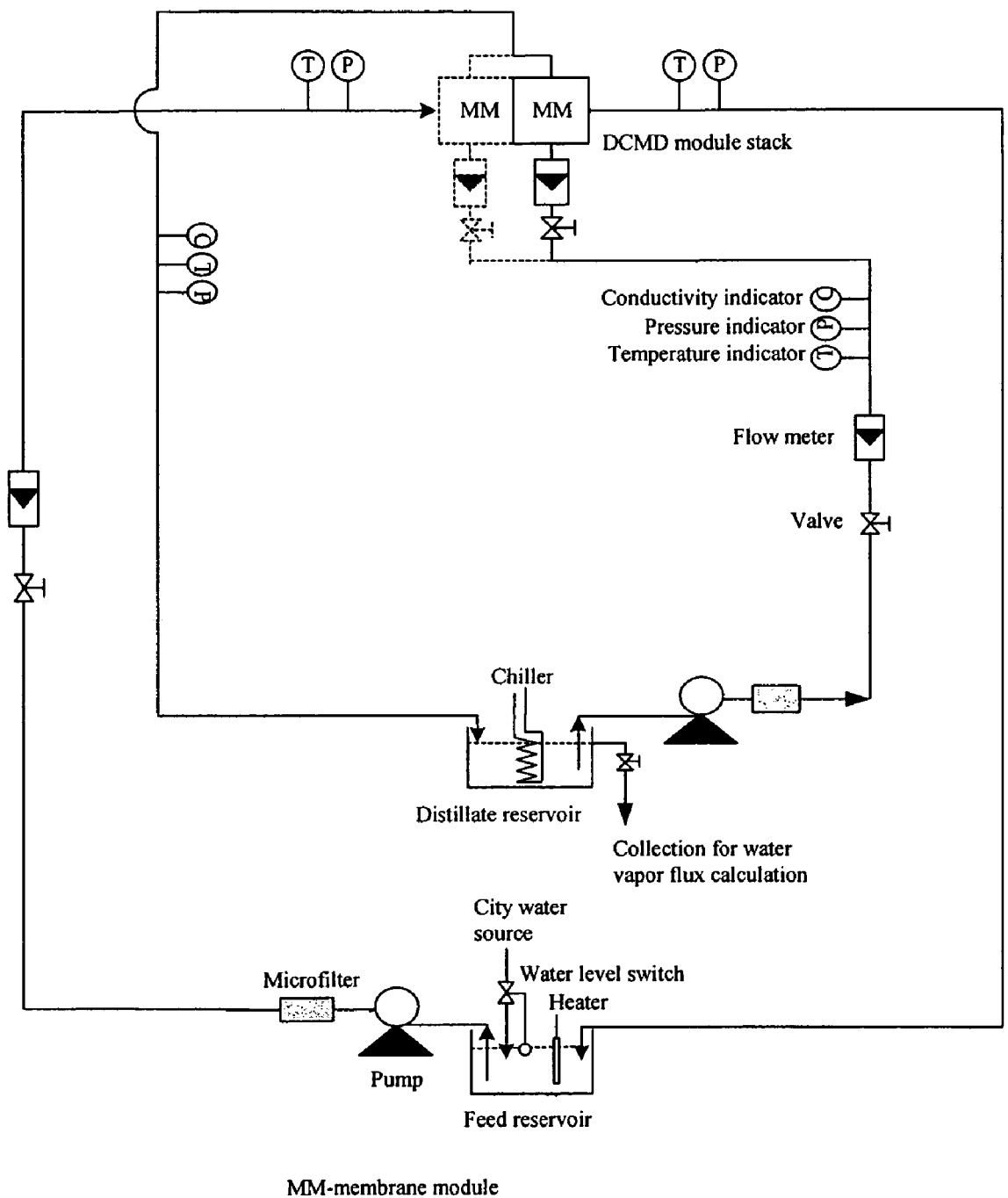
FIG. 26 is a schematic process flow diagram for an exemplary DCMD process according to the present disclosure.
Figure 27:
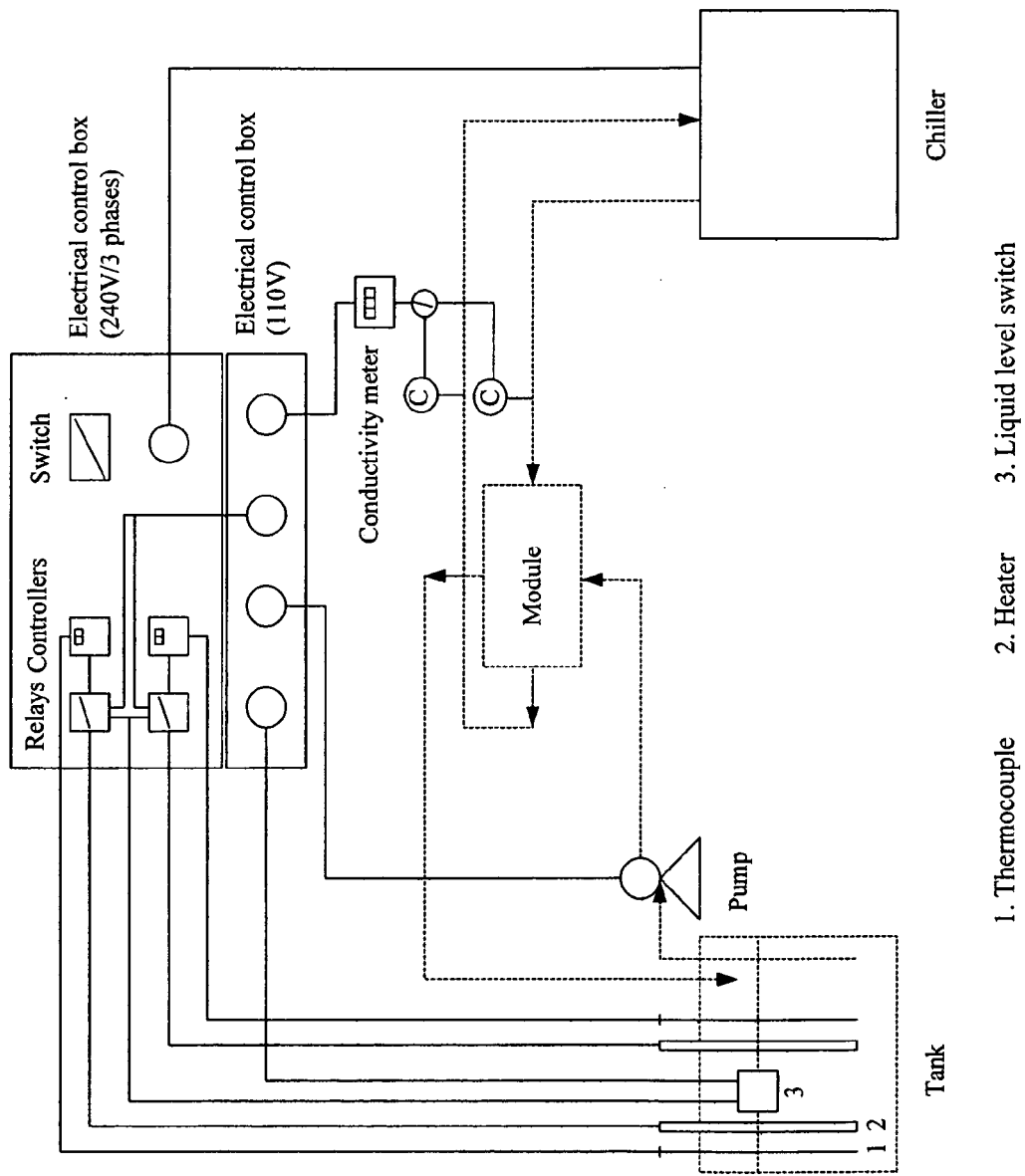
FIG. 27 is a schematic diagram of electrical connections for an exemplary DCMD system according to the present disclosure.

The experimental apparatus developed could be used to study the DCMD process on a larger scale (compared to that in the Initial Phase). A schematic process flow diagram including the disclosed apparatus is shown in FIG. 26. FIG. 27 is a schematic of the electrical connections for the exemplary DCMD experimental setup. All of the system piping and storage tanks were thoroughly insulated to minimize heat loss to the environment. This setup was prepared under Tasks 2 and 3 of the Scale-Up Phase (discussed below). A summary of the project tasks is provided below to provide persons skilled in the art with an overview of the experimental design of the Scale-Up Phase:

Task 1. Develop large-scale rectangular cross flow hollow fiber membrane modules having an appropriate coating on the fibers and corresponding DCMD setup.

Task 2. Study the DCMD performances of different membrane modules developed in Task 1.

Task 3. Study the DCMD performances of a two-module stack.

Task 4. Develop correlations to facilitate performance prediction of larger systems.

Task 5. Develop a preliminary cost estimate for DCMD-based desalination of brine at a scaled-up level.

Task 6. Prepare and analyze data. [The underlying data utilized in preparing the plots included in the figures hereto are set forth in Data Tables B1-B10, which were appended to the provisional application to which the present application claims priority, and which is incorporated herein by reference.]

DCMD: In the experimental setup for DCMD operation shown in FIGS. 26 and 27, city water or brine was introduced to the shell side from a reservoir by a centrifugal pump (model: TE-4-MD-HC, Little Giant Co., Oklahoma City, Okla.) at a constant flow rate controlled by a ball valve. The flow rate of the liquid system could be varied between 5-40 liters per minute (LPM). Feed solution in a 200-liter stainless steel tank was heated by a heating system having two heaters (OMEGA, EMT-312E2/240 three-phase moisture resistant heater (12 kW); EMT-309E2/240 three-phase moisture resistant heater (9 kW); total 21 kW of heating capacity), two OMEGA rugged transition joint probes, two OMEGA three phase DIN rail mount solid state relays and two OMEGA CN77333 controllers. The temperature controllers maintained the bath temperature at a given value and thus maintained a constant entrance temperature for the hot brine/water feed. Outside the membrane module, the exiting feed was circulated back to the feed reservoir and was re-warmed. For safety, a liquid level switch was installed in the feed tank.

The cooling system was primarily composed of a Remcor chiller having a cooling capacity of 12 kW (model: CH3002A, voltage (full load amps): 230/60/3, IMI Cornelius Inc., Anoka, Minn.) with a recirculation pump and a 10 gallon tank. Deionized water was introduced as the cooling liquid on the fiber lumen side of the module from the reservoir at a constant flow rate. The exiting hot distillate from the module was cooled to a given temperature by the chiller before entering the module again.

Each liquid solution (including feed solution and cooling water) was filtered by passing through a 20" postfilter cartridge (1 μm) (model: DGD-2501-20, USFilter-Plymouth Products, Sheboygan, Wis.) before entering the membrane module. The inlet and outlet temperatures and pressures of the hot feed and the cold distillate were measured by thermocouples and pressure gauges. The electrical conductivities or the salt concentrations of the distillate into and out of the module were monitored by a conductivity meter (model: CON200 Series, OAKTON Instruments, Vernon Hills, Ill.).

When the readings of the flow rates of the hot solution, cold distillate water and the four inlet and outlet temperatures reached constant values, it was assumed that the experimental conditions had reached a steady state; then the distillate spilled from the cooling water reservoir beyond a certain level was collected. The volume of the distillate collected in a certain time was used to calculate the water vapor flux through the membrane under the given experimental conditions. Water vapor flux was calculated in like manner to that described with reference to the Initial Phase.

Leak Testing: All membrane modules listed in the tables of FIGS. 44 and 45 were tested for leakage before DCMD measurements. Before the leak tests, each membrane module was activated by circulating deionized water in the shell side and tube side at a very low flow rate and at room temperature for at least ten (10) hours. Then the module was assembled in the DCMD system. A solution of 1% NaCl solution at 85° C. flowed through shell side at a constant flow rate of 0.4-2 LPM for the smaller modules and 5-25 LPM for larger modules (the pressure drop was kept in the range of 1-2.5 psi), and deionized water flowed through the tube side at a low flow rate at room temperature. The conductivity of the distillate was monitored with increasing brine flow rate. If the conductivity of the distillate water was observed to rise with operating time, it would be recognized that the test membrane module was leaking. Otherwise, the test membrane module was leak free. Alternatively, leakage of hollow fiber modules can be monitored by filling deionized water in the tube side and keeping a constant pressure for a long period of time.

All four modules were found to be leaking at 3 psi of water on the lumen side. The extent of leakage in modules S/N 1004 and S/N 1005 was slight; however, there was considerable leakage in modules S/N 1002 and S/N 1003. The leakage of the modules S/N 1004 and S/N 1005 was solved by gluing with epoxy for DCMD measurements. Modules S/N 1002 and S/N 1003 were returned to the manufacturer for further treatment. It was found that the leakage primarily resulted from the fibers near the two ends of the modules and was possibly developed during fabrication of these modular channels. This observation suggests that the distillate pressure in the lumen side should be lower than 3 psi. Otherwise, the distillate water may penetrate through the membrane wall from the lumen side to the shell side, resulting in loss of some distillate as opposed to contamination of the distillate by the brine. That means that the water vapor flux would be affected negatively to some extent by the loss of permeation area and by the lower velocity of operation on the lumen side. Better potting methods have resolved these issues and higher pressures can be easily sustained.

Gas Permeation: A system was also established for the measurement of gas permeance of the coated porous hollow fiber membranes using a gas permeation apparatus, as discussed above with reference to FIG. 7. The $N_2$ gas from the cylinder permeated through the membrane from the tube side to the shell side. The upstream and downstream pressures were measured by Ashcroft Test Gauge (PT. No. 63-5631). The downstream flow rate of the gas was measured using a soap bubble flow meter. During the permeation measurements, the upstream pressure was maintained at a constant pressure between 0.1-0.6 psig (0.5-3.1 cmHg gage). The permeation measurements were made at room temperature and the permeant gas was $N_2$. The $N_2$ permeance of the hollow fiber membranes was related to the measured steady-state permeation rate of nitrogen through the membrane. Calculations were comparable to those described with reference to the Initial Phase.

Experimental Results and Discussion—$N_2$ Gas Permeation Measurements

The results of the $N_2$ gas permeance measurements are listed in the tables of FIGS. 46 and 47. The experiments yielded a result of 0.027 $cm^3/cm^2$-s cmHg for module S/N 1004 and 0.05 $cm^3/cm^2$-s cmHg for module S/N 1005. These values are significantly lower than that of module MXFR #3 used in the Initial Phase, which was 0.196 $cm^3/cm^2$-s cmHg. The coatings on the fiber surfaces in both S/N 1004 and S/N 1005 modules must be significantly tighter than the coating in MXFR #3 based on the data of $N_2$ permeance; however, the $N_2$ permeance are still higher than all other modules in the Initial Phase.

In the experimental study, the $N_2$ cylinder with a test gauge was connected to one end of the lumen side of the module. Based on experimental observations, a much greater pressure drop along the fiber direction from the side connected with the gas cylinder to the other side existed. Therefore, the effective pressure difference between the tube side and the shell side for driving $N_2$ permeation through the membrane must have been lower than that indicated by the test gauge. The modules in the Initial Phase and the small modules tested in the Scale-Up Phase had much shorter fibers and therefore the pressure drop was significantly lower. The larger modules evaluated in the Scale-Up Phase had fibers that are quite long. However, the measurement of $N_2$ gas permeation rate is still a very useful method for a rough characterization of the membrane properties and explaining the differences between different membrane coatings and their differing DCMD performances under similar experimental conditions.

DCMD Performances of Single Modules (Task 2)

i. Small Rectangular Cross Flow Hollow Fiber Membrane Modules

As noted above, five (5) small rectangular modules having polypropylene (PP) 50/280 fibers (280 μm I.D., 50 μm wall thickness) having different coatings were investigated. This testing was needed to facilitate fiber selection in Task 1 and the details of these five modules are shown in the table of FIG. 44.

Figure 28:
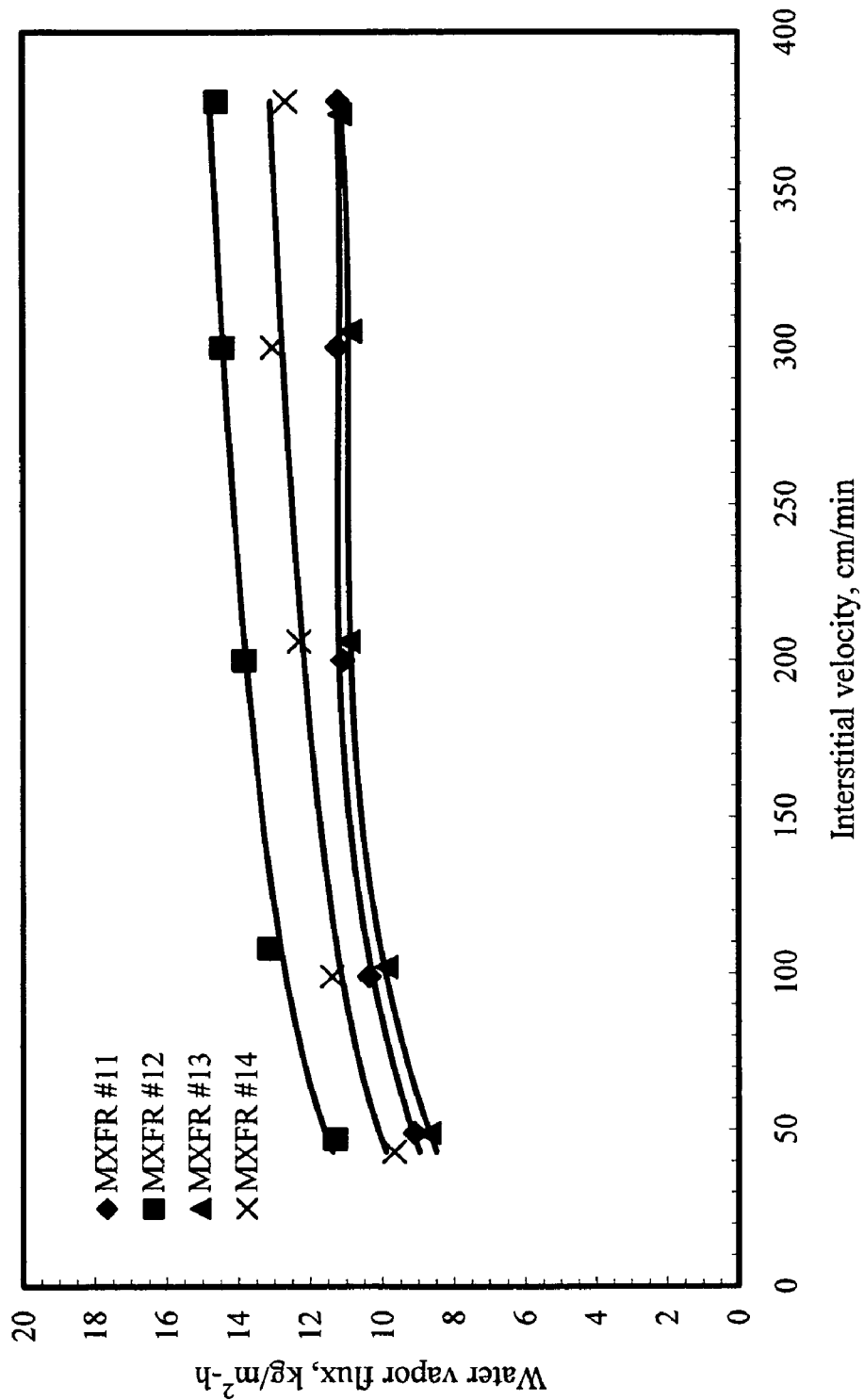
FIG. 28 is a plot of variations of water vapor flux with interstitial velocity of 1% brine as feed flowing through the shell side at 85° C.; tube side at a vacuum of 64-69 cmHg [modules MXFR #11, MXFR #12, MXFR #13 and MXFR #14]
Figure 29:
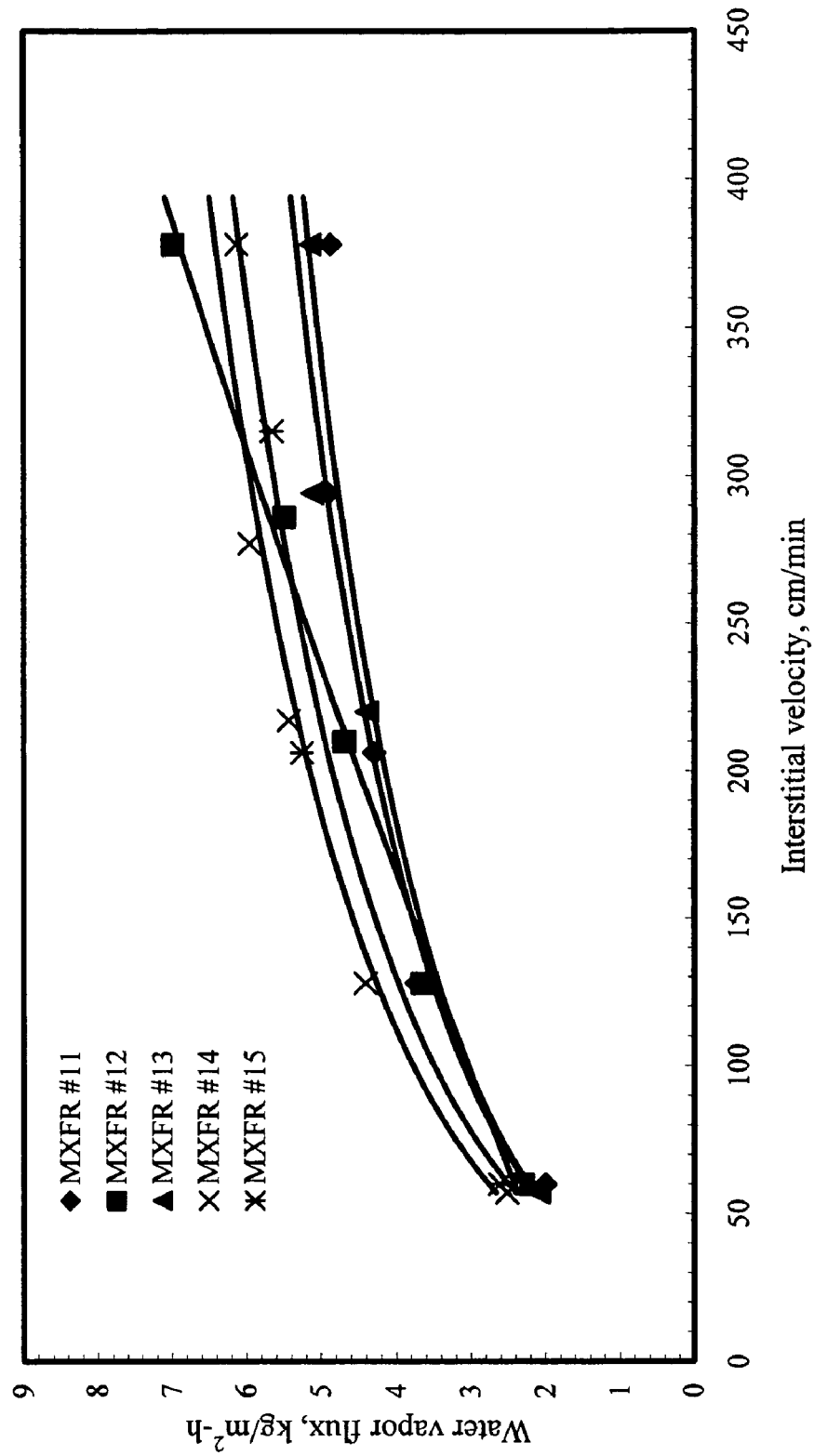
FIG. 29 is a plot of variations of water vapor flux with interstitial velocity of hot brine (1% NaCl) as feed through the shell side at 85° C. (tube side: D.I. water, 15-19° C., linear velocity 770 cm/min) [modules MXFR #11, MXFR #12, MXFR #13, MXFR #14 and MXFR #15.

FIGS. 28 and 29 display the variations of water vapor flux with feed brine interstitial velocities in the five membrane modules in membrane distillation. In VMD (vacuum membrane distillation), the water vapor fluxes (see FIG. 28) have a trend similar to the nitrogen permeation rate for these membranes (see FIG. 46); this result indicates that the process is limited by the transport of water vapor through the surface coating of the membrane. This trend of the water vapor flux with respect to the membrane surface coating also appears to be valid for DCMD except for module MXFR#12 (see FIG. 29).

Generally, the more open the porous substrate for a given coating, the higher the VMD flux and DCMD flux. Compared to the uncoated membrane (in module MXFR #15), the ultrathin coating layers did not reduce the flux in a significant way in DCMD performance. This data indicated an advantageous operational result. Indeed, the foregoing test results demonstrate that the advantageous coatings employed according to the present disclosure do not materially reduce the water vapor flux. However, the water vapor fluxes obtained using this PP 50/280 fiber based rectangular module are low; these values are not competitive with those of the PP 150/330 hollow fiber modules obtained in the Initial Phase.

The foregoing experimental results provide useful guidance for hollow fiber membrane selection, e.g., for the bigger modules developed in Task 1 of the Scale-Up Project.

Larger Rectangular Cross Flow Hollow Fiber Membrane Modules

Two rectangular cross flow membrane modules, namely S/N 1004 and S/N 1005 (see the table of FIG. 45) were used to generate DCMD measurements. The relations between the temperatures and velocities of the feed, the distillate and the water vapor flux were investigated. The effect of the concentration of salt (NaCl) on the DCMD performances was also studied.

Figure 30:
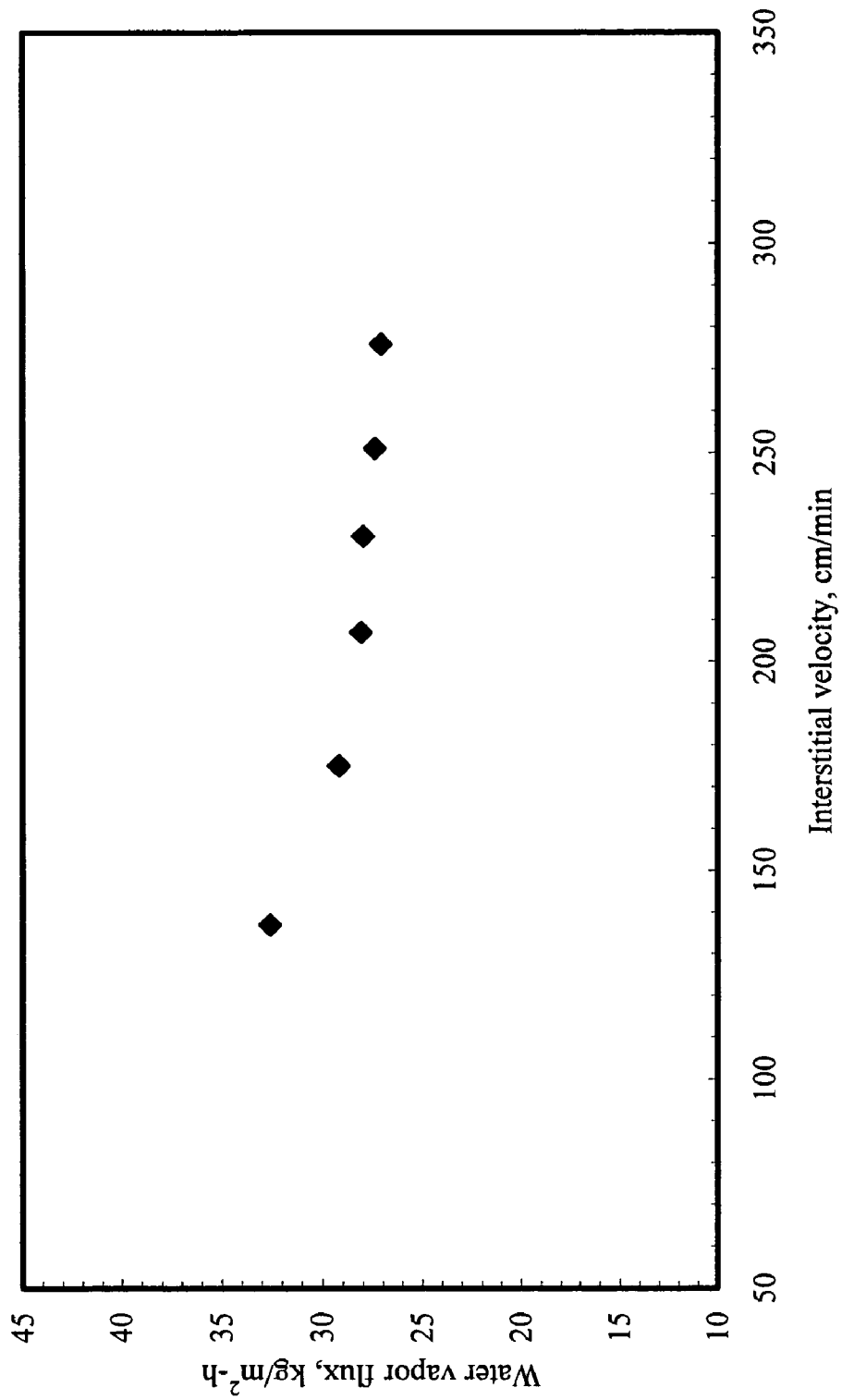
FIG. 30 is a plot of variations of water vapor flux of module S/N 1005 with interstitial velocity of 3% brine as feed flowing through shell side at 85° C. and distillate entering the tube side with linear velocity of 1560 cm/min at 16° C.

The variation of water vapor flux of module S/N 1005 with the interstitial velocity of hot brine feed (3%) entering the module at 85° C. is shown in FIG. 30, when the distillate inlet linear velocity was 1560 cm/min. It was surprising that the water vapor flux did not increase with an increase of the feed velocity, but it decreased as the interstitial velocity of the hot feed was raised. From the experimental records, it was determined that the outlet temperatures of distillate from the module were 83-84° C., which values were very close to the feed inlet temperature. Compared to the module MXFR #3 used in the Initial Phase, it was known that the fibers in modules S/N 1004 and S/N 1005 were substantially longer (4 times). The heat transported by water vapor and conducted through the membrane material was determined to be excessive, and such heat transport reduced the temperature difference between the shell side and tube side of the membrane which is the driving force of the DCMD process.

Based on the foregoing results, the effect of hot brine velocity (also the brine-side boundary layer heat transfer coefficient) on the water vapor flux (which was found to be very important in the Initial Phase) was determined to be of less significance unless and until a lower distillate outlet temperature is provided. Therefore, the identification of operational conditions for reducing the outlet temperature of distillate was an initial objective to improve the DCMD performance of the larger membrane modules. To that end, the effect of linear velocity of the distillate on the water vapor flux was investigated and the results are shown in FIG. 31.

Figure 31:
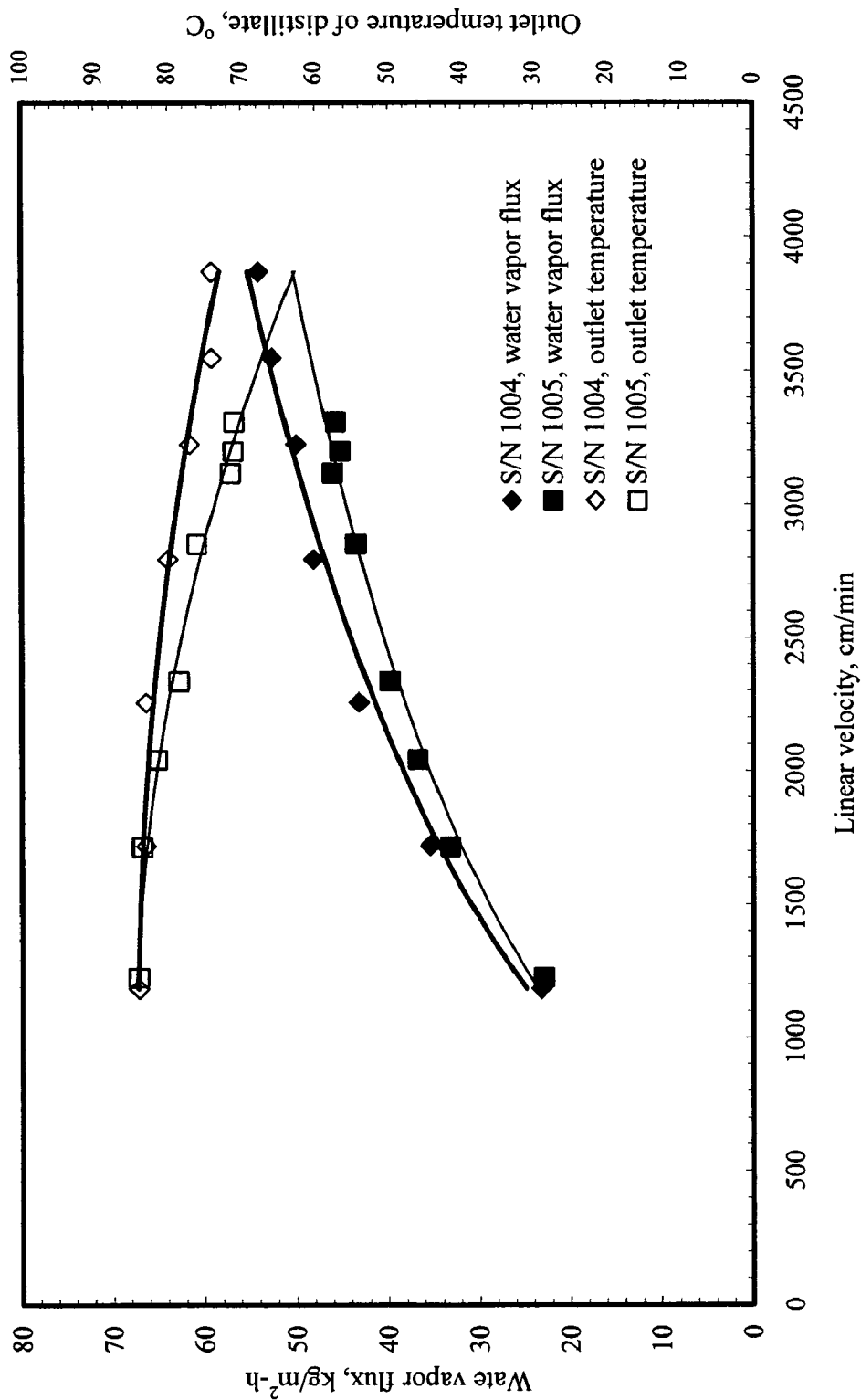
FIG. 31 is a plot of DCMD performances showing variations of water vapor flux with inlet linear velocity and outlet temperature of distillate flowing through the tube side at inlet temperatures of 16-24° C. and 3% brine at 85° C. flowing on the shell side at 25 LPM (interstitial velocity of 230 cm/min) [modules S/N 1004 and S/N 1005]

As shown in FIG. 31, the distillate outlet temperature decreased with an increase of linear velocity of distillate due to the decrease of the residence time of distillate in the module. This phenomenon led to an increase of the driving force for water vapor permeation due to increasing $\Box T$ ($=T_{brine}-T_{distillate}$). This increased driving force translated to a higher water vapor flux. Also, an increase of linear velocity in parallel flow on the tube side led to an increase of Reynolds number, which maximized the distillate-side boundary layer heat transfer coefficient. Higher heat transfer coefficient leads to a lower temperature at the distillate-membrane interface which supports the increased water vapor flux. In module S/N 1004, a water vapor flux value of around 54 kg/m$^2$-h was observed. This performance level corresponds to the performance in the Initial Phase using a module that was an order of magnitude smaller, when the linear distillate velocity was 3900 cm/min.

However, it is noted that the water vapor flux of the larger module is somewhat lower than that of small module MXFR #3 used in the Initial Phase. The resistance to water vapor diffusion through the membrane from the outside surface coating of fibers is an important factor that affects water vapor flux; this effect is potentially reflected in the N$_2$ permeances set forth in the tables of FIGS. 44 and 45. It is also noted that at low linear velocity of distillate in the fiber lumen, e.g., 1200 cm/min, the outlet temperature of distillate reached 84° C., which means that there was essentially no temperature difference across the membrane since the feed inlet and outlet temperatures were between 84.5° C. and 85° C. Even if the distillate linear velocity was as high as 3800 cm/min, the distillate outlet temperature still was 74° C. or higher for module S/N 1004. These positive results provide a basis for enhanced designs and processing parameters.

Figure 32:
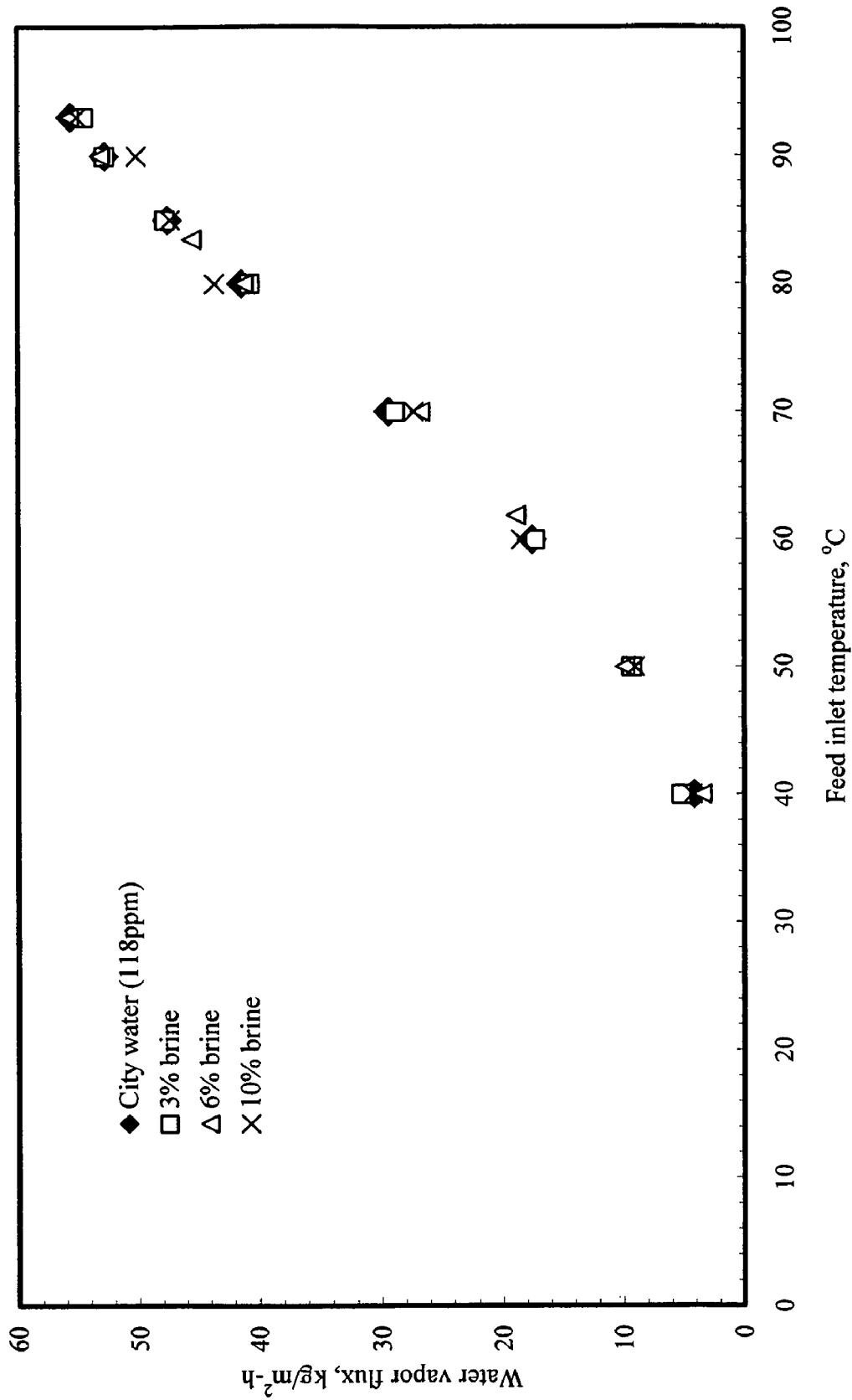
FIG. 32 is a plot of DCMD performance with city water; 3% brine, 6% brine and 10% brine as feed solutions: variation of water vapor flux with feed inlet temperature (shell side: brine solution at 230 cm/min of interstitial velocity; tube side: distillate at 2850 cm/min of average linear velocity at 25-35° C. of the inlet temperature) [module S/N 1004; membrane surface area: 2864 cm$^2$]

A variation of the water vapor flux with feed inlet temperature is illustrated in FIG. 32 for city water, 3% brine, 6% brine and 10% brine. Normally, feed temperature has a small effect on the Reynolds number at a given flow rate. That is because there are only limited changes in the density and the viscosity of water in the relevant temperature range. But the effect of temperature on the water vapor permeation flux is striking for the DCMD systems of the present disclosure. Increase of the feed temperature increases the Reynolds number to a limited degree, but such feed temperature increase drastically increases the water vapor pressure which is the driving force for water vapor flux. This relationship explains why the water vapor flux rises almost exponentially with temperature as the brine temperature rises.

An understanding of the performance of the disclosed membrane systems with different brine solutions at different experimental conditions is significant. A series of VMD experiments was carried out in the Initial Phase with a feed stream of deionized (DI) water and 1% brine flowing on the shell side of membrane module to illustrate the effect of salt concentration in the feed on water vapor flux. It was concluded that the effect of salt concentration on system performance was negligible under the VMD experimental conditions when the salt concentration was increased to 1%.

Figure 33:
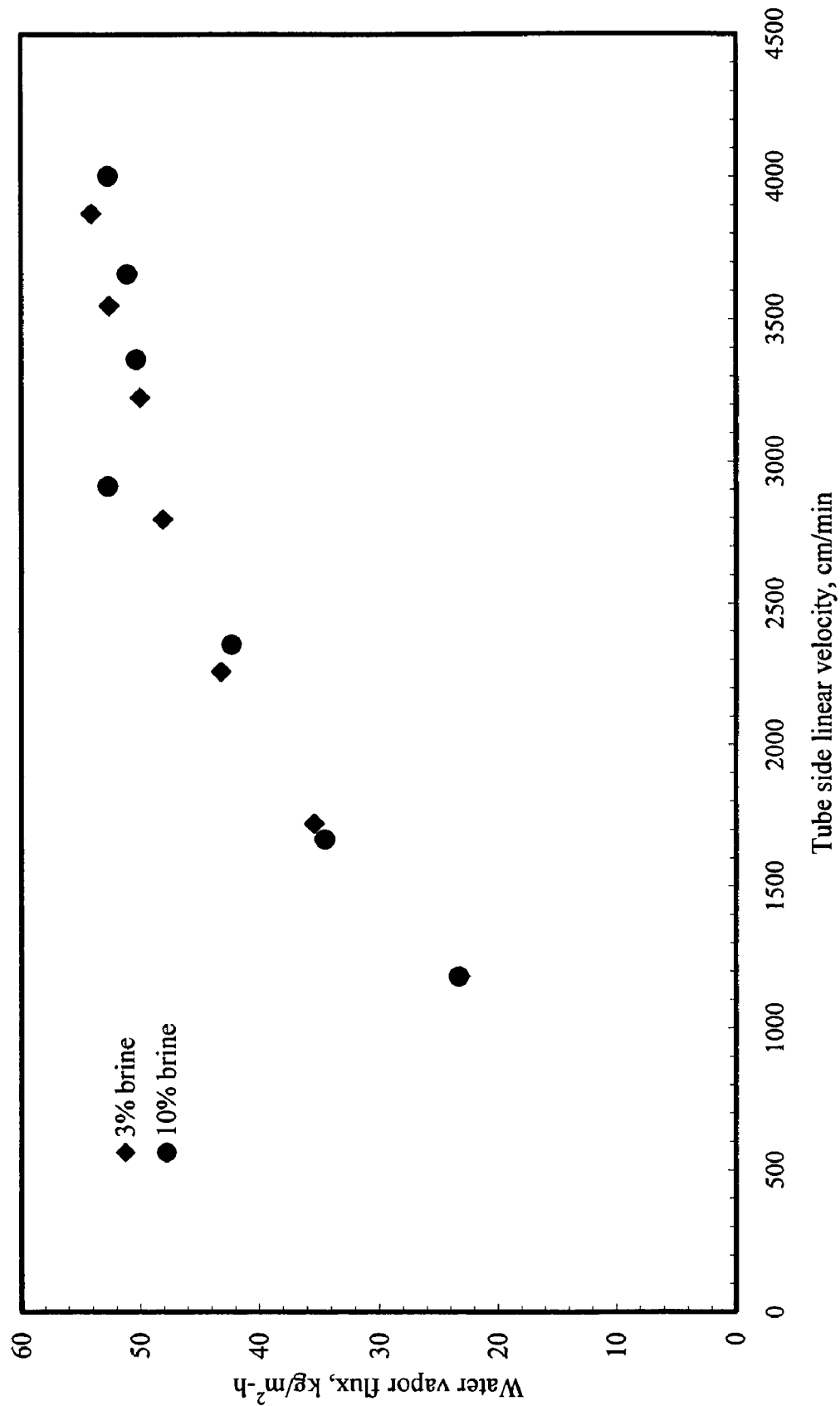
FIG. 33 is a plot of DCMD performance with feed solutions of 3% and 10% brine: variation of water vapor flux with linear velocity of distillate flowing through tube side at inlet temperatures of 18-26° C. and hot brine flowing on shell side at 25 LPM (interstitial velocity of 230 cm/min) at temperature of 85-88° C. [module S/N 1004; membrane surface area: 2864 cm$^2$]

The disclosed membranes were also investigated with more highly concentrated salt solutions under DCMD conditions, i.e., to gain a greater understanding of the overall utility of the disclosed membrane systems. A group of DCMD experiments was conducted to determine the effect of NaCl concentration on the water vapor flux in the disclosed large rectangular crossflow membrane module system. The experimental data shown in FIGS. 32 and 33 do not provide any conclusive evidence that increasing the NaCl concentration of the feed to 10% of NaCl reduces the system performance in any meaningful way. This is apparent because water vapor pressure is affected to a small extent by salt concentration. When salt concentration in water is 10%, $P_t/P_o=0.94$; when salt concentration reaches 20%, $P_t/P_o=0.85$. The cross flow of hot feed on the shell side is also a factor that could substantially reduce the concentration and temperature polarizations. These results point out that the disclosed DCMD technology may be advantageously used to successfully recover water at a high rate from highly concentrated salt solutions, e.g., the rejected hot seawater/hot brine blowdown from a thermal distillation plant. It also suggests how the concentrate volume from existing plants may be advantageously reduced and more water recovered.

Figure 34:
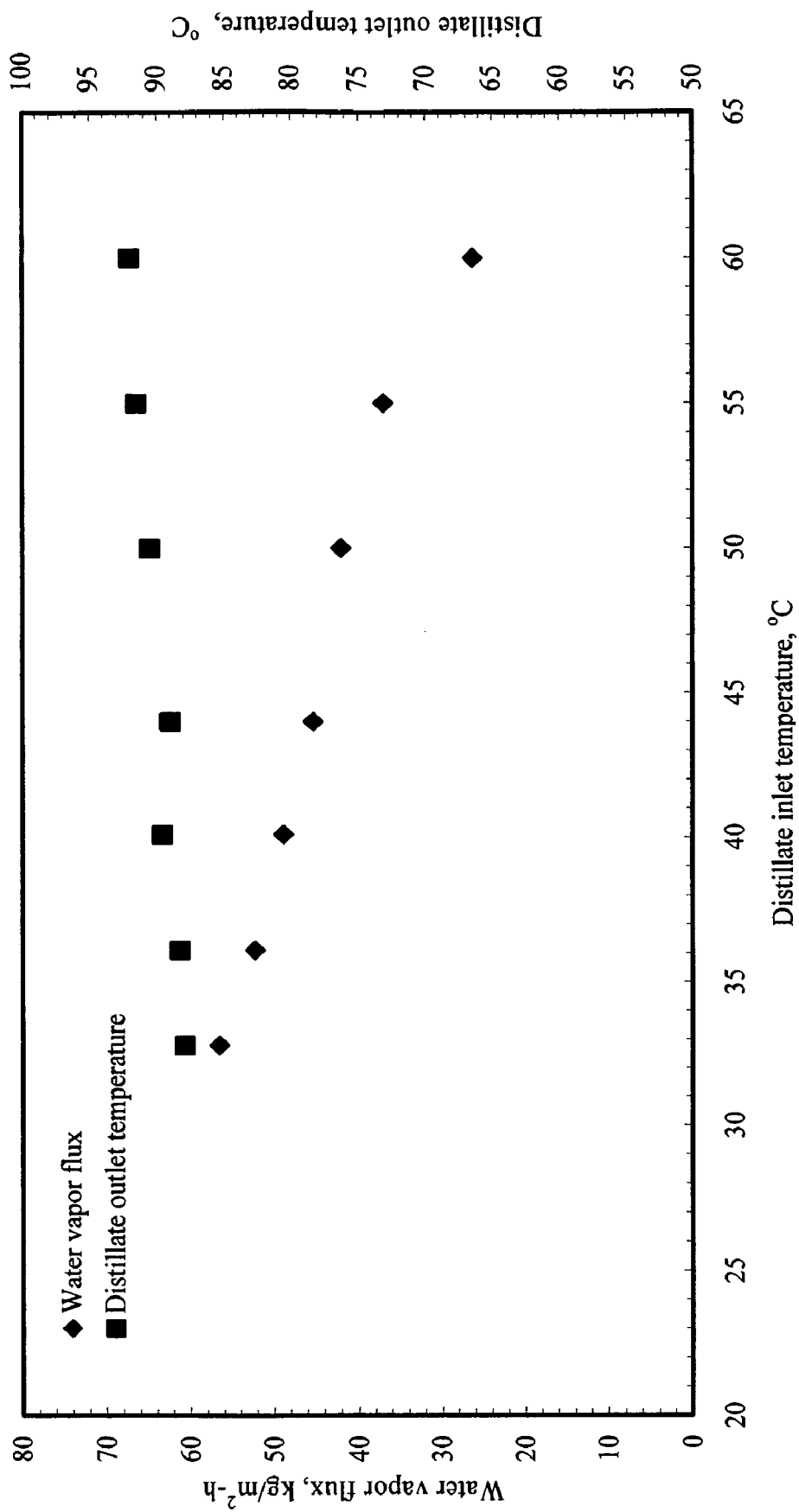
FIG. 34 is a plot of DCMD performance showing variations of water vapor flux with distillate inlet temperature (shell side: 3% brine at 230 cm/min interstitial velocity (temperature of 91-93° C.); tube side: distillate at 2950 cm/min linear velocity) and distillate outlet temperature with distillate inlet temperature [module S/N 1004; membrane surface area: 2864 cm$^2$]

FIG. 34 illustrates how the distillate inlet temperature affected the DCMD performance of module S/N 1004. Water vapor flux has been plotted for a 3% brine feed at 91-93° C. flowing on the shell side at an interstitial velocity of 230 cm/min and distillate flowing on the tube side at a linear velocity of 2950 cm/min as a function of the distillate inlet temperature. In FIG. 34, the variation of distillate outlet temperature with the distillate inlet temperature has also been shown. As the inlet distillate temperature is increased, the driving force of the DCMD process is decreased and therefore the water vapor flux decreases. It can be seen from these experimental results that the distillate outlet temperature was raised by only 4° C. (from 88° C. to 92° C. which is very close to the feed inlet temperature), even as the distillate inlet temperature was varied from 30° C. to 60° C. These results indicate that higher water vapor flux may be obtained by optimizing the operating parameters, even if the water vapor flux has already been increased to desirable levels, e.g., 56.5 kg/m²-h. In addition, a very high water vapor flux of 42 kg/m²-h was obtained, although the inlet temperature of distillate was as high as 55° C.

DCMD Experiments for an Extended Period (Task 2)

Membrane module S/N 1004 was employed for an extended DCMD run. A feed of 3% hot brine was circulated through a microfilter, the shell side of module S/N 1004, and the feed reservoir. Similarly, cold deionized water was recirculated as the distillate stream through a microfilter, the lumen, the distillate reservoir, and the thermostat shown in FIG. 26.

Figure 35:
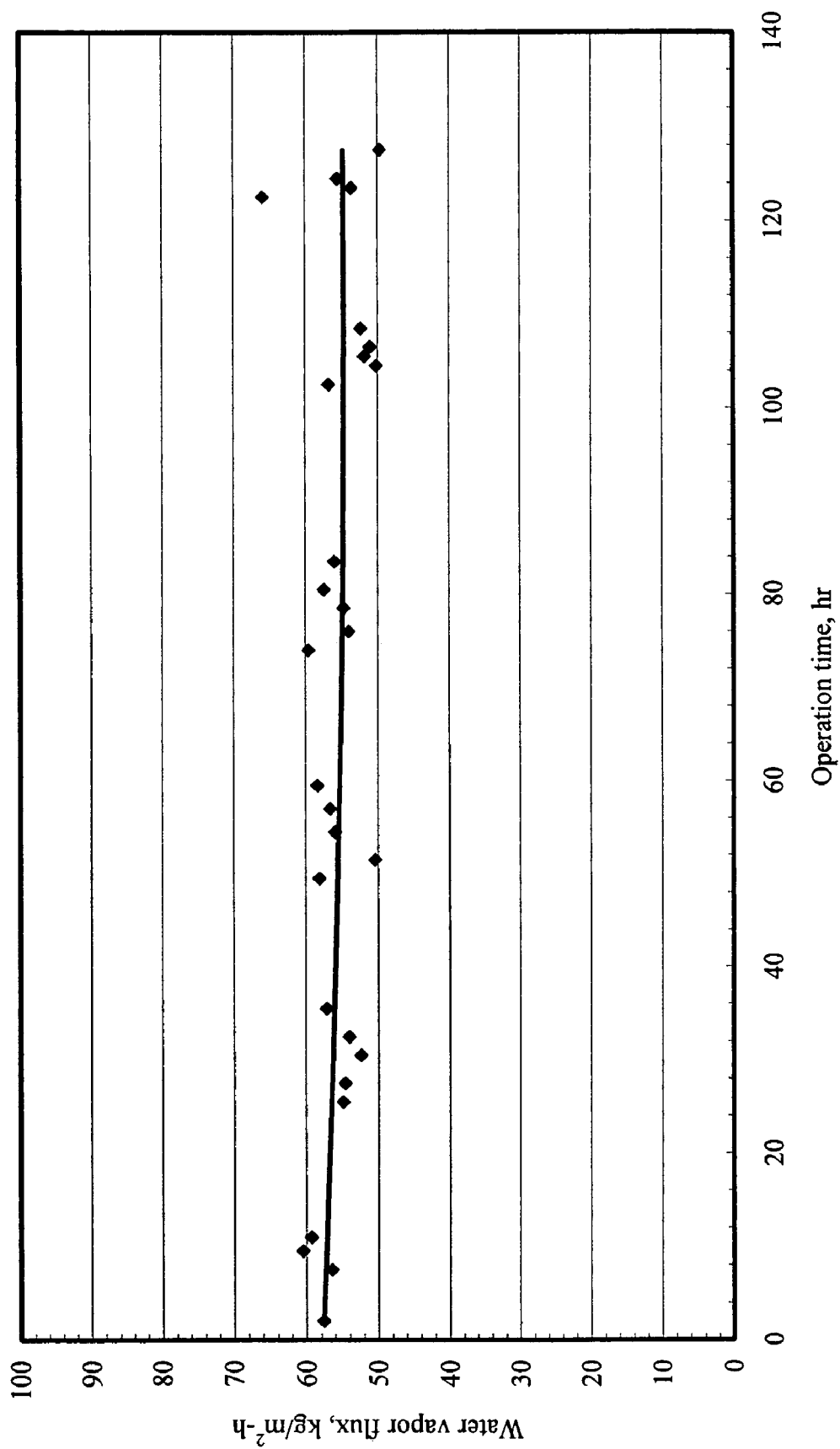
FIG. 35 is a plot of DCMD variation of water vapor flux with operating time for hot brine (3% NaCl) recirculating through shell side with inlet velocity of 253 cm/min (Reynolds: 78) at 87-90° C., and cold distillate water recirculating through tube side at inlet velocity of 3870-4060 cm/min (Reynolds number: 448-471) and inlet temperature of 34-42° C. [module S/N 1004]

FIG. 35 presents the variation of water vapor flux with operating time according to an exemplary embodiment of the present disclosure. For a brine feed at a temperature of 87-90° C., the reported experiment lasted five (5) days. Water vapor flux of the membrane dropped very slowly until the experiment was run for 100 hours. The stable water vapor flux was 54 kg/m²-h. There was a reduction of only 6% in water vapor flux. Compared to membrane module MXFR #3 tested in the Initial Phase which evidenced a reduction of 23% during the five (5) day long term experiment, the 6% reduction for the S/N 1004 module is much smaller. Although the role of thermal creep in the membrane and coating material with time around the mouth of partially covered pores at a high temperature can not be fully eliminated, fouling of the membrane both on the shell and tube side surfaces was inhibited effectively by microfiltration (1 μm).

The conductivity of the cold distillate was monitored during this extended experiment. The concentration of salt was always less than 10 mg/l, which indicates that the membrane pores were not wetted by the hot brine during this experimental run. No bacterial stain was observed in the membrane module or the brine reservoir during the 5-day experiment. Generally, bacterium can not grow in water at a temperature over 85° C. However, the pressure drop in the cold distillate water passing through the lumen side of the module was slightly increased (by 8%). This indicates the possibility of dirt build up in the hollow fiber tube sheet.

With reference to the mode of operation during the long term test, the experiments were started in the morning at 8 a.m. with 87-90° C. brine feed on the first day. At about 8 p.m., the hot feed temperature was reduced to 50° C. On the next morning at 8 a.m., the hot feed temperature was increased again to 87-90° C.; at 8 p.m., the hot feed temperature was reduced again to 50° C. The water vapor fluxes reported herein correspond to the high temperature feed during the first 12 hours of the day for the 5-day test period. The Reynolds number for the brine employed according to this experimental work was 78.

Membrane module S/N 1004 was used for a cumulative time of around 300 hours and continuously over a period of 5 days/127 hours. For a period of time, module S/N 1004 was continuously used for DCMD tests. No leakage was observed. The silicone-fluoropolymer coating provided an effective barrier to protect the membrane. Membrane performance demonstrated very good stability and also demonstrated that this scaled-up modules performed as well as the smaller module MXFR #3 of the Initial Phase, both in terms of water vapor flux and distillate water quality.

DCMD Performances of a 2-Module Stack (Task 3)

Figure 36:
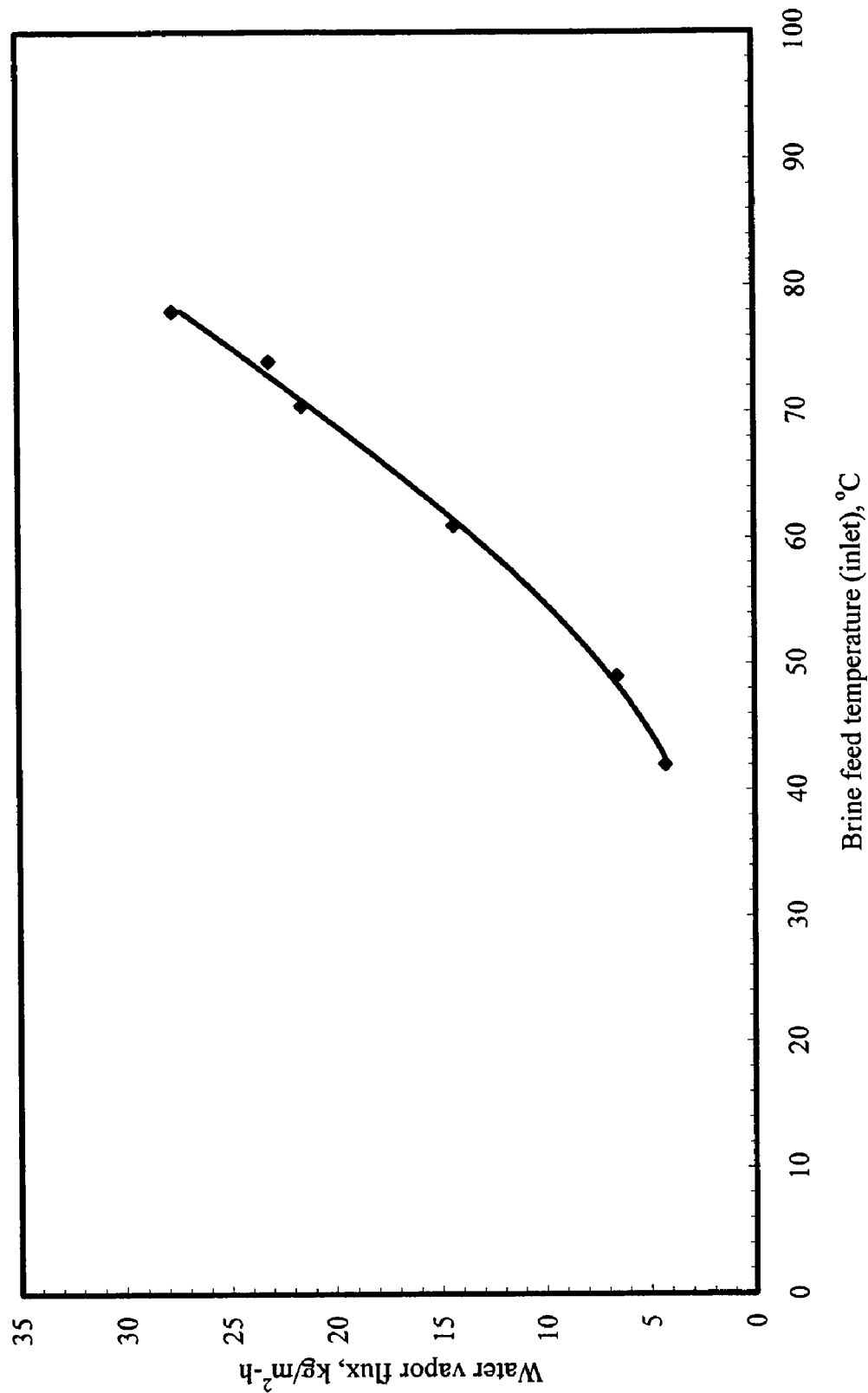
FIG. 36 is a plot of variations of water vapor flux with inlet temperature for 3% brine feed flowing through shell side at interstitial velocity of 230 cm/min and distillate flowing on the tube side with linear velocity of 3000 cm/min at inlet temperatures from 24-50° C. [stacked modules S/N 1004 (outlet) and S/N 1005 (inlet); total membrane surface area: 5728 cm$^2$]

As described in Task 2 of the Scale-Up Phase, DCMD performances of a single larger module were investigated systematically. FIG. 36 shows the variation of water vapor flux of a 2-module stack (total membrane surface area: 5728 cm²) with inlet temperature of 3% brine flowing on the shell side at an interstitial velocity of 230 cm/min when two larger modules (S/N 1004 and S/N 1005) were placed back to back. Water vapor flux increased with an increase of inlet temperature of brine nearly in a straight line. Compared to the single module, the 2-module stack had a water vapor flux similar to that of a single module at low inlet temperatures of feed (below 50° C.). As feed inlet temperature was increased, the difference of water vapor flux between the single module and the stack became larger so that the water vapor flux of a single module was higher than that of the stacked module by 12 kg/m²-h at 80° C. feed inlet temperature. Thus, in the stacked module experiment, hot brine exiting one module at a temperature lower than the feed brine temperature immediately entered the next module. Since the effective brine temperature in the next module was lower, the water vapor flux achieved was also lower.

Figure 37:
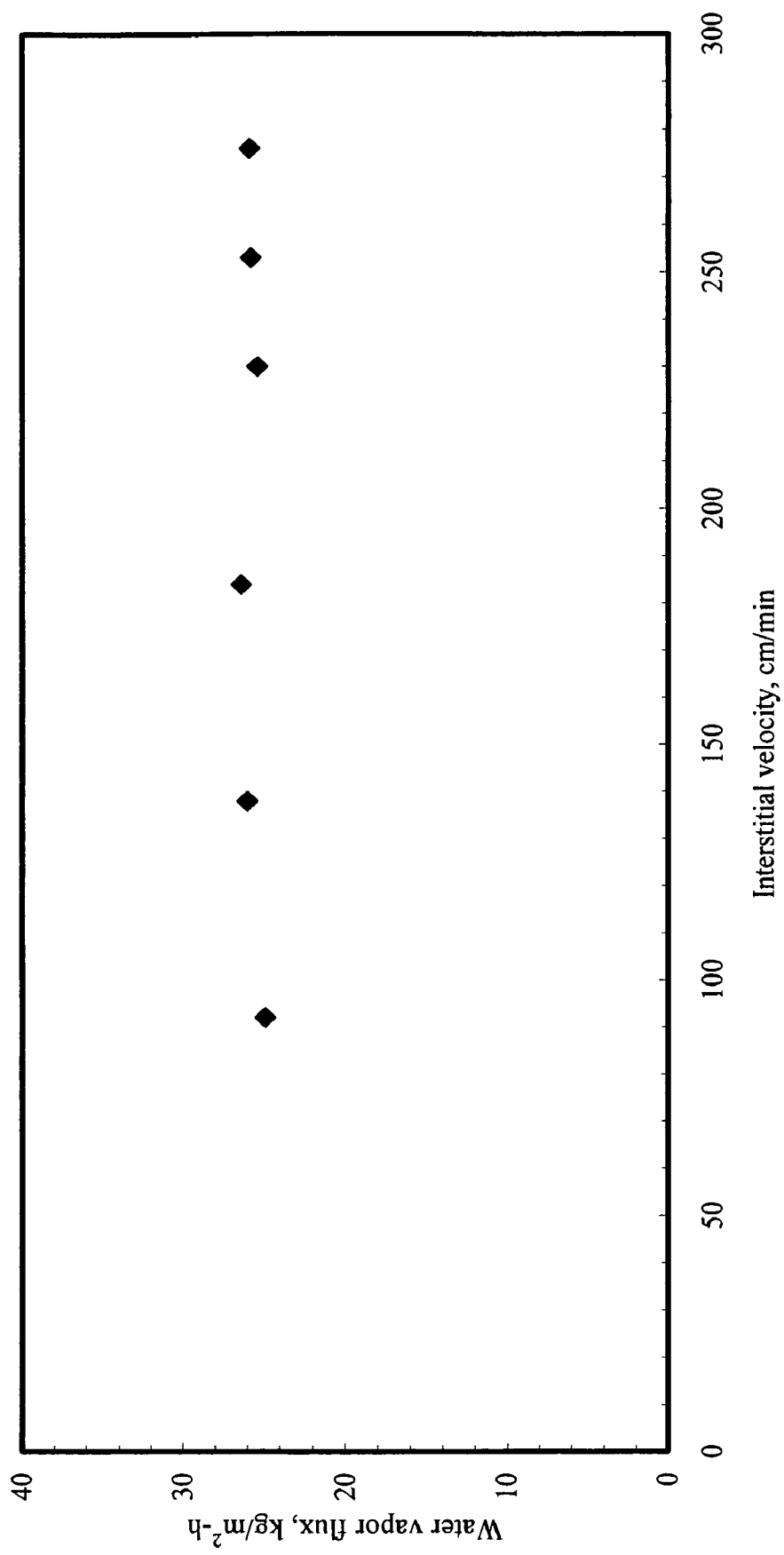
FIG. 37 is a plot of variations of water vapor flux with interstitial velocity of 3% brine flowing through the shell side at inlet temperatures from 81 to 75° C. and distillate flowing on the tube side with a linear velocity of 3120 cm/min at inlet temperatures from 28 to 50° C. [stacked modules S/N 1004 (outlet) and S/N 1005 (inlet)]

To improve DCMD performance of the stacked module, a further experiment was carried out in which the feed interstitial velocity was increased to overcome the lower inlet temperature of the feed entering the second module. The experimental results were not expected (see FIG. 37). The water vapor flux was not significantly increased with an increase of feed interstitial velocity. This experimental result suggested that the lower feed inlet temperature for the second module did not lead to a substantial decrease of driving force for water vapor permeation.

To better understand the foregoing experimental result, the experimental records for a single module were compared. When the feed interstitial velocity was in the range of 150-280 cm/min, the temperature difference between the upside and downside of a module was 1-3° C., which can not lead to a big reduction in the driving force. The cooling capacity of the chiller utilized in connection with this experimental work had a capacity of 12 kW, which was not enough to cool down the hot distillate coming from the stacked module to a target temperature, leading to a relatively high distillate inlet temperature. As a result, the temperature difference between the feed and distillate was very low, leading to a relatively low water vapor flux.

The DCMD performance of the stacked module can be substantially improved relative to the test results reported herein by improving/increasing the capacity of the cooling system. Notwithstanding the limitations of the chiller utilized in the foregoing experimental work, these experiments demonstrate that horizontal cross flow modules can be stacked in a small volume and can be effective to extract significant levels of water vapor from a hot brine stream.

Electron Micrographs of Coated Fibers

Figure 38A:
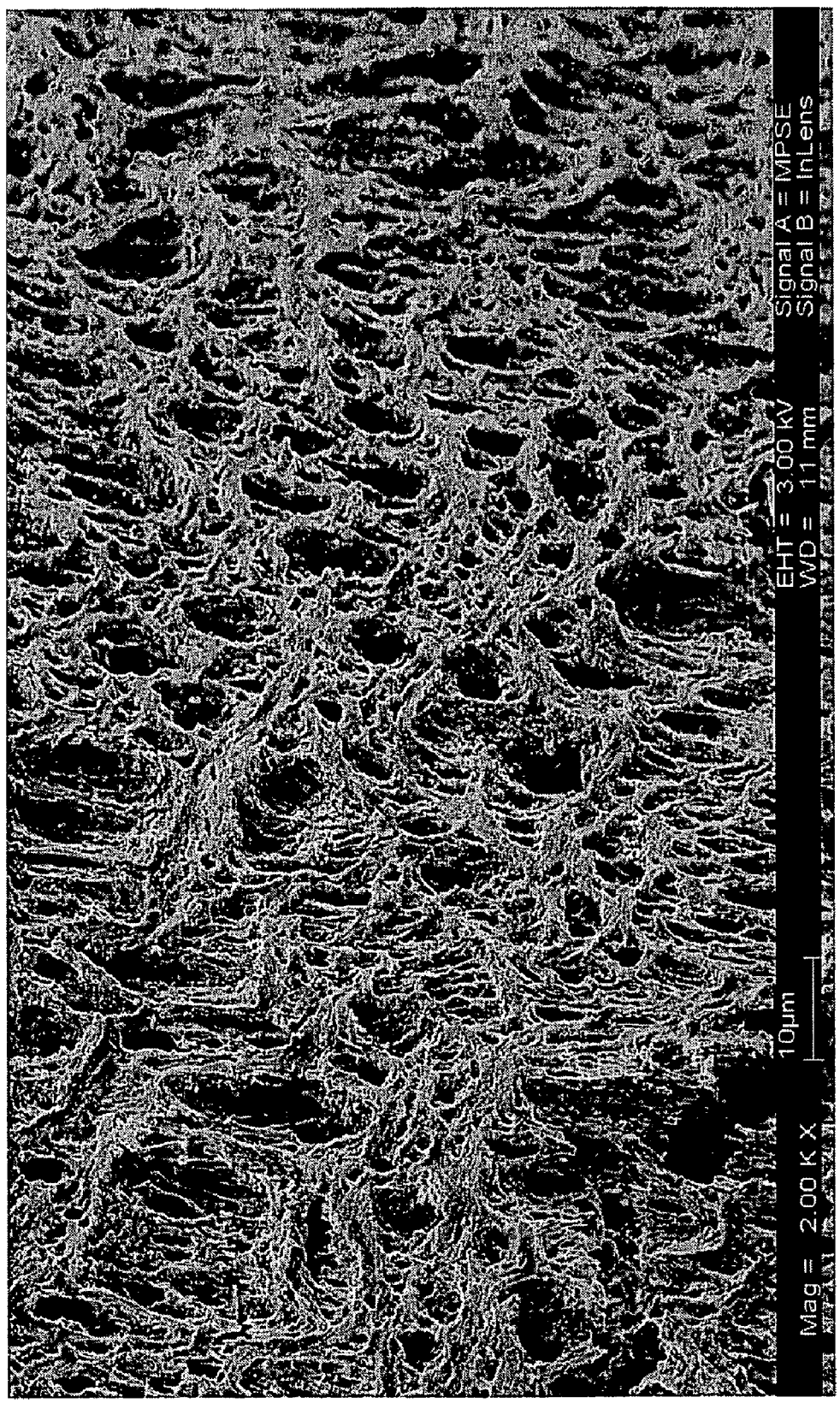
FIGS. 38a and 38b are SEM photographs of exemplary coated fibers according to the present disclosure.
Figure 38B:
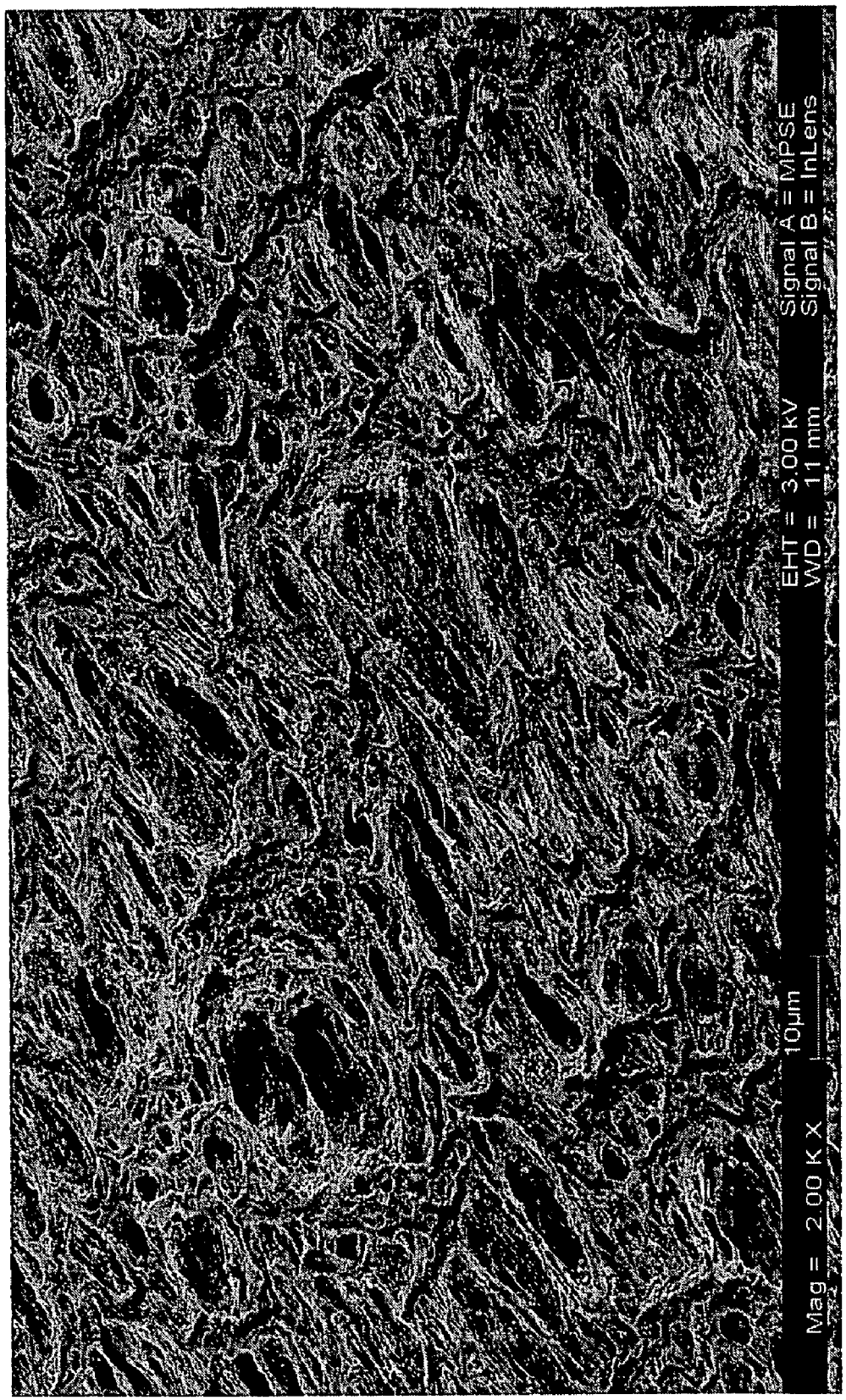

Interpretation of the $N_2$ permeances (see discussion of data contained in the tables of FIGS. 46 and 47) and the corresponding water vapor fluxes of fibers having different coatings can be facilitated by electron micrographs of the coated fiber surfaces. To avoid damage to the successful modules of the Initial Phase, fibers from modules that were not used due to excessive leakage at the tube sheet potting were employed to obtain electron micrographs. The modules selected were: MXFR #2 (Initial Phase) and S/N 1002 (Scale-Up Phase). The base fibers in both modules were identical polypropylene (PP) 150/330 fibers from Membrana. The coatings on these fibers were similar/close (according to AMT), but not identical. The $N_2$ permeance values were: 0.153 cm³(STP)/cm²·s·cmHg for MXFR #2 (Initial Phase); 0.070 cm³(STP)/cm²·s·cmHg for S/N 1002 (FIG. 47). FIGS. 38a and 38b illustrate the electron micrographs of the surface shown therein, the openings on the surface of fibers in S/N 1002 are smaller and less numerous than those in MXFR #2. Correspondingly, S/N 1002 has lower $N_2$ permeance. The change in the microporous coating morphology can be expected to be reflected not only in the $N_2$ permeance, but also in the water vapor permeance. The substrate pore sizes are smaller and visible through the coating in FIG. 38a.

Comparison of Data from S/N 1004 and MXFR #3 for Scale Up Considerations

The table of FIG. 48 illustrates the comparative DCMD performances of modules S/N 1004 and MXFR #3. Even though module S/N 1004 has a membrane surface of 0.29 $m^2$ compared to 0.012 $m^2$ for module MXFR #3, the water vapor fluxes of the two modules are not far apart for almost similar experimental conditions. The somewhat lower flux of S/N 1004 is due to the less porous nature of the coating on the fibers in S/N 1004 compared to MXFR #3.

Cost Estimate (Task 5)

A brief comparison of seawater desalination by reverse osmosis (RO) and the proposed direct contact membrane distillation (DCMD) process with respect to production cost is provided herein. For purposes of these calculations, a purified water production rate of 1,000,000 gal/day (3800 $m^3$/day) was assumed. The values for RO are taken from Ray (2001). Other references include Peters and Timmerhaus (1991) and Mulder (1991).

The calculation of production cost is normally based on capital cost and operating cost. For comparison between RO and DCMD modalities, the following assumptions were employed:

(1) RO and DCMD desalination plants have same production rate—1,000,000 gal/day.

(2) RO: operating pressure 1000 psi, 30% recovery, feed flow rate 2.3 kgal/min (=0.15 $m^3$/s), energy recovery 30%; DCMD: operating pressure 10 psi, 12% recovery, feed flow rate 5.66 kgal/min (=0.36 $m^3$/s).

(3) Costs of capital items—site development, water, utilities, construction overhead and contingency, and some operating costs—membrane replacement, labor, spare parts and filters in RO application are the same as those in DCMD.

(4) Both RO membrane and DCMD membrane have the same price ($/$m^2$). The permeation flux of DCMD is 1.5 times higher than RO. Estimated membrane lifetime is 3 years.

(5) In DCMD, there are two special situations:
(a) An initial amount of cooled distillate water flows on the distillate side. This water is heated up as it collects the condensate. A fraction of this heated distillate is taken out as product. The rest is cooled in a heat exchanger by cooling water which is cooled down again by means of a cooling tower. Thus, additional costs involved include those of (1) distillate heat exchanger; (2) a cooling tower; and (3) cooling water lost by evaporation in the cooling tower.
(b) On the hot brine side, the exiting hot brine temperature is sufficiently lowered. An amount of fresh hot brine is added to it and then this brine is heated up in a heat exchanger by the waste heat source so that it can be fed again to the membrane stack. A 12% recovery is assumed (although higher recovery is anticipated according to the present disclosure). However, the higher recovery is likely to require a few passes. The costs involved are (1) brine heat exchanger; and (2) additional pumping cost.

The estimated total production cost of water by the DCMD process is only $2.97/1000 gallons when waste heat is available. When waste heat is not available, the energy for heating the saline water must be added: the cost of heat is $0.85 per kgal (only when a significant amount of heat recycling is implemented). The total production cost of water goes up to $3.63/1000 gallons, which is still significantly lower than for the RO process due to the low pressure operation of DCMD process, high water vapor flux, and good anti-fouling properties of the DCMD membrane and process. Compared to the RO process widely used in the desalination industry, the salt content of water made from the disclosed DCMD system is <20 ppm, but the salt content in water obtained from single-stage RO system is >200 ppm. Therefore, significant advantages accrue from use of the disclosed systems and methods for large-scale desalination.

Analysis of Results and Commercial Viability

An analysis of the results obtained in the Scale-Up Phase of the present disclosure leads to the following conclusions:

1. The high water vapor fluxes obtained from small horizontal cross flow modules containing larger diameter/thicker wall coated polypropylene hollow fibers in the Initial Phase were also achieved in the Scale-Up Phase using modules that have more than an order of magnitude larger membrane surface area 2864 $cm^2$ (Scale-Up Phase vs. 119 $cm^2$ in Initial Phase). The maximum water vapor flux level achieved with the larger membrane surface area was approximately 60 $kg/m^2$-h for 87-90° C. brine feed.

2. Studies using small modules identical to those in the Initial Phase and the smaller 50/280 μm polypropylene (PP) fibers demonstrated that their DCMD performances and/or VMD performances were much poorer compared to those using 150/330 μm fibers. This conclusion was valid whether the fibers have a coating or not. Therefore, the hollow fibers employed in the larger modules were the same larger diameter hollow fibers used in the Initial Phase; however, the microporous/porous silicone-fluoropolymer coatings on the fiber outside surface were somewhat tighter than those in the Initial Phase. The fiber lengths employed in the Scale-Up Phase were four times longer than those in the Initial Phase. The substantially increased fiber length required greater attention to the distillate flow rate in a scaled-up configuration; otherwise, distillate overheating can take place, thereby reducing the temperature driving force across the pore and therefore the water vapor flux.

3. Two rectangular hollow fiber modules were easily stacked back-to-back to achieve 5728 $cm^2$ membrane surface area so that the hot brine feed leaving one module immediately entered the next. This result demonstrated that one can stack multiple modules, e.g., 4-6 or more modules, face-to-face to extract a much greater amount of sensible heat from the same hot brine feed in sequence. The modules that are downstream will be exposed to a lower temperature brine feed. Experimental results demonstrate that even at a brine feed temperature as low as 60° C., a water vapor flux >20 $kg/m^2$-h can nonetheless be achieved.

4. Experimental results demonstrate that an increase in feed salt concentration from 0 to 10% leads to a very limited water vapor flux reduction. As a result, the disclosed systems and techniques are useful for concentrate volume reduction and further water recovery.

5. The 5-day extended-duration experiment (and many other studies described herein) did not require resort to any membrane cleaning beyond a 1 μm microfilter at the module inlet. The system performance was essentially unaffected over time, providing a justifiable basis for further scale-up and future use of the disclosed systems and methods.

6. Conservative economic calculations demonstrate substantial economic advantages for the disclosed systems and techniques vis-a-vis RO, provided waste heat sources are available; there are substantial economic advantages even if waste heat sources are not available.

Although the DCMD and VMD devices, systems and methods of the present disclosure have been described with reference to exemplary embodiments thereof, the present disclosure is not limited to the exemplary embodiments disclosed herein. Rather, as will be readily apparent to persons skilled in the art, the devices, systems and methods disclosed herein are readily susceptible to alternative implementations and/or uses without departing from the spirit or scope of the present disclosure. For example, as noted above, additional membrane materials may be employed in fabricating membranes according to the present disclosure, including a wide range of hydrophobic polymeric materials. Particular examples include polyvinylidene fluoride (PVDF); poly(4-methyl-1-pentene) (PMP); polytetrafluoroethylene (PTFE); polyacrylonitrile; perfluorodimethyldioxole-tetrafluoroethylene (PDD-TFE), and polyethylene.

In addition, the present disclosure identifies exemplary coating materials for use in coating the external surfaces of the hollow fibers. In addition, other coatings and/or coating techniques (e.g., solution-based coating techniques) may be advantageously employed according to the present disclosure. Thus, for example, coatings such as polydimethylsiloxane (PDMS) or its other copolymers with fluoromonomers may be utilized according to the present disclosure. The coating may also be prepared from PDD-TFE (perfluoro-2,2-dimethyl-1,3-dioxole with tetrafluoroethylene) and similar copolymers. The coating may be selected/applied such that the pore sizes vary across a relatively broad range, e.g., from 30 Å to 5 μm, and coating thicknesses may vary across a relatively broad range, e.g., from 500 Å to 15 μm. A variety of cross flow designs may also be employed according to the present disclosure, such alternative module designs providing for the hot brine to cross flow over the outside surface of the hollow fibers. The overall geometry of the module need not be rectangular (as is used in the exemplary embodiments disclosed herein), but may take a variety of alternative geometric configurations, e.g., a cylindrical geometry with hot brine entering centrally through a tube and flowing radially out through the bed of hollow fibers in cross flow. The brine flow may also be reversed, i.e., directed inwardly, without departing from the spirit or scope of the present disclosure. Indeed, additional variations on the specific structures, operating conditions and process parameters may be employed without departing from the spirit or scope of the present disclosure, as will be apparent to persons skilled in the art from the detailed disclosure provided herein.

Accordingly, the present disclosure expressly encompasses variations, changes, modifications and/or enhancements to the disclosed direct contact membrane distillation and vacuum membrane distillation devices, systems and methods, and such variations, changes, modifications and/or enhancements are to be understood to fall within both the spirit and scope of the present disclosure.

| Glossary | |
|---|---|
| $A_r$ | membrane area ratio for heat transfer through a membrane surface |
| $A_{rf}$ | value of $A_r$ for hot brine-membrane interface, $d_o/d_i$ |
| $A_{rln}$ | value of $A_r$ for logarithmic mean membrane area, $d_{rln}/d_i$; logarithmic mean diameter, $d_{rln} = (d_o - d_i)/\ln(d_o/d_i)$ |
| $A_{rp}$ | value of $A_r$ for cold distillate-membrane interface equal to 1 |
| cm | centimeter |
| $c_p$ | liquid heat capacity |
| C | salt concentration |
| d | fiber I.D. or O.D. |
| $d_i$ | fiber inside diameter (I.D.) |
| $d_o$ | fiber outside diameter (O.D.) |
| D | characteristic dimension |
| DCMD | direct contact membrane distillation |
| D.I. water | deionized water |
| F | water vapor flux |
| $F_c$ | tube-row correction factor |
| h | overall boundary layer heat transfer coefficient |
| $h_c$ | effective membrane heat transfer coefficient |
| $h_f$ | shell side boundary layer heat transfer coefficient |
| $h_{mg}$ | heat transfer coefficient of the vapor/gas within the membrane pores |
| $h_{ms}$ | heat transfer coefficient of the solid polymeric membrane material |
| $h_m$ | membrane heat transfer coefficient |
| $h_p$ | tube side boundary layer heat transfer coefficient |
| hr | hour |
| $h_v$ | heat transfer coefficient related to the water vapor flux |
| Hg | mercury |
| I.D. | internal diameter |
| k | liquid thermal conductivity |
| kg | kilogram |
| L | fiber length |
| min | minutes |
| MD | membrane distillation |
| n | number of fibers in a membrane module |
| Nu | Nusselt number |
| $N_V$ | mass flux of water vapor across the membrane |
| O.D. | outside diameter |
| $p_{fm}$ | water vapor partial pressure at hot brine-membrane interface |
| $p_{pm}$ | water vapor partial pressure at cold distillate-membrane interface |
| $P_l$ | atmospheric pressure |
| Pr | Prandtl number |
| $Pr_w$ | Prandtl number evaluated at the tube-wall temperature |
| Q | effective heat flux through the membrane |
| $Q_{N_2}$ | permeability coefficient of $N_2$ permeation through the membrane of effective thickness $\delta_M$ |
| $Q_{N_2}/\delta_M$ | $N_2$ permeance |
| $Q_m$ | heat flux conducted through the nonporous solid polymeric part of the membrane and the gas phase that fills the pores |
| $Q_V$ | heat flux transferred by vapor flux across the membrane |
| Re | Reynolds Number |
| $Re_d$ | diameter-based Reynolds number |
| RO | reverse osmosis |
| s | inside membrane area ($= n\pi d_i L$) |
| STP | $T_0 = 273.15$ K, $P_0 = 760$ Torr |
| T | temperature |
| $T_1$ | room temperature |
| $T_f$ | bulk temperature of feed |
| $T_{fm}$ | interface temperature on the surface of membrane in feed side |
| $T_{fm}/T_f$ | degree of temperature polarization in VMD |
| TPC | temperature polarization coefficient |
| U | overall heat transfer coefficient of DCMD process |
| V, $V_L$ | velocity, linear velocity through the tube side (Eq. 7) |
| $V_1$ | volume flow rate of gas through the membrane during measurement at room temperature |
| $V_{feed}$ | volume flow rate of the feed |
| VMD | vacuum membrane distillation |
| ρ | density |
| $\Delta P_{N_2}$ | $N_2$ pressure difference across the membrane |
| μ | dynamic viscosity (absolute viscosity) |
| $\mu_w$ | liquid viscosity evaluated at the tube-wall temperature |
| η | membrane heat transfer efficiency |
| $\Delta H_V$ | heat of vaporization of water |
| $\Delta T$ | bulk temperature difference between feed and distillate ($T_f - T_p$) |

-continued

| | Glossary |
|---|---|
| $\Delta T_f$ | temperature drop of feed along the module length |
| $\Delta T_F$ | temperature difference between brine bulk temperature and the temperature of brine-membrane interface on the feed side |
| $\Delta T_m$ | trans-membrane temperature difference |
| $\Delta T_P$ | the temperature difference between the temperature of membrane-distillate interface and distillate bulk temperature on distillate side |
| $\delta_M$ | effective thickness of membrane |
| $\epsilon$ | membrane porosity |

The invention claimed is:

1. A system for desalination of brine, comprising:
a module that includes a membrane formed by a plurality of porous hydrophobic hollow fibers, each of the plurality of porous hydrophobic hollow fibers defining an internal and an external surface and including a hydrophobic porous coating on at least one of said internal surface and said external surface,
wherein the hydrophobic porous coating exhibits a pore size of at least 30 Å;
wherein the hydrophobic porous coating is effective to prevent salt intrusion and pore wetting of the porous hydrophobic hollow fibers, and
wherein each of the plurality of coated hollow fibers is characterized by a wall thickness and an inner diameter effective to establish a steady state water vapor permeation flux of at least 20 kg/m$^2$-hr.

2. A system according to claim 1, wherein said hollow fibers are coated with a thin, highly water-vapor permeable, hydrophobic porous coating.

3. A system according to claim 2, wherein said coating is selected from the group consisting of a silicone-fluoropolymer, polydimethylsiloxane (PDMS) or its copolymers with fluoromonomers, PDD-TFE (perfluoro-2,2-dimethyl-1,3-dioxole with tetrafluoroethylene) and combinations thereof.

4. A system according to claim 1, wherein the coating is applied to the fibers through a technique selected from the group consisting of plasmapolymerization and a solution-based coating technique.

5. A system according to claim 1, wherein the module is configured and dimensioned to permit cross flow of hot brine relative to the hollow fibers.

6. A system according to claim 1, wherein a plurality of modules are in fluid communication, thereby defining a stacked module.

7. A system according to claim 1, wherein the plurality of porous hydrophobic hollow fibers are fabricated from a material selected from the group consisting of polypropylene, polyvinylidene fluoride (PVDF), poly(4-methyl-1-pentene) (PMP); polytetrafluoroethylene (PTFE), polyacrylonitrile; perfluorodimethyldioxole-tetrafluoroethylene (PDD-TFE), polyethylene and combinations thereof.

8. A system according to claim 1, wherein the module is used in a membrane distillation process.

9. A system according to claim 8, wherein the membrane distillation process is selected from direct contact membrane distillation and vacuum membrane distillation.

10. A system according to claim 1, wherein each of the plurality of hollow fibers has an inner diameter of between about 200 and 330 µm and a wall thickness of between about 50 and 150 µm.

11. A system according to claim 1, wherein each of the plurality of hollow fibers is characterized by an inner diameter to wall thickness ratio of about 1.3:1 to about 6.6:1.

12. A system according to claim 1, wherein said membrane defines a membrane surface area of about 120 cm$^2$ to about 2.0 m$^2$.

13. A system according to claim 1, wherein said steady state water vapor permeation flux is at least about 79 kg/m$^2$-hr.

14. A system according to claim 1, wherein said hydrophobic porous coating is a hydrophobic microporous coating.

15. A system according to claim 1, further comprising a fiber mat arrangement positioned in said module to maintain separation between said plurality of hollow fibers.

16. A system according to claim 1, wherein said coating is on the hollow fiber surface that contacts brine.

17. A method for desalination of brine, comprising:
(a) providing a module that includes a membrane formed by a plurality of porous hydrophobic hollow fibers, each of the plurality of porous hydrophobic hollow fibers defining an internal and an external surface and including a hydrophobic porous coating on at least one of said internal surface and said external surface, wherein the hydrophobic porous coating exhibits a pore size of at least 30 Å; and wherein each of the plurality of porous hydrophobic hollow fibers is characterized by a wall thickness and an inner diameter effective to establish a steady state water permeation flux of at least 20 kg/m$^2$-hr;
(b) feeding hot brine past the membrane on the coated side of the membrane;
(c) feeding a distillate or drawing a vacuum on the uncoated side of the membrane, and
(d) passing de-salted water vapor through the membrane and recovering such de-salted water at a steady state water permeation flux of at least 20 kg/m$^2$-hr.

18. A method according to claim 17, wherein said hot brine passes the fibers in cross flow.

19. A method according to claim 18, wherein said cross flow is substantially rectangular in orientation.

20. A method according to claim 17, wherein a plurality of modules are in fluid communication with each other to define a stacked module; and wherein said hot brine is fed through said stacked module.

21. A method according to claim 17, wherein said module is used in a membrane distillation process that is selected from the group consisting of direct contact membrane distillation and vacuum membrane distillation.

22. A system according to claim 1, wherein the module is positioned in a cross flow configuration such that hot brine may flow over the outside surface of the coated hollow fibers.

23. A system according to claim 22, wherein the module is characterized by a geometry selected from the group consisting of a rectangular geometry and a cylindrical geometry.

* * * * *